(12) United States Patent
Cameron et al.

(10) Patent No.: US 9,888,725 B2
(45) Date of Patent: *Feb. 13, 2018

(54) INHALATION PUFF COUNTER GAUGE AND DISPLAY SYSTEM

(71) Applicant: Lunatech, LLC, Encino, CA (US)

(72) Inventors: John Cameron, Encino, CA (US); Dean Becker, Fairhope, AL (US); Gene Fein, Oxnard, CA (US)

(73) Assignee: LUNATECH, LLC, Encino, CA (US)

( * ) Notice: Subject to any disclaimer, the term of this patent is extended or adjusted under 35 U.S.C. 154(b) by 22 days.

This patent is subject to a terminal disclaimer.

(21) Appl. No.: 15/222,447

(22) Filed: Jul. 28, 2016

(65) Prior Publication Data

US 2017/0027229 A1  Feb. 2, 2017

Related U.S. Application Data

(60) Provisional application No. 62/198,010, filed on Jul. 28, 2015.

(51) Int. Cl.
| | | |
|---|---|---|
| *A24F 11/00* | (2006.01) | |
| *A24F 47/00* | (2006.01) | |
| *H04L 29/08* | (2006.01) | |

(52) U.S. Cl.
CPC ............ *A24F 47/008* (2013.01); *H04L 67/04* (2013.01); *H04L 67/12* (2013.01)

(58) Field of Classification Search
CPC ........ A24F 47/008; A24F 47/002; F01K 5/00; H04Q 9/00; G08C 17/02; G08C 2201/93; H04M 1/72533; F22B 1/28

USPC .................................................. 131/328, 329
See application file for complete search history.

(56) References Cited

U.S. PATENT DOCUMENTS

| | | | |
|---|---|---|---|
| 8,757,147 B2 * | 6/2014 | Terry .................... | A24F 47/008 128/202.21 |
| 8,820,330 B2 * | 9/2014 | Bellinger ............. | A61M 11/041 128/202.21 |
| 8,851,083 B2 * | 10/2014 | Oglesby ............... | A61M 11/047 131/271 |
| 8,955,522 B1 * | 2/2015 | Bowen .................. | A24F 47/008 128/202.21 |
| 9,408,416 B2 * | 8/2016 | Monsees ............... | A61M 15/06 |
| 9,498,002 B1 | 11/2016 | Soreide | |
| 9,585,981 B2 | 3/2017 | Wynalda, Jr. | |
| 2007/0042792 A1 | 2/2007 | Peifetto et al. | |
| 2015/0013695 A1 | 1/2015 | McNeal et al. | |
| 2015/0161883 A1 | 6/2015 | Satgunam | |
| 2015/0181924 A1 | 7/2015 | Llamas | |
| 2015/0351449 A1 | 12/2015 | Righetti | |
| 2016/0157524 A1 | 6/2016 | Bowen | |
| 2016/0198759 A1 | 7/2016 | Kuntawala | |
| 2016/0345621 A1 | 12/2016 | Li | |

(Continued)

*Primary Examiner* — Phuong Chi T Nguyen
(74) *Attorney, Agent, or Firm* — Hankin Patent Law, APC; Susan L. McCain; Sergio Becerra

(57) ABSTRACT

A method is disclosed comprising determining an average amount of vapor associated with an average inhalation by a user of an electronic vapor device, determining a quantity of vaporizable material stored in the electronic vapor device, determining a number of inhalations remaining based on the average amount of vapor associated with the average inhalation and the determined quantity of vaporizable material, and displaying the number of inhalations remaining.

20 Claims, 22 Drawing Sheets

(56) References Cited

U.S. PATENT DOCUMENTS

2016/0366928 A1 12/2016 Liu
2017/0079322 A1 3/2017 Li et al.

* cited by examiner

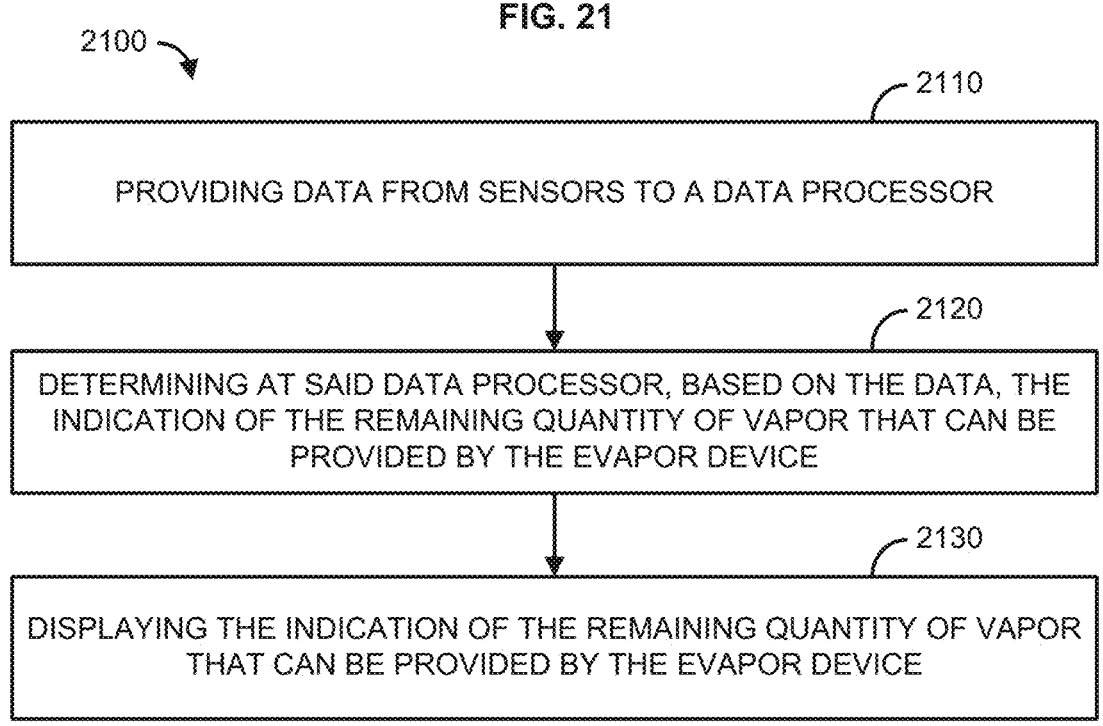

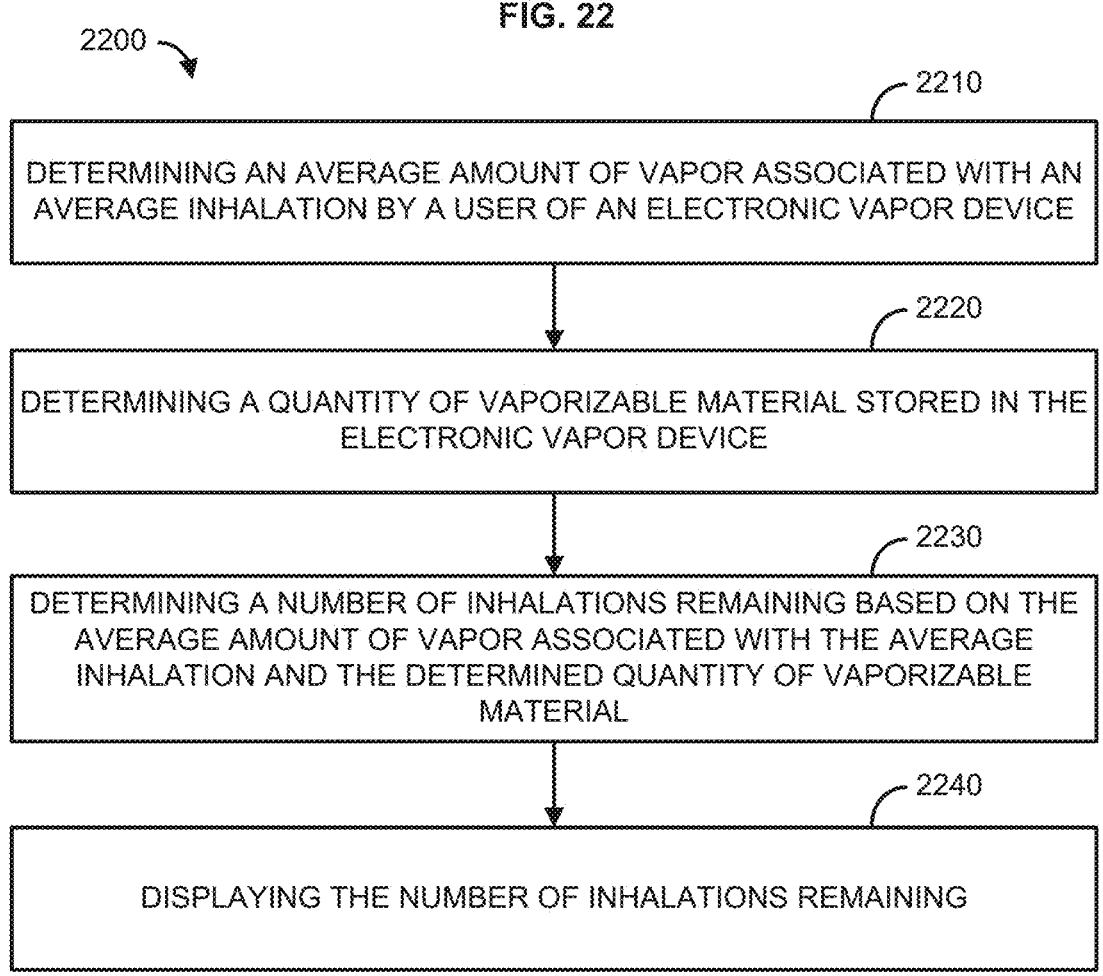

INHALATION PUFF COUNTER GAUGE AND DISPLAY SYSTEM

CROSS REFERENCE TO RELATED PATENT APPLICATION

This application claims priority to U.S. Provisional Application No. 62/198,010 filed Jul. 28, 2015, here incorporated by reference in its entirety.

BACKGROUND

Various electronic vapor (eVapor) devices are known in the art. These eVapor devices typically have a source of the material that is converted into the inhaled vapor. Typically that source is an eLiquid, though it could be a solid that is vaporized or a compressed gas. In any event, in typical eVapor devices, it is difficult to determine with any accuracy how much of the source material remains for consumption, or how long the eVapor device will continue functioning before the source material is exhausted. Without this knowledge, a person vaping may be caught unaware needing to purchase a new eVapor device or replenish the source material. There are also insufficient ways, with current eVapor devices, to regulate the rate of consumption of the source material.

It would be desirable, therefore, to develop new technologies for such applications, that overcomes these and other limitations of the prior art, and enhances the applications, utility and versatility of eVapor devices.

SUMMARY

It is to be understood that both the following general description and the following detailed description are exemplary and explanatory only and are not restrictive.

In an aspect, an apparatus is disclosed comprising a vapor outlet, a container for storing a vaporizable material, a vaporizer component coupled to the container, configured for vaporizing the vaporizable material to generate a vapor and for providing the vapor to the vapor outlet, a sensor coupled to the container for sensing a quantity of the vaporizable material in the container, a processor, configured for, determining an average amount of vapor associated with an average inhalation by a user of the apparatus, receiving the sensed quantity of the vaporizable material from the sensor, determining a number of inhalations remaining based on the quantity of the vaporizable material remaining and the average amount of vapor associated with the average inhalation, and a display component, configured for displaying the number of inhalations remaining.

In an aspect, a method is disclosed comprising determining an average amount of vapor associated with an average inhalation by a user of an electronic vapor device, determining a quantity of vaporizable material stored in the electronic vapor device, determining a number of inhalations remaining based on the average amount of vapor associated with the average inhalation and the determined quantity of vaporizable material, and displaying the number of inhalations remaining.

Additional advantages will be set forth in part in the description which follows or can be learned by practice. The advantages will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The features, nature, and advantages of the present disclosure will become more apparent from the detailed description set forth below when taken in conjunction with the drawings, in which like reference characters are used to identify like elements correspondingly throughout the specification and drawings.

FIG. 21 illustrates an exemplary method;
and
FIG. 22 illustrates an exemplary method.

DETAILED DESCRIPTION

Figure 1:
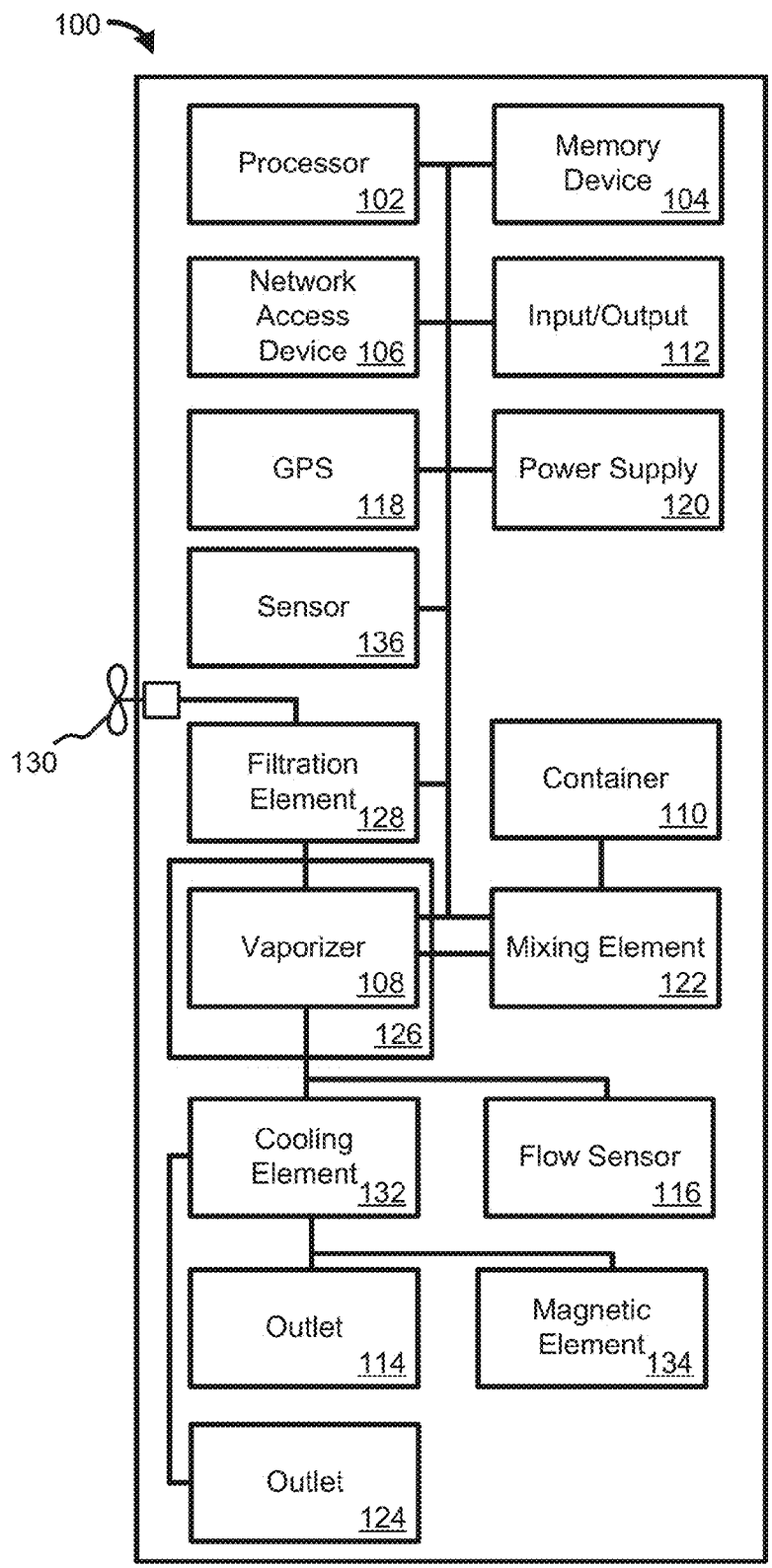
FIG. 1 illustrates a block diagram of an exemplary electronic vapor device.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems can be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium can be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions can be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Various aspects are now described with reference to the drawings. In the following description, for purposes of explanation, numerous specific details are set forth in order to provide a thorough understanding of one or more aspects. It can be evident, however, that the various aspects can be practiced without these specific details. In other instances, well-known structures and devices are shown in block diagram form in order to facilitate describing these aspects, While embodiments of the disclosure are directed to vaporizing devices, it should be appreciated that aspects of the technology can be adapted by one of ordinary skill to nebulizing devices designed to produce an inhalable mist or aerosol.

The present disclosure relates to an eVapor device and the integration of an inhalation puff counter gauge therefor.

In an aspect of the disclosure, an eVapor device is disclosed comprising a vapor dispensing system and a display component. The display component may be configured to visibly indicate how much of an eLiquid remains in an eLiquid reservoir, or how many puffs remaining available.

In one related aspect, the eVapor device further comprises a mechanical eLiquid reservoir level display. In another related aspect, the eVapor device further comprises a sensor and a processor configured to receive sensor data from the sensor.

In a related aspect, the sensor may be configured to generate a signal representative of a quantity of the eLiquid remaining in the eLiquid reservoir. In a related aspect, the sensor may be configured to sense either a volume or a weight of the eLiquid remaining in the eLiquid reservoir.

In a related aspect, the processor is configured to calculate an amount of the eLiquid remaining in the eLiquid reservoir based on the sensor data from the sensor.

In a related aspect, the sensor may be configured to sense at least one of a length, a duration, a volume and a pressure draw of a puff. In a related aspect, the sensor is configured to provide puff data relative to the puff to the processor, and the processor is configured to count a number of puffs and to utilize the puff data to determine a number of puffs remaining in the eVapor device.

In a related aspect, the amount of the eLiquid remaining in the eVapor device is displayed on an outer surface of the eVapor device. In a related aspect, the amount of the eLiquid remaining in the eVapor device is displayed as at least one of a digital readout (e.g., percentage full/empty), shades of colors, intensity of light, or demarcations from full to empty.

In a related aspect, the eVapor device may be further configured to display a relative rate of vaporization of the (liquid (fast, medium or slow) as compared to a user's usual rate, a typical user rate, or a user rate based on a strength measurement of this particular user's puffs.

In a related aspect, the eVapor device may further comprise a gate configured to limit a total vapor amount which may be drawn by a single inhaling action; wherein the processor automatically calculates a puff usage as an exact amount based on known maximum draw from the eVapor device.

In a related aspect, a method of displaying an indication of a remaining quantity of vapor that can be provided by an eVapor device is disclosed. The method may comprise: providing data from sensors to a data processor; determining at said data processor, based on the data, the indication of the remaining quantity of vapor that can be provided by the eVapor device; and displaying the indication of the remaining quantity of vapor that can be provided by the eVapor device.

In a related aspect, the method may further comprise: starting with an expected baseline number of puffs per cartridge; and recalibrating a predicted number of puffs based on an amount of an eLiquid remaining in the eVapor device and base on a number of puffs taken to this point.

FIG. 1 is a block diagram of an exemplary electronic vapor device 100 as described herein. The electronic vapor device 100 can be, for example, an e-cigarette, an e-cigar, an electronic vapor device, a hybrid electronic communication handset coupled/integrated vapor device, a robotic vapor device, a modified vapor device "mod," a micro-sized electronic vapor device, a robotic vapor device, and the like. The vapor device 100 can comprise any suitable housing for enclosing and protecting the various components disclosed herein. The vapor device 100 can comprise a processor 102. The processor 102 can be, or can comprise, any suitable microprocessor or microcontroller, for example, a low-power application-specific controller (ASIC) and/or a field programmable gate array (FPGA) designed or programmed specifically for the task of controlling a device as described herein, or a general purpose central processing unit (CPU), for example, one based on 80×86 architecture as designed by Intel™ or AMD™, or a system-on-a-chip as designed by ARM™. The processor 102 can be coupled (e.g., communicatively, operatively, etc. . . . ) to auxiliary devices or modules of the vapor device 100 using a bus or other coupling. The vapor device 100 can comprise a power supply 110. The power supply 110 can comprise one or more batteries and/or other power storage device (e.g., capacitor) and/or a port for connecting to an external power supply. For example, an external power supply can supply power to the vapor device 100 and a battery can store at least a portion of the supplied power. The one or more batteries can be rechargeable. The one or more batteries can comprise a lithium-ion battery (including thin film lithium ion batteries), a lithium ion polymer battery, a nickel cadmium battery, a nickel metal hydride battery, a leadacid battery, combinations thereof, and the like. In an aspect, the power supply 110 can receive power via a power coupling to a case, wherein the vapor device 100 is stored in the case.

The vapor device 100 can comprise a memory device 104 coupled to the processor 102. The memory device 104 can comprise a random access memory (RAM) configured for storing program instructions and data for execution or processing by the processor 102 during control of the vapor device 100. When the vapor device 100 is powered off or in an inactive state, program instructions and data can be stored in a long-term memory, for example, a non-volatile magnetic optical, or electronic memory storage device (not shown). Either or both of the RAM or the long-term memory can comprise a non-transitory computer-readable medium storing program instructions that, when executed by the processor 102, cause the vapor device 100 to perform all or part of one or more methods and/or operations described herein. Program instructions can be written in any suitable high-level language, for example, C, C++, C# or the Java™, and compiled to produce machine-language code for execution by the processor 102. In an aspect, the memory device 104 can store one or more audio files. The one or more audio files can resemble one or more sounds made by a traditional smoking apparatus when used or when at rest (smoldering) such as a cigar, a cigarette, a joint, a bong, and the like.

In an aspect, the vapor device 100 can comprise a network access device 106 allowing the vapor device 100 to be coupled to one or more ancillary devices (not shown) such as via an access point (not shown) of a wireless telephone network, local area network, or other coupling to a wide area network, for example, the Internet. In that regard, the processor 102 can be configured to share data with the one or more ancillary devices via the network access device 106. The shared data can comprise, for example, usage data and/or operational data of the vapor device 100, a status of the vapor device 100, a status and/or operating condition of one or more the components of the vapor device 100, text to be used in a message, a product order, payment information, and/or any other data. Similarly, the processor 102 can be configured to receive control instructions from the one or more ancillary devices via the network access device 106. For example, a configuration of the vapor device 100, an operation of the vapor device 100, and/or other settings of the vapor device 100, can be controlled by the one or more ancillary devices via the network access device 106. For example, an ancillary device can comprise a server that can provide various services and another ancillary device can comprise a smartphone for controlling operation of the vapor device 100. In some aspects, the smartphone or another ancillary device can be used as a primary input/output of the vapor device 100 such that data is received by the vapor device 100 from the server, transmitted to the smartphone, and output on a display of the smartphone. In an aspect, data transmitted to the ancillary device can comprise a mixture of vaporizable material and/or instructions to release vapor. For example, the vapor device 100 can be configured to determine a need for the release of vapor into the atmosphere. The vapor device 100 can provide instructions via the network access device 106 to an ancillary device (e.g., another vapor device) to release vapor into the atmosphere.

In an aspect, data can be shared anonymously. The data can be shared over a transient data session with an ancillary device. The transient data session can comprise a session limit. The session limit can be based on one or more of a number of puffs, a time limit, and a total quantity of vaporizable material. The data can comprise usage data and/or a usage profile.

In an aspect, the vapor device 100 can also comprise an input/output device 112 coupled to one or more of the processor 102, the vaporizer 108, the network access device 106, and/or any other electronic component of the vapor device 100. Input can be received from a user or another device and/or output can be provided to a user or another device via the input/output device 112. The input/output device 112 can comprise any combinations of input and/or output devices such as buttons, knobs, keyboards, touchscreens, displays, light-emitting elements, a speaker, and/or the like. In an aspect, the input/output device 112 can comprise an interface port (not shown) such as a wired interface, for example a serial port, a Universal Serial Bus (USB) port, an Ethernet port, or other suitable wired connection. The input/output device 112 can comprise a wireless interface (not shown), for example a transceiver using any suitable wireless protocol, for example WiFi (IEEE 802.11), Bluetooth®, infrared, or other wireless standard. For example, the input/output device 112 can communicate with a smartphone via Bluetooth® such that the inputs and outputs of the smartphone can be used by the user to interface with the vapor device 100. In an aspect, the input/output device 112 can comprise a user interface. The user interface user interface can comprise at least one of lighted signal lights, gauges, boxes, forms, check marks, avatars, visual images, graphic designs, lists, active calibrations or calculations, 2D interactive fractal designs, 3D fractal designs, 2D and/or 3D representations of vapor devices and other interface system functions, in an aspect, regardless of whether the vapor device 100 comprises a display, the vapor device 100 can communicate with an authorized electronic device to provide a user interface via the authorized electronic device that controls functionality of the vapor device 100.

In an aspect, the input/output device 112 can be coupled to an adaptor device to receive power and/or send/receive data signals from an electronic device. For example, the input/output device 112 can be configured to receive power from the adaptor device and provide the power to the power supply 120 to recharge one or more batteries. The input/output device 112 can exchange data signals received from the adaptor device with the processor 102 to cause the processor to execute one or more functions.

In an aspect, the input/output device 112 can comprise a touchscreen interface and/or a biometric interface. For example, the input/output device 112 can include controls that allow the user to interact with and input information and commands to the vapor device 100. For example, with respect to the embodiments described herein, the input/output device 112 can comprise a touch screen display. The input/output device 112 can be configured to provide the content of the exemplary screen shots shown herein, which are presented to the user via the functionality of a display. User inputs to the touch screen display are processed by, for example, the input/output device 112 and/or the processor 102. The input/output device 112 can also be configured to process new content and communications to the system 100. The touch screen display can provide controls and menu selections, and process commands and requests. Application and content objects can be provided by the touch screen display. The input/output device 112 and/or the processor 102 can receive and interpret commands and other inputs, interface with the other components of the vapor device 100 as required. In an aspect, the touch screen display can enable a user to lock, unlock, or partially unlock or lock, the vapor device 100. The vapor device 100 can be transitioned from an idle and locked state into an open state by, for example, moving or dragging an icon on the screen of the vapor device 100, entering in a password/passcode, and the like.

The input/output device 112 can thus display information to a user such as a puff count, an amount of vaporizable material remaining in the container 110, battery remaining, signal strength, combinations thereof, and the like.

In an aspect, the input/output device 112 can comprise an audio user interface. A microphone can be configured to receive audio signals and relay the audio signals to the input/output device 112. The audio user interface can be any interface that is responsive to voice or other audio commands. The audio user interface can be configured to cause an action, activate a function, etc., by the vapor device 100 (or another device) based on a received voice (or other audio) command. The audio user interface can be deployed directly on the vapor device 100 and/or via other electronic devices (e.g., electronic communication devices such as a smartphone, a smart watch, a tablet, a laptop, a dedicated audio user interface device, and the like). The audio user interface can be used to control the functionality of the vapor device 100. Such functionality can comprise, but is not limited to, custom mixing of vaporizable material (e.g., eLiquids) and/or ordering custom made eLiquid combinations via an eCommerce service (e.g., specifications of a user's custom flavor mix can be transmitted to an eCommerce service, so that an eLiquid provider can mix a custom eLiquid cartridge for the user). The user can then reorder the custom flavor mix anytime or even send it to friends as a present, all via the audio user interface. The user can also send via voice command a mixing recipe to other users. The other users can utilize the mixing recipe (e.g., via an electronic vapor device having multiple chambers for eLiquid) to sample the same mix via an auto-order to the other users' devices to create the received mixing recipe. A custom mix can be given a title by a user and/or can be defined by parts (e.g., one part liquid A and two parts liquid B). The audio user interface can also be utilized to create and send a custom message to other users, to join eVapor clubs, to receive eVapor chart information, and to conduct a wide range of social networking, location services and eCommerce activities. The audio user interface can be secured via a password (e.g., audio password) which features at least one of tone recognition, other voice quality recognition and, in one aspect, can utilize at least one special cadence as part of the audio password.

The input/output device 112 can be configured to interface with other devices, for example, exercise equipment, computing equipment, communications devices and/or other vapor devices, for example, via a physical or wireless connection. The input/output device 112 can thus exchange data with the other equipment. A user may sync their vapor device 100 to other devices, via programming attributes such as mutual dynamic link library (DLL) 'hooks'. This enables a smooth exchange of data between devices, as can a web interface between devices. The input/output device 112 can be used to upload one or more profiles to the other devices. Using exercise equipment as an example, the one or more profiles can comprise data such as workout routine data (e.g., timing, distance, settings, heart rate, etc. . . . ) and vaping data (e.g., eLiquid mixture recipes, supplements, vaping timing, etc. . . . ). Data from usage of previous exercise sessions can be archived and shared with new electronic vapor devices and/or new exercise equipment so that history and preferences may remain continuous and provide for simplified device settings, default settings, and recommended settings based upon the synthesis of current and archival data.

In an aspect, the vapor device 100 can comprise a vaporizer 108. The vaporizer 108 can be coupled to one or more containers 110. Each of the one or more containers 110 can be configured to hold one or more vaporizable or non-vaporizable materials. The vaporizer 108 can receive the one or more vaporizable or non-vaporizable materials from the one or more containers 110 and heat the one or more vaporizable or non-vaporizable materials until the one or more vaporizable or non-vaporizable materials achieve a vapor state. In various embodiments, instead of heating the one or more vaporizable or non-vaporizable materials, the vaporizer 108 can nebulize or otherwise cause the one or more vaporizable or non-vaporizable materials in the one or more containers 110 to reduce in size into particulates. In various embodiments, the one or more containers 110 can comprise a compressed liquid that can be released to the vaporizer 108 via a valve or another mechanism, in various embodiments, the one or more containers 110 can comprise a wick (not shown) through which the one or more vaporizable or non-vaporizable materials is drawn to the vaporizer 108. The one or more containers 110 can be made of any suitable structural material, such as, an organic polymer, metal, ceramic, composite, or glass material. In an aspect, the vaporizable material can comprise one or more of, a Propylene Glycol (PG) based liquid, a Vegetable Glycerin (VG) based liquid, a water based liquid, combinations thereof, and the like. In an aspect, the vaporizable material can comprise Tetrahydrocannabinol (THC), Cannabidiol (CBD), cannabinol (CBN), combinations thereof, and the like. In a further aspect, the vaporizable material can comprise an extract from *duboisia hopwoodii*.

In an aspect, the vapor device 100 can comprise a mixing element 122. The mixing element 122 can be coupled to the processor 102 to receive one or more control signals. The one or more control signals can instruct the mixing element 122 to withdraw specific amounts of fluid from the one or more containers 110. The mixing element can, in response to a control signal from the processor 102, withdraw select quantities of vaporizable material in order to create a customized mixture of different types of vaporizable material. The liquid withdrawn by the mixing element 122 can be provided to the vaporizer 108.

The vapor device 100 may include a plurality of valves, wherein a respective one of the valves is interposed between the vaporizer 108 and a corresponding one of outlet 114 and/or outlet 124 (e.g., one or more inlets of flexible tubes). Each of the valves may control a flow rate through a respective one of the flexible tubes. For example, each of the plurality of valves may include a lumen of adjustable effective diameter for controlling a rate of vapor flow there through. The assembly may include an actuator, for example a motor, configured to independently adjust respective ones of the valves under control of the processor. The actuator may include a handle or the like to permit manual valve adjustment by the user. The motor or actuator can be coupled to a uniform flange or rotating spindle coupled to the valves and configured for controlling the flow of vapor through each of the valves. Each of the valves can be adjusted so that each of the flexible tubes accommodate the same (equal) rate of vapor flow, or different rates of flow. The processor 102 can be configured to determine settings for the respective ones of the valves each based on at least one of: a selected user preference or an amount of suction applied to a corresponding one of the flexible tubes. A user preference can be determined by the processor 102 based on a user input, which can be electrical or mechanical. An electrical input can be provided, for example, by a touchscreen, keypad, switch, or potentiometer (e.g., the input/output 112). A mechanical input can be provided, for example, by applying suction to a mouthpiece of a tube, turning a valve handle, or moving a gate piece.

The vapor device 100 may further include at least one light-emitting element positioned on or near each of the outlet 114 and/or the outlet 124 (e.g., flexible tubes) and configured to illuminate in response to suction applied to the outlet 114 and/or the outlet 124. At least one of an intensity of illumination or a pattern of alternating between an illuminated state and a non-illuminated state can be adjusted based on an amount of suction. One or more of the at least one light-emitting element, or another light-emitting element, may illuminate based on an amount of vaporizable material available. For example, at least one of an intensity of illumination or a pattern of alternating between an illuminated state and a non-illuminated state can be adjusted based on an amount of the vaporizable material within the vapor device 100. In some aspects, the vapor device 100 may include at least two light-emitting elements positioned on each of the outlet 114 and/or the outlet 124. Each of the at least two light-emitting elements may include a first light-emitting element and an outer light-emitting element positioned nearer the end of the outlet 114 and/or the outlet 124 than the first light-emitting element. Illumination of the at least two light-emitting elements may indicate a direction of a flow of vapor.

In an aspect, input from the input/output device 112 can be used by the processor 102 to cause the vaporizer 108 to vaporize the one or more vaporizable or non-vaporizable materials. For example, a user can depress a button, causing the vaporizer 108 to start vaporizing the one or more vaporizable or non-vaporizable materials. A user can then draw on an outlet 114 to inhale the vapor. In various aspects, the processor 102 can control vapor production and flow to the outlet 114 based on data detected by a flow sensor 116. For example, as a user draws on the outlet 114, the flow sensor 116 can detect the resultant pressure and provide a signal to the processor 102. In response, the processor 102 can cause the vaporizer 108 to begin vaporizing the one or more vaporizable or non-vaporizable materials, terminate vaporizing the one or more vaporizable or non-vaporizable materials, and/or otherwise adjust a rate of vaporization of the one or more vaporizable or non-vaporizable materials. In another aspect, the vapor can exit the vapor device 100 through an outlet 124. The outlet 124 differs from the outlet 114 in that the outlet 124 can be configured to distribute the vapor into the local atmosphere, rather than being inhaled by a user. In an aspect, vapor exiting the outlet 124 can be at least one of aromatic, medicinal, recreational, and/or wellness related. In an aspect, the vapor device 100 can comprise any number of outlets. In an aspect, the outlet 114 and/or the outlet 124 can comprise at least one flexible tube. For example, a lumen of the at least one flexible tube can be in fluid communication with one or more components (e.g., a first container) of the vapor device 100 to provide vapor to a user. In more detailed aspects, the at least one flexible tube may include at least two flexible tubes. Accordingly, the vapor device 100 may further include a second container configured to receive a second vaporizable material such that a first flexible tube can receive vapor from the first vaporizable material and a second flexible tube receive vapor from the second vaporizable material. For example, the at least two flexible tubes can be in fluid communication with the first container and with second container. The vapor device 100 may include an electrical or mechanical sensor configured to sense a pressure level, and therefore suction, in an interior of the flexible tube. Application of suction may activate the vapor device 100 and cause vapor to flow.

In another aspect, the vapor device 100 can comprise a piezoelectric dispersing element. In some aspects, the piezoelectric dispersing element can be charged by a battery, and can be driven by a processor on a circuit board. The circuit board can be produced using a polyimide such as Kapton, or other suitable material. The piezoelectric dispersing element can comprise a thin metal disc which causes dispersion of the fluid fed into the dispersing element via the wick or other soaked piece of organic material through vibration. Once in contact with the piezoelectric dispersing element, the vaporizable material (e.g., fluid) can be vaporized (e.g., turned into vapor or mist) and the vapor can be dispersed via a system pump and/or a sucking action of the user, in some aspects, the piezoelectric dispersing element can cause dispersion of the vaporizable material by producing ultrasonic vibrations. An electric field applied to a piezoelectric material within the piezoelectric element can cause ultrasonic expansion and contraction of the piezoelectric material, resulting in ultrasonic vibrations to the disc. The ultrasonic vibrations can cause the vaporizable material to disperse, thus forming a vapor or mist from the vaporizable material.

In some aspects, the connection between a power supply and the piezoelectric dispersing element can be facilitated using one or more conductive coils. The conductive coils can provide an ultrasonic power input to the piezoelectric dispersing element. For example, the signal carried by the coil can have a frequency of approximately 107.8 kHz. In some aspects, the piezoelectric dispersing element can comprise a piezoelectric dispersing element that can receive the ultrasonic signal transmitted from the power supply through the coils, and can cause vaporization of the vaporizable liquid by producing ultrasonic vibrations. An ultrasonic electric field applied to a piezoelectric material within the piezoelectric element causes ultrasonic expansion and contraction of the piezoelectric material, resulting in ultrasonic vibrations according to the frequency of the signal. The vaporizable liquid can be vibrated by the ultrasonic energy produced by the piezoelectric dispersing element, thus causing dispersal and/or atomization of the liquid. In an aspect, the vapor device 100 can be configured to permit a user to select between using a heating element of the vaporizer 108 or the piezoelectric dispersing element. In another aspect, the vapor device 100 can be configured to permit a user to utilize both a heating element of the vaporizer 108 and the piezoelectric dispersing element.

In an aspect, the vapor device 100 can comprise a heating casing 126. The heating casing 126 can enclose one or more of the container 110, the vaporizer 108, and/or the outlet 114. In a further aspect, the heating casing 126 can enclose one or more components that make up the container 110, the vaporizer 108, and/or the outlet 114. The heating casing 126 can be made of ceramic, metal, and/or porcelain. The heating casing 126 can have varying thickness. In an aspect, the heating casing 126 can be coupled to the power supply 120 to receive power to heat the heating casing 126. In another aspect, the heating casing 126 can be coupled to the vaporizer 108 to heat the heating casing 126. In another aspect, the heating casing 126 can serve an insulation role.

In an aspect, the vapor device 100 can comprise a filtration element 128. The filtration element 128 can be configured to remove (e.g., filter, purify, etc.) contaminants from air entering the vapor device 100. The filtration element 128 can optionally comprise a fan 130 to assist in delivering air to the filtration element 128. The vapor device 100 can be configured to intake air into the filtration element 128, filter the air, and pass the filtered air to the vaporizer 108 for use in vaporizing the one or more vaporizable or non-vaporizable materials. In another aspect, the vapor device 100 can be configured to intake air into the filtration element 128, filter the air, and bypass the vaporizer 108 by passing the filtered air directly to the outlet 114 for inhalation by a user.

In an aspect, the filtration element 128 can comprise cotton, polymer, wool, satin, meta materials and the like. The filtration element 128 can comprise a filter material that at least one airborne particle and/or undesired gas by a mechanical mechanism, an electrical mechanism, and/or a chemical mechanism. The filter material can comprise one or more pieces of a filter fabric that can filter out one or more airborne particles and/or gasses. The filter fabric can be a woven and/or non-woven material. The filter fabric can be made from natural fibers (e.g., cotton, wool, etc.) and/or from synthetic fibers (e.g., polyester, nylon, polypropylene, etc.). The thickness of the filter fabric can be varied depending on the desired filter efficiencies and/or the region of the apparel where the filter fabric is to be used. The filter fabric can be designed to filter airborne particles and/or gasses by mechanical mechanisms (e.g., weave density), by electrical mechanisms (e.g., charged fibers, charged metals, etc.), and/or by chemical mechanisms (e.g., absorptive charcoal particles, adsorptive materials, etc.). In as aspect, the filter material can comprise electrically charged fibers such as, but not limited to, FILTRETE by 3M. In another aspect, the filter material can comprise a high density material similar to material used for medical masks which are used by medical personnel in doctors offices, hospitals, and the like. In an aspect, the filter material can be treated with an anti-bacterial solution and/or otherwise made from anti-bacterial materials. In another aspect, the filtration element 128 can comprise electrostatic plates, ultraviolet light, a HEPA filter, combinations thereof, and the like.

In an aspect, the vapor device 100 can comprise a cooling element 132. The cooling element 132 can be configured to cool vapor exiting the vaporizer 108 prior to passing through the outlet 114. The cooling element 132 can cool vapor by utilizing air or space within the vapor device 100. The air used by the cooling element 132 can be either static (existing in the vapor device 100) or drawn into an intake and through the cooling element 132 and the vapor device 100. The intake can comprise various pumping, pressure, fan, or other intake systems for drawing air into the cooling element 132. In an aspect, the cooling element 132 can reside separately or can be integrated the vaporizer 108. The cooling element 132 can be a single cooled electronic element within a tube or space and/or the cooling element 132 can be configured as a series of coils or as a grid like structure. The materials for the cooling element 132 can be metal, liquid, polymer, natural substance, synthetic substance, air, or any combination thereof. The cooling element 132 can be powered by the power supply 120, by a separate battery (not shown), or other power source (not shown) including the use of excess heat energy created by the vaporizer 108 being converted to energy used for cooling by virtue of a small turbine or pressure system to convert the energy. Heat differentials between the vaporizer 108 and the cooling element 132 can also be converted to energy utilizing commonly known geothermal energy principles.

In an aspect, the vapor device 100 can comprise a magnetic element 134. For example, the magnetic element 134 can comprise an electromagnet, a ceramic magnet, a ferrite magnet, and/or the like. The magnetic element 134 can be configured to apply a magnetic field to air as it is brought into the vapor device 100, in the vaporizer 108, and/or as vapor exits the outlet 114.

The input/output device 112 can be used to select whether vapor exiting the outlet 114 should be cooled or not cooled and/or heated or not heated and/or magnetized or not magnetized. For example, a user can use the input/output device 112 to selectively cool vapor at times and not cool vapor at other times. The user can use the input/output device 112 to selectively heat vapor at times and not heat vapor at other times. The user can use the input/output device 112 to selectively magnetize vapor at times and not magnetize vapor at other times. The user can further use the input/output device 112 to select a desired smoothness, temperature, and/or range of temperatures. The user can adjust the temperature of the vapor by selecting or clicking on a clickable setting on a part of the vapor device 100. The user can use, for example, a graphical user interface (GUI) or a mechanical input enabled by virtue of clicking a rotational mechanism at either end of the vapor device 100.

In an aspect, cooling control can be set within the vapor device 100 settings via the processor 102 and system software (e.g., dynamic linked libraries). The memory 104 can store settings. Suggestions and remote settings can be communicated to and/or from the vapor device 100 via the input/output device 112 and/or the network access device 106. Cooling of the vapor can be set and calibrated between heating and cooling mechanisms to what is deemed an ideal temperature by the manufacturer of the vapor device 100 for the vaporizable material. For example, a temperature can be set such that resultant vapor delivers the coolest feeling to the average user but does not present any health risk to the user by virtue of the vapor being too cold, including the potential for rapid expansion of cooled vapor within the lungs and the damaging of tissue by vapor which has been cooled to a temperature which may cause frostbite like symptoms.

In an aspect, the vapor device 100 can be configured to receive air, smoke, vapor or other material and analyze the contents of the air, smoke, vapor or other material using one or more sensors 136 in order to at least one of analyze, classify, compare, validate, refute, and/or catalogue the same. A result of the analysis can be, for example, an identification of at least one of medical, recreational, homeopathic, olfactory elements, spices, other cooking ingredients, ingredients analysis from food products, fuel analysis, pharmaceutical analysis, genetic modification testing analysis, dating, fossil and/or relic analysis and the like. The vapor device 100 can pass utilize, for example, mass spectrometry, PH testing, genetic testing, particle and/or cellular testing, sensor based testing and other diagnostic and wellness testing either via locally available components or by transmitting data to a remote system for analysis.

In another aspect, the one or more sensors 136 can determine a status of one or more components of the vapor device 100 such as the vaporizer 108. The status can be reported to the processor 102. The processor 102 can make one or more determinations and initiate one or more actions based on the status of one or more components of the vapor device 100. In an aspect, the one or more sensors 136 can be configured for determining an amount of vaporizable material stored in the one or more containers 110. The one or more sensors 136 can be configured for determining one or more characteristics of an inhalation of a user also referred to as a "puff"). For example, a length of an inhalation, an amount of pressure of an inhalation, a flow rate of an inhalation from the vapor outlet, or a rate of vaporization of the vaporizable material. The one or more sensors 136 can provide such information to the processor 102. The processor 102 can make one or more determinations based on the information, such as how much vaporizable material is vaporized for an average inhalation by a user. The processor 102 can then determine how many average inhalations can be made with the amount of vaporizable material remaining in the one or more containers 110.

In another example, the processor 102 can determine that the status of the vaporizer 108 is "on" but is not presently generating vapor for inhalation by a user. As a result, the vaporizer 108 can cause the vaporizer 108 to generate an amount of vapor to be expelled via the outlet 114 or the outlet 124 (whichever is not used for user inhalation). The processor 102 can thus simulate a traditional smoking experience by expelling vapor from an end of the vapor device 100 opposite the end for user inhalation. Similarly, the processor 102 can determine that the status of the vaporizer 108 is "on" and is presently generating vapor for inhalation by a user. As a result, the vaporizer 108 can cause a light element of input/output device 112 to emit light at an end of the vapor device 100 opposite that used for user inhalation. The processor 102 can thus simulate a traditional smoking experience by simulating burning material from an end of the vapor device 100 opposite the end for user inhalation. The processor 102 can further determine one or more characteristics to further customize the smoking experience. For example, a first characteristic can comprise at least one of a tone, a volume, a pitch, a number of harmonics, a frequency of harmonics, a fade in, or a fade out for one or more of the audio files whereas a second characteristic can comprise at least one of a color, an intensity, a pattern, a fade in, or a fade out for the light element.

In an aspect, a user can create a custom scent by using the vapor device 100 to intake air elements, where the vapor device 100 (or third-party networked device) analyzes the olfactory elements and/or biological elements within the sample and then formulates a replica scent within the vapor device 100 (or third-party networked device) that can be accessed by the user instantly, at a later date, with the ability to purchase this custom scent from a networked ecommerce portal.

The vapor device 100 can comprise an intake. The intake can be receptacle for receiving air from an area surrounding the intake. In another aspect, the intake can be a receptacle for receiving at least a portion of a detachable vaporizer. In an aspect, the intake can form an airtight seal with a detachable vaporizer. In another aspect, the intake can form a non-airtight seal with a detachable vaporizer. The vapor device 100 can comprise a pump (or other similar suction mechanism) coupled to the intake. The pump can be configured to draw air from an area surrounding the intake. In an aspect, one or more fan 130 can be configured to assist the pump in drawing air into the vapor device 100.

Air drawn in by the pump through the intake 138 can be passed to an analysis chamber. The analysis chamber can be a receptacle within the vapor device 100 configured for holding the drawn air and for exposing the air to one or more sensors 136 in order to at least one of analyze, classify, compare, validate, refute, and/or catalogue the same. A result of the analysis can be, for example, a performance indicator for a detachable vaporizer (any measure indicative of whether a detachable vaporizer is performing as expected), an identification of at least one of medical, recreational, homeopathic, olfactory elements, spices, other cooking ingredients, ingredients analysis from food products, fuel analysis, pharmaceutical analysis, and the like. The vapor device 100 can utilize, for example, mass spectrometry, gas chromatography, PH testing, particle and/or cellular testing, sensor based testing and other diagnostic and wellness testing either via locally available components or by transmitting data to a remote system for analysis. The mass spectrometry and/or gas chromatography systems disclosed herein can be implemented in a compact form factor, as is known in the an. Mass spectrometry is an analytical chemistry technique that identifies an amount and type of chemicals present in a sample by measuring the mass-to-charge ratio and abundance of gas-phase ions. A mass spectrum (plural spectra) is a plot of the ion signal as a function of the mass-to-charge ratio. The spectra are used to determine the elemental or isotopic signature of a sample, the masses of particles and of molecules, and to elucidate the chemical structures of molecules, such as peptides and other chemical compounds. Mass spectrometry works by ionizing chemical compounds to generate charged molecules or molecule fragments and measuring their mass-to-charge ratios.

In a typical mass spectrometry procedure, a sample of the drawn air, is ionized, for example by bombarding the air/vapor with electrons. This can cause some of the sample's molecules to break into charged fragments. These ions are then separated according to their mass-to-charge ratio, typically by accelerating them and subjecting them to an electric or magnetic field: ions of the same mass-to-charge ratio will undergo the same amount of deflection. The ions are detected by a mechanism capable of detecting charged particles, such as an electron multiplier. Results are displayed as spectra of the relative abundance of detected ions as a function of the mass-to-charge ratio. The atoms or molecules in the sample can be identified by correlating known masses to the identified masses stored on the memory device 104 or through a characteristic fragmentation pattern. Thus, a composition of the drawn air can be determined.

In another aspect, nanosensor technology using nanostructures: single walled carbon nanotubes (SWNTs), combined with a silicon-based microfabrication and micromachining process can be used. This technology provides a sensor array that can accommodate different nanostructures for specific applications with the advantages of high sensitivity, low power consumption, compactness, high yield and low cost. This platform provides an array of sensing elements for chemical detection. Each sensor in the array can comprise a nanostructure—chosen from many different categories of sensing material—and an interdigitated electrode (IDE) as a transducer. It is one type of electrochemical sensor that implies the transfer of charge from one electrode to another. This means that at least two electrodes constitute an electrochemical cell to form a closed electrical circuit. Due to the interaction between nanotube devices and gas molecules, the electron configuration is changed in the nanostructured sensing device, therefore, the changes in the electronic signal such as current or voltage were observed before and during the exposure of gas species (such as NO2, NH3, etc.). By measuring the conductivity change of the CNT device, the concentration of the chemical species, such as gas molecules in the air/vapor drawn from the vapor device 100, can be measured.

In another aspect, the one or more sensors 136 can be configured to sense negative environmental conditions (e.g., adverse weather, smoke, fire, chemicals (e.g., such as CO2 or formaldehyde), adverse pollution, and/or disease outbreaks, and the like). The one or more sensors 136 can comprise one or more of, a biochemical/chemical sensor, a thermal sensor, a radiation sensor, a mechanical sensor, an optical sensor, a mechanical sensor, a magnetic sensor, an electrical sensor, combinations thereof and the like. The biochemical/chemical sensor can be configured to detect one or more biochemical/chemicals causing a negative environmental condition such as, but not limited to, smoke, a vapor, a gas, a liquid, a solid, an odor, combinations thereof, and/or the like. The biochemical/chemical sensor can comprise one or more of a mass spectrometer, a conducting/nonconducting regions sensor, a SAW sensor, a quartz microbalance sensor, a conductive composite sensor, a chemiresitor, a metal oxide gas sensor, an organic gas sensor, a MOSFET, a piezoelectric device, an infrared sensor, a sintered metal oxide sensor, a Pd-gate MOSFET, a metal FET structure, a electrochemical cell, a conducting polymer sensor, a catalytic gas sensor, an organic semiconducting gas sensor, a solid electrolyte gas sensors, a piezoelectric quartz crystal sensor, and/or combinations thereof.

A semiconductor sensor can be configured to detect gases by a chemical reaction that takes place when the gas comes in direct contact with the sensor. Tin dioxide is the most common material used in semiconductor sensors, and the electrical resistance in the sensor is decreased when it comes in contact with the monitored gas. The resistance of the tin dioxide is typically around 50 k$\Omega$ in air but can drop to around 3.5 k$\Omega$ in the presence of 1% methane. This change in resistance is used to calculate the gas concentration. Semiconductor sensors can be commonly used to detect hydrogen, oxygen, alcohol vapor, and harmful gases such as carbon monoxide. A semiconductor sensors can be used as a carbon monoxide sensors. A semiconductor sensor can be used as a breathalyzers. Because the sensor must come in contact with the gas to detect it, semiconductor sensors work over a smaller distance than infrared point or ultrasonic detectors.

The thermal sensor can be configured to detect temperature, heat, heat flow, entropy, heat capacity, combinations thereof, and the like. Exemplary thermal sensors include, but are not limited to, thermocouples, such as a semiconducting thermocouples, noise thermometry, thermoswitches, thermistors, metal thermoresistors, semiconducting thermoresistors, thermodiodes, thermotransistors, calorimeters, thermometers, indicators, and fiber optics.

The radiation sensor can be configured to detect gamma rays, X-rays, ultra-violet rays, visible, infrared, microwaves and radio waves. Exemplary radiation sensors include, but are not limited to, nuclear radiation microsensors, such as scintillation counters and solid state detectors, ultra-violet, visible and near infrared radiation microsensors, such as photoconductive cells, photodiodes, phototransistors, infrared radiation microsensors, such as photoconductive IR sensors and pyroelectric sensors.

The optical sensor can be configured to detect visible, near infrared, and infrared waves. The mechanical sensor can be configured to detect displacement, velocity, acceleration, force, torque, pressure, mass, flow, acoustic wavelength, and amplitude. Exemplary mechanical sensors include, but are not limited to, displacement microsensors, capacitive and inductive displacement sensors, optical displacement sensors, ultrasonic displacement sensors, pyroelectric, velocity and flow microsensors, transistor flow microsensors, acceleration microsensors, piezoresistive microaccelerometers, force, pressure and strain microsensors and piezoelectric crystal sensors. The magnetic sensor can be configured to detect magnetic field, flux, magnetic moment, magnetization, and magnetic permeability. The electrical sensor can be configured to detect charge, current, voltage, resistance, conductance, capacitance, inductance, dielectric permittivity, polarization and frequency.

Upon sensing a negative environmental condition, the one or more sensors 122 can provide data to the processor 102 to determine the nature of the negative environmental condition and to generate/transmit one or more alerts based on the negative environmental condition. The one or more alerts can be deployed to the vapor device 100 user's wireless device and/or synced accounts. For example, the network device access device 106 can be used to transmit the one or more alerts directly (e.g., via Bluetooth®) to a user's smartphone to provide information to the user. In another aspect, the network access device 106 can be used to transmit sensed information and/or the one or more alerts to a remote server for use in syncing one or more other devices used by the user (e.g., other vapor devices, other electronic devices (smartphones, tablets, laptops, etc. . . . ). In another aspect, the one or more alerts can be provided to the user of the vapor device 100 via vibrations, audio, colors, and the like deployed from the mask, for example through the input/output device 112. For example, the input/output device 112 can comprise a small vibrating motor to alert the user to one or more sensed conditions via tactile sensation. In another example, the input/output device 112 can comprise one or more LED's of various colors to provide visual information to the user. In another example, the input/output device 112 can comprise one or more speakers that can provide audio information to the user. For example, various patterns of beeps, sounds, and/or voice recordings can be utilized to provide the audio information to the user. In another example, the input/output device 112 can comprise an LCD screen/touchscreen that provides a summary and/or detailed information regarding the negative environmental condition and/or the one or more alerts.

In another aspect, upon sensing a negative environmental condition, the one or more sensors 136 can provide data to the processor 102 to determine the nature of the negative environmental condition and to provide a recommendation for mitigating and/or to actively mitigate the negative environmental condition. Mitigating the negative environmental conditions can comprise, for example, applying a filtration system, a fan, a fire suppression system, engaging a HVAC system, and/or one or more vaporizable and/or non-vaporizable materials. The processor 102 can access a database stored in the memory device 104 to make such a determination or the network device 106 can be used to request information from a server to verify the sensor findings. In an aspect, the server can provide an analysis service to the vapor device 100. For example, the server can analyze data sent by the vapor device 100 based on a reading from the one or more sensors 136. The server can determine and transmit one or more recommendations to the vapor device 100 to mitigate the sensed negative environmental condition. The vapor device 100 can use the one or more recommendations to activate a filtration system, a fan, a tire suppression system engaging a HVAC system, and/or to vaporize one or more vaporizable or non-vaporizable materials to assist in countering effects from the negative environmental condition.

In an aspect, the vapor device 100 can comprise a global positioning system (GPS) unit 118. The GPS 118 can detect a current location of the device 100. In some aspects, a user can request access to one or more services that rely on a current location of the user. For example, the processor 102 can receive location data from the GPS 118, convert it to usable data, and transmit the usable data to the one or more services via the network access device 106. GPS unit 118 can receive position information from a constellation of satellites operated by the U.S. Department of Defense. Alternately, the GPS unit 118 can be a GLONASS receiver operated by the Russian Federation Ministry of Defense, or any other positioning device capable of providing accurate location information (for example, LORAN, inertial navigation, and the like). The GPS unit 118 can contain additional logic, either software, hardware or both to receive the Wide Area Augmentation System (WAAS) signals, operated by the Federal Aviation Administration, to correct dithering errors and provide the most accurate location possible. Overall accuracy of the positioning equipment subsystem containing WAAS is generally in the two meter range.

Figure 2:
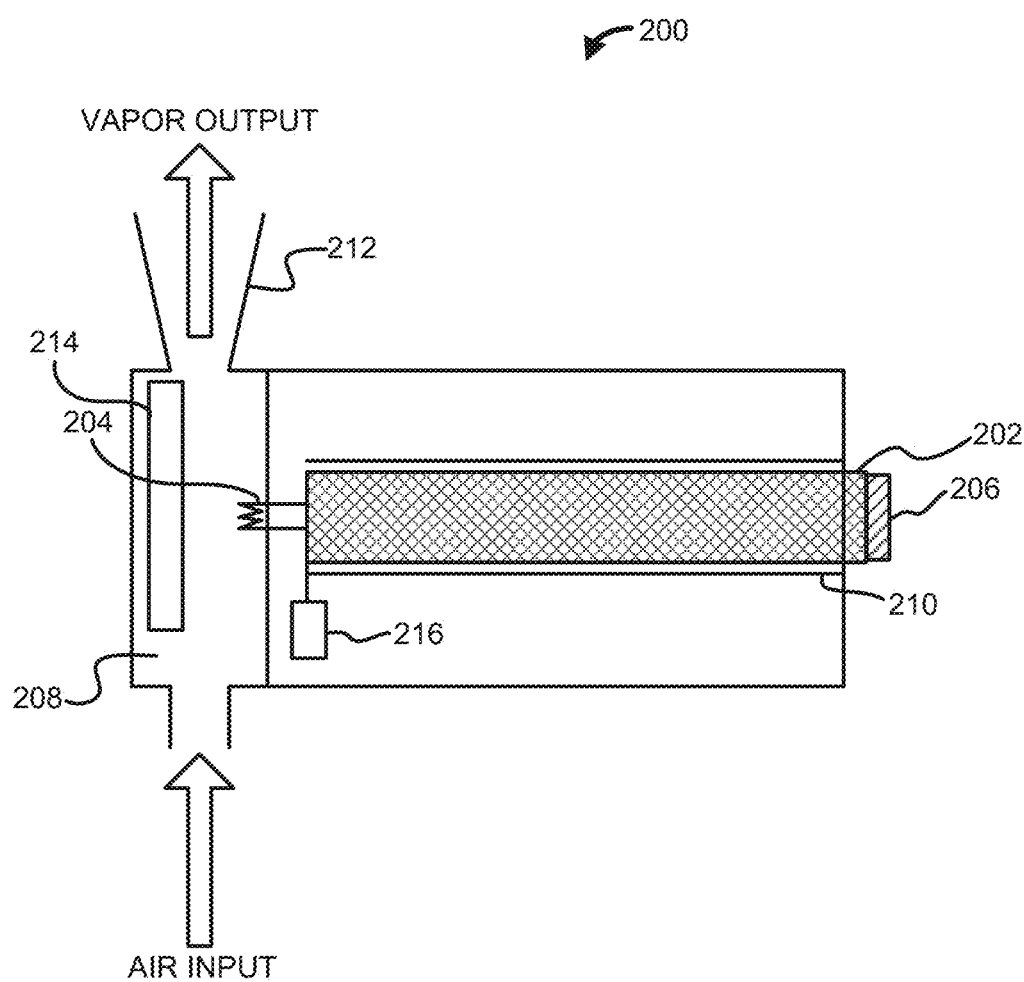
FIG. 2 illustrates an exemplary vaporizer.

FIG. 2 illustrates an exemplary vaporizer 200. The vaporizer 200 can be, for example, an e-cigarette, an e-cigar, an electronic vapor device, a hybrid electronic communication handset coupled/integrated vapor device, a robotic vapor device, a modified vapor device "mod," a micro-sized electronic vapor device, a robotic vapor device, and the like. The vaporizer 200 can be used internally of the vapor device 100 or can be a separate device. For example, the vaporizer 200 can be used in place of the vaporizer 108.

The vaporizer 200 can comprise or be coupled to one or more containers 202 containing a vaporizable material, for example a fluid. For example, coupling between the vaporizer 200 and the one or more containers 202 can be via a wick 204, via a valve, or by some other structure. Coupling can operate independently of gravity, such as by capillary action or pressure drop through a valve. The vaporizer 200 can be configured to vaporize the vaporizable material from the one or more containers 202 at controlled rates in response to mechanical input from a component of the vapor device 100, and/or in response to control signals from the processor 102 or another component. Vaporizable material (e.g., fluid) can be supplied by one or more replaceable cartridges 206. In an aspect the vaporizable material can comprise aromatic elements. In an aspect, the aromatic elements can be medicinal, recreational, and/or wellness related. The aromatic element can include, but is not limited to, at least one of lavender or other floral aromatic eLiquids, mint, menthol, herbal soil or geologic, plant based, name brand perfumes, custom mixed perfume formulated inside the vapor device 100 and aromas constructed to replicate the smell of different geographic places, conditions, and/or occurrences. For example, the smell of places may include specific or general sports venues, well known travel destinations, the mix of one's own personal space or home. The smell of conditions may include, for example, the smell of a pet, a baby, a season, a general environment (e.g., a forest), a new car, a sexual nature (e.g., musk, pheromones, etc. . . . ). The one or more replaceable cartridges 206 can contain the vaporizable material. If the vaporizable material is liquid, the cartridge can comprise the wick 204 to aid in transporting the liquid to a mixing chamber 208. In the alternative, some other transport mode can be used. Each of the one or more replaceable cartridges 206 can be configured to fit inside and engage removably with a receptacle (such as the container 202 and/or a secondary container) of the vapor device 100. In an alternative, or in addition, one or more fluid containers 210 can be fixed in the vapor device 100 and configured to be refillable. In an aspect, one or more materials can be vaporized at a single time by the vaporizer 200. For example, some material can be vaporized and drawn through an exhaust port 212 and/or some material can be vaporized and exhausted via a smoke simulator outlet (not shown).

The mixing chamber 208 can also receive an amount of one or more compounds (e.g., vaporizable material) to be vaporized. For example, the processor 102 can determine a first amount of a first compound and determine a second amount of a second compound. The processor 102 can cause the withdrawal of the first amount of the first compound from a first container into the mixing chamber and the second amount of the second compound from a second container into the mixing chamber. The processor 102 can also determine a target dose of the first compound, determine a vaporization ratio of the first compound and the second compound based on the target dose, determine the first amount of the first compound based on the vaporization ratio, determine the second amount of the second compound based on the vaporization ratio, and cause the withdrawal of the first amount of the first compound into the mixing chamber, and the withdrawal of the second amount of the second compound into the mixing chamber.

The processor 102 can also determine a target dose of the first compound, determine a vaporization ratio of the first compound and the second compound based on the target dose, determine the first amount of the first compound based on the vaporization ratio, and determine the second amount of the second compound based on the vaporization ratio. After expelling the vapor through an exhaust port for inhalation by a user, the processor 102 can determine that a cumulative dose is approaching the target dose and reduce the vaporization ratio. In an aspect, one or more of the vaporization ratio, the target dose, and/or the cumulative dose can be determined remotely and transmitted to the vapor device 100 for use.

In operation, a heating element 214 can vaporize or nebulize the vaporizable material in the mixing chamber 208, producing an inhalable vapor/mist that can be expelled via the exhaust port 212. In an aspect, the heating element 214 can comprise a heater coupled to the wick (or a heated wick) 204 operatively coupled to (for example, in fluid communication with) the mixing chamber 210. The heating element 214 can comprise a nickel-chromium wire or the like, with a temperature sensor (not shown) such as a thermistor or thermocouple. Within definable limits, by controlling power to the wick 204, a rate of vaporization can be independently controlled. A multiplexer 216 can receive power from any suitable source and exchange data signals with a processor, for example, the processor 102 of the vapor device 100, for control of the vaporizer 200. At a minimum, control can be provided between no power (off state) and one or more powered states. Other control mechanisms can also be suitable.

In another aspect, the vaporizer 200 can comprise a piezoelectric dispersing element. In some aspects, the piezoelectric dispersing element can be charged by a battery, and can be driven by a processor on a circuit board. The circuit board can be produced using a polyimide such as Kapton, or other suitable material. The piezoelectric dispersing element can comprise a thin metal disc which causes dispersion of the fluid fed into the dispersing element via the wick or other soaked piece of organic material through vibration. Once in contact with the piezoelectric dispersing element, the vaporizable material (e.g., fluid) can be vaporized (e.g., turned into vapor or mist) and the vapor can be dispersed via a system pump and/or a sucking action of the user. In some aspects, the piezoelectric dispersing element can cause dispersion of the vaporizable material by producing ultrasonic vibrations. An electric field applied to a piezoelectric material within the piezoelectric element can cause ultrasonic expansion and contraction of the piezoelectric material, resulting in ultrasonic vibrations to the disc. The ultrasonic vibrations can cause the vaporizable material to disperse, thus forming a vapor or mist from the vaporizable material.

In an aspect, the vaporizer 200 can be configured to permit a user to select between using the heating element 214 or the piezoelectric dispersing element. In another aspect, the vaporizer 200 can be configured to permit a user to utilize both the heating element 214 and the piezoelectric dispersing element.

In some aspects, the connection between a power supply and the piezoelectric dispersing element can be facilitated using one or more conductive coils. The conductive coils can provide an ultrasonic power input to the piezoelectric dispersing element. For example, the signal carried by the coil can have a frequency of approximately 107.8 kHz. In some aspects, the piezoelectric dispersing element can comprise a piezoelectric dispersing element that can receive the ultrasonic signal transmitted from the power supply through the coils, and can cause vaporization of the vaporizable liquid by producing ultrasonic vibrations. An ultrasonic electric field applied to a piezoelectric material within the piezoelectric element causes ultrasonic expansion and contraction of the piezoelectric material, resulting in ultrasonic vibrations according to the frequency of the signal. The vaporizable liquid can be vibrated by the ultrasonic energy produced by the piezoelectric dispersing element, thus causing dispersal and/or atomization of the liquid.

Figure 3:
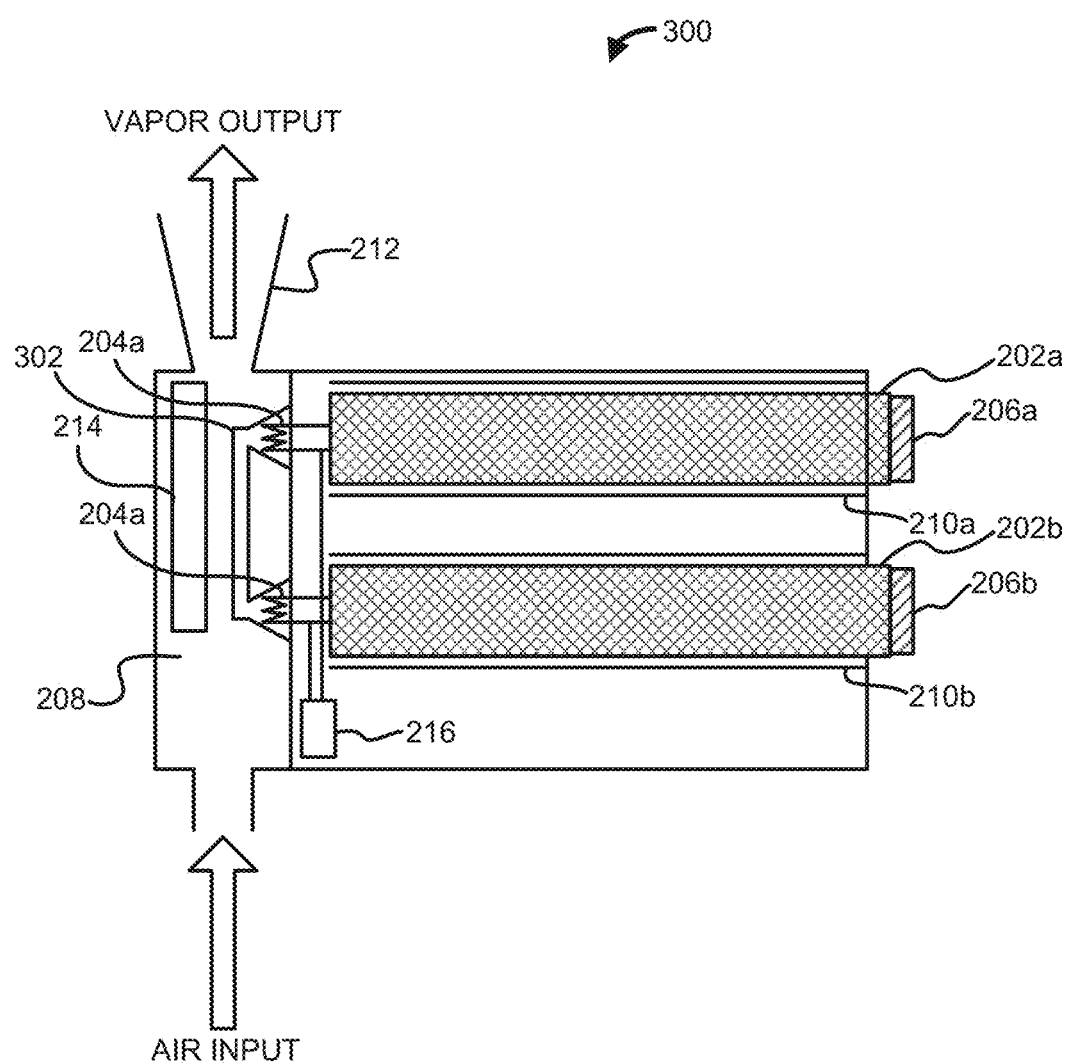
FIG. 3 illustrates an exemplary vaporizer configured for vaporizing a mixture of vaporizable material.

FIG. 3 illustrates a vaporizer 300 that comprises the elements of the vaporizer 200 with two containers 202a and 202b containing a vaporizable material, for example a fluid or a solid. In an aspect, the fluid can be the same fluid in both containers or the fluid can be different in each container. In an aspect the fluid can comprise aromatic elements. The aromatic element can include, but is not limited to, at least one of lavender or other floral aromatic eLiquids, mint, menthol, herbal soil or geologic, plant based, name brand perfumes, custom mixed perfume formulated inside the vapor device 100 and aromas constructed to replicate the smell of different geographic places, conditions, and/or occurrences. For example, the smell of places may include specific or general sports venues, well known travel destinations, the mix of one's own personal space or home. The smell of conditions may include, for example, the smell of a pet, a baby, a season, a general environment (e.g., a forest), a new car, a sexual nature (e.g., musk, pheromones, etc. . . . ). Coupling between the vaporizer 200 and the container 202a and the container 202b can be via a wick 204a and a wick 204b, respectively, via a valve, or by some other structure. Coupling can operate independently of gravity, such as by capillary action or pressure drop through a valve. The vaporizer 300 can be configured to mix in varying proportions the fluids contained in the container 202a and the container 202b and vaporize the mixture at controlled rates in response to mechanical input from a component of the vapor device 100, and/or in response to control signals from the processor 102 or another component. For example, based on a vaporization ratio. In an aspect, a mixing element 302 can be coupled to the container 202a and the container 202b. The mixing element can, in response to a control signal from the processor 102, withdraw select quantities of vaporizable material in order to create a customized mixture of different types of vaporizable material. Vaporizable material (e.g., fluid) can be supplied by one or more replaceable cartridges 206a and 206b. The one or more replaceable cartridges 206a and 206b can contain a vaporizable material. If the vaporizable material is liquid, the cartridge can comprise the wick 204a or 204b to aid in transporting the liquid to a mixing chamber 208. In the alternative, some other transport mode can be used. Each of the one or more replaceable cartridges 206a and 206b can be configured to fit inside and engage removably with a receptacle (such as the container 202a or the container 202b and/or a secondary container) of the vapor device 100. In an alternative, or in addition, one or more fluid containers 210a and 210b can be fixed in the vapor device 100 and configured to be refillable. In an aspect, one or more materials can be vaporized at a single time by the vaporizer 300. For example, some material can be vaporized and drawn through an exhaust port 212 and/or some material can be vaporized and exhausted via a smoke simulator outlet (not shown).

Figure 4:
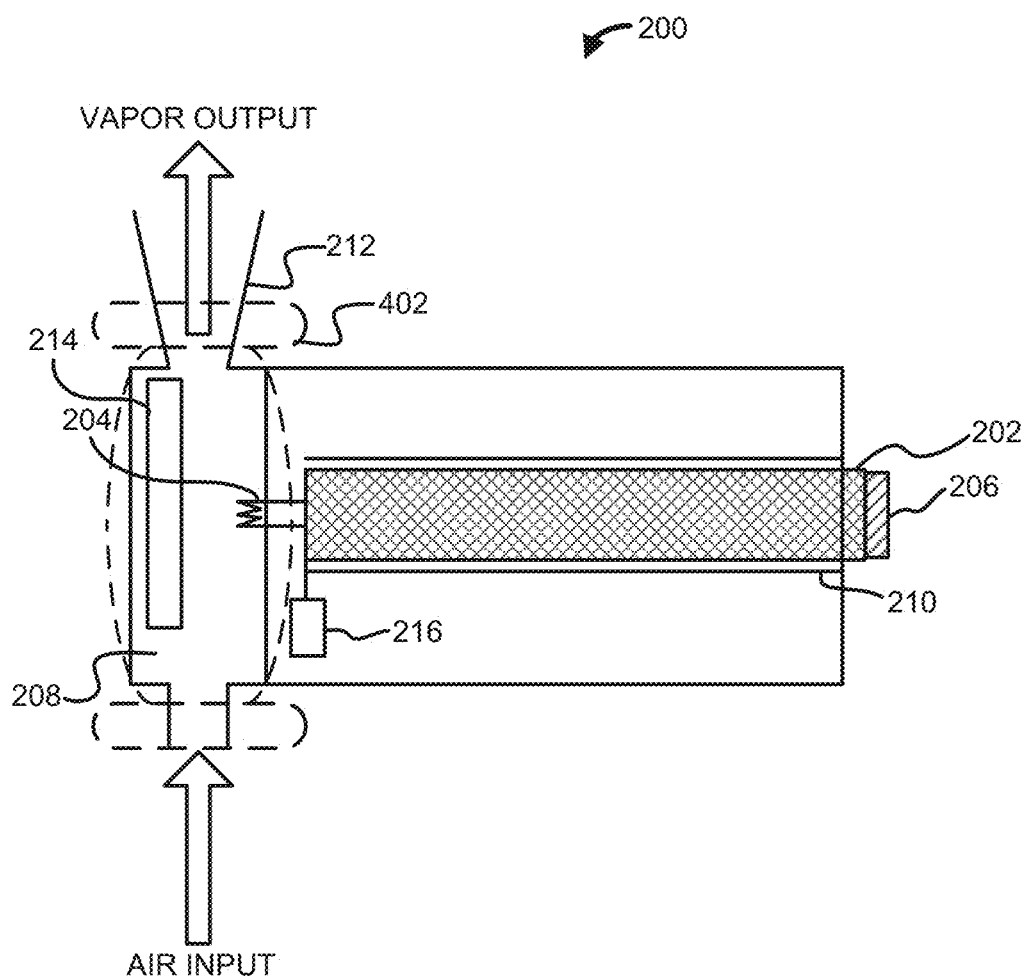
FIG. 4 illustrates an exemplary vaporizer device configured for smooth vapor delivery.

FIG. 4 illustrates a vaporizer 200 that comprises the elements of the vaporizer 200 with a heating casing 402. The heating casing 402 can enclose the heating element 214 or can be adjacent to the heating element 214. The heating casing 402 is illustrated with dashed lines, indicating components contained therein. The heating casing 402 can be made of ceramic, metal, and/or porcelain. The heating casing 402 can have varying thickness. In an aspect, the heating casing 402 can be coupled to the multiplexer 216 to receive power to heat the heating casing 402. In another aspect, the heating casing 402 can be coupled to the heating element 214 to heat the heating casing 402 in another aspect, the heating casing 402 can serve an insulation role.

Figure 5:
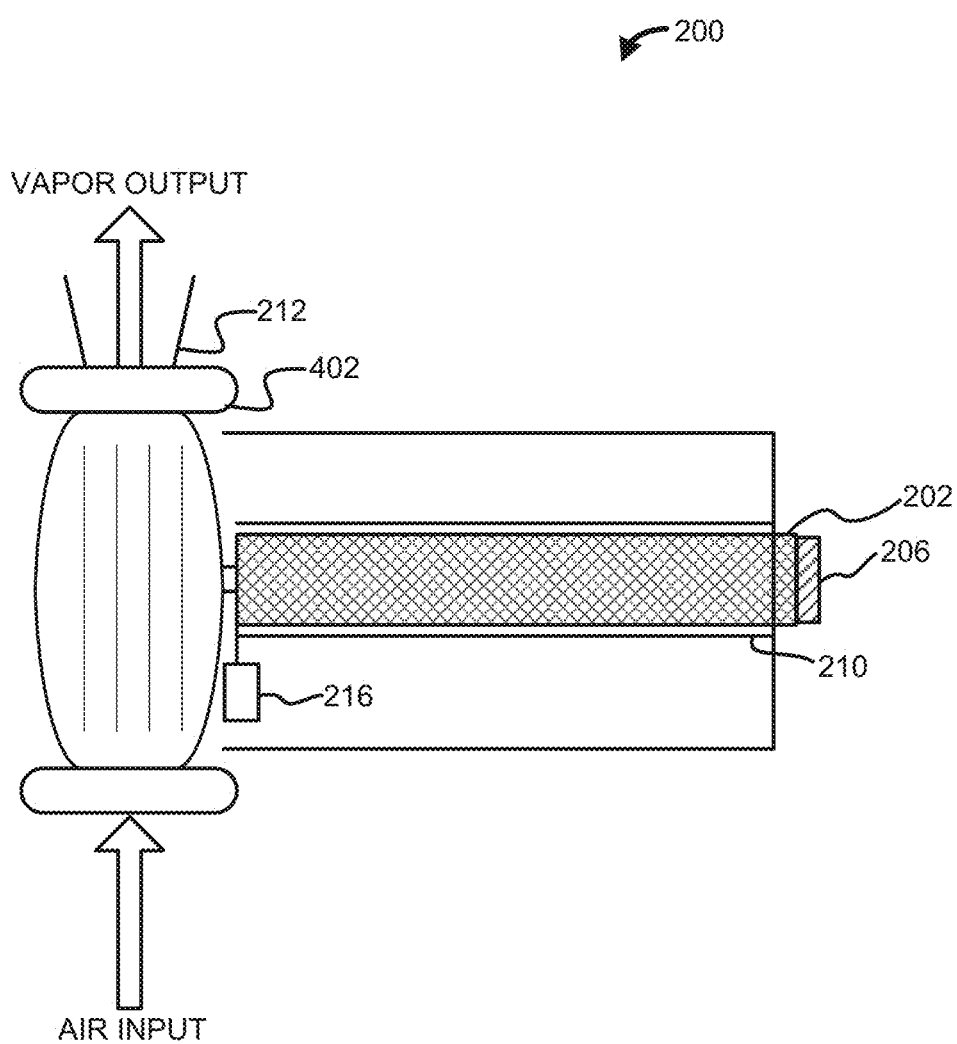
FIG. 5 illustrates another exemplary vaporizer configured for smooth vapor delivery.

FIG. 5 illustrates the vaporizer 200 of FIG. 2 and FIG. 4, but illustrates the heating casing 402 with solid lines, indicating components contained therein. Other placements of the heating casing 402 are contemplated. For example, the heating casing 402 can be placed after the heating element 214 and/or the mixing chamber 208.

Figure 6:
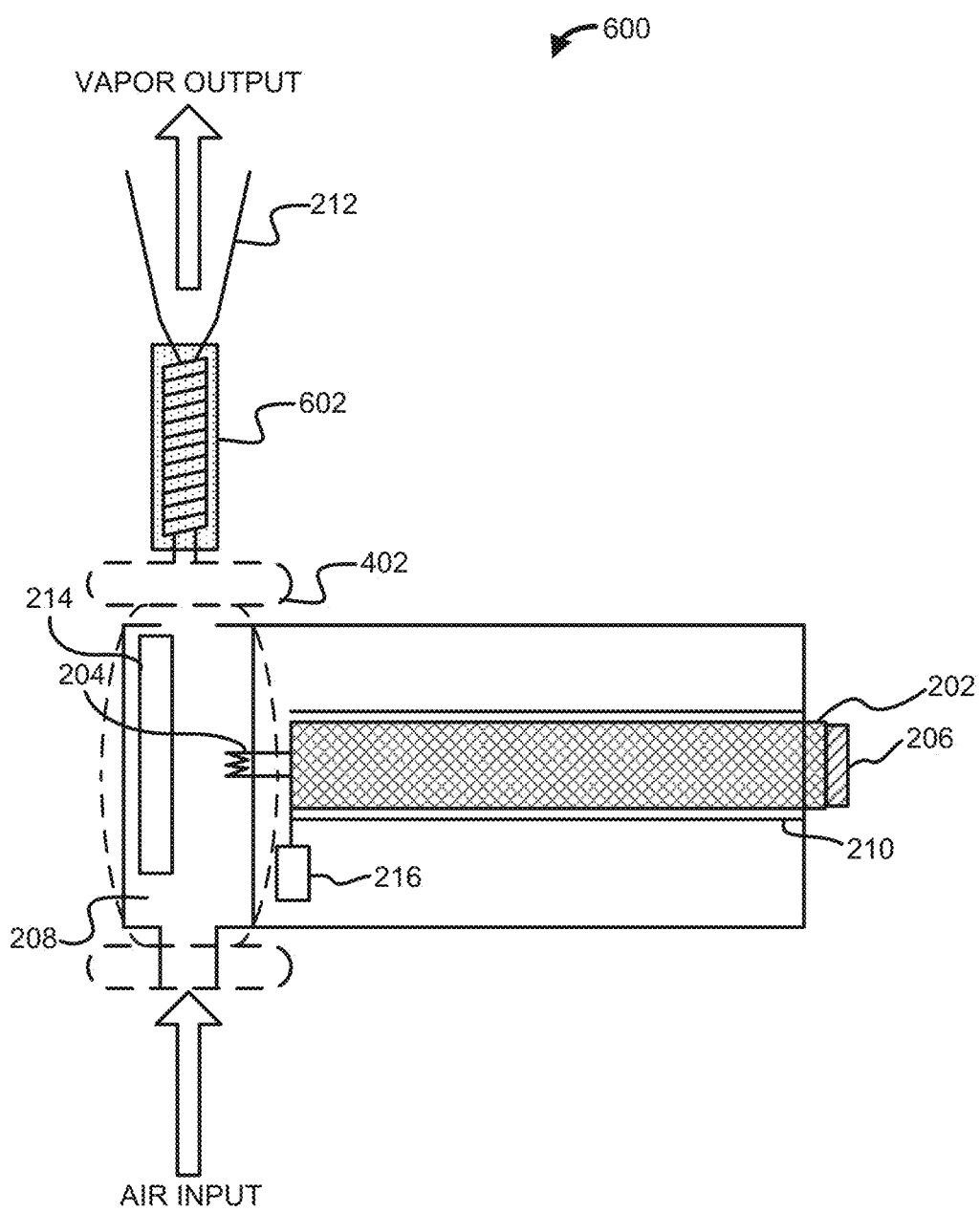
FIG. 6 illustrates another exemplary vaporizer configured for smooth vapor delivery.

FIG. 6 illustrates a vaporizer 600 that comprises the elements of the vaporizer 200 of FIG. 2 and FIG. 4, with the addition of a cooling element 602. The vaporizer 600 can optionally comprise the heating casing 402. The cooling element 602 can comprise one or more of a powered cooling element, a cooling air system, and/or a cooling fluid system. The cooling element 602 can be self-powered, co-powered, or directly powered by a battery and/or charging system within the vapor device 100 (e.g., the power supply 120). In an aspect, the cooling element 602 can comprise an electrically connected conductive coil, grating, and/or other design to efficiently distribute cooling to the at least one of the vaporized and/or non-vaporized air. For example, the cooling element 602 can be configured to cool air as it is brought into the vaporizer 600/mixing chamber 208 and/or to cool vapor after it exits the mixing chamber 208. The cooling element 602 can be deployed such that the cooling element 602 is surrounded by the heated casing 402 and/or the heating element 214. In another aspect, the heated casing 402 and/or the heating element 214 can be surrounded by the cooling element 602. The cooling element 602 can utilize at least one of cooled air, cooled liquid, and/or cooled matter.

In an aspect, the cooling element 602 can be a coil of any suitable length and can reside proximate to the inhalation point of the vapor (e.g., the exhaust port 2121). The temperature of the air is reduced as it travels through the cooling element 602. In an aspect, the cooling element 602 can comprise any structure that accomplishes a cooling effect. For example, the cooling element 602 can be replaced with a screen with a mesh or grid-like structure, a conical structure, and/or a series of cooling airlocks, either stationary or opening, in a periscopic/telescopic manner. The cooling element 602 can be any shape and/or can take multiple forms capable of cooling heated air, which passes through its space.

In an aspect, the cooling element 602 can be any suitable cooling system for use in a vapor device. For example, a fan, a heat sink, a liquid cooling system, a chemical cooling system, combinations thereof, and the like. In an aspect, the cooling element 602 can comprise a liquid cooling system whereby a fluid (e.g., water) passes through pipes in the vaporizer 600. As this fluid passes around the cooling element 602, the fluid absorbs heat, cooling air in the cooling element 602. After the fluid absorbs the heat, the fluid can pass through a heat exchanger which transfers the heat from the fluid to air blowing through the heat exchanger. By way of further example, the cooling element 602 can comprise a chemical cooling system that utilizes an endothermic reaction. An example of an endothermic reaction is dissolving ammonium nitrate in water. Such endothermic process is used in instant cold packs. These cold packs have a strong outer plastic layer that holds a bag of water and a chemical, or mixture of chemicals, that result in an endothermic reaction when dissolved in water. When the cold pack is squeezed, the inner bag of water breaks and the water mixes with the chemicals. The cold pack starts to cool as soon as the inner bag is broken, and stays cold for over an hour. Many instant cold packs contain ammonium nitrate. When ammonium nitrate is dissolved in water, it splits into positive ammonium ions and negative nitrate ions. In the process of dissolving, the water molecules contribute energy, and as a result, the water cools down. Thus, the vaporizer 600 can comprise a chamber for receiving the cooling element 602 in the form of a "cold pack." The cold pack can be activated prior to insertion into the vaporizer 600 or can be activated after insertion through use of a button/switch and the like to mechanically activate the cold pack inside the vaporizer 400.

In an aspect, the cooling element 602 can be selectively moved within the vaporizer 600 to control the temperature of the air mixing with vapor. For example, the cooling element 602 can be moved closer to the exhaust port 212 or further from the exhaust port 212 to regulate temperature. In another aspect, insulation can be incorporated as needed to maintain the integrity of heating and cooling, as well as absorbing any unwanted condensation due to internal or external conditions, or a combination thereof. The insulation can also be selectively moved within the vaporizer 600 to control the temperature of the air mixing with vapor. For example, the insulation can be moved to cover a portion, none, or all of the cooling element 602 to regulate temperature.

Figure 7:
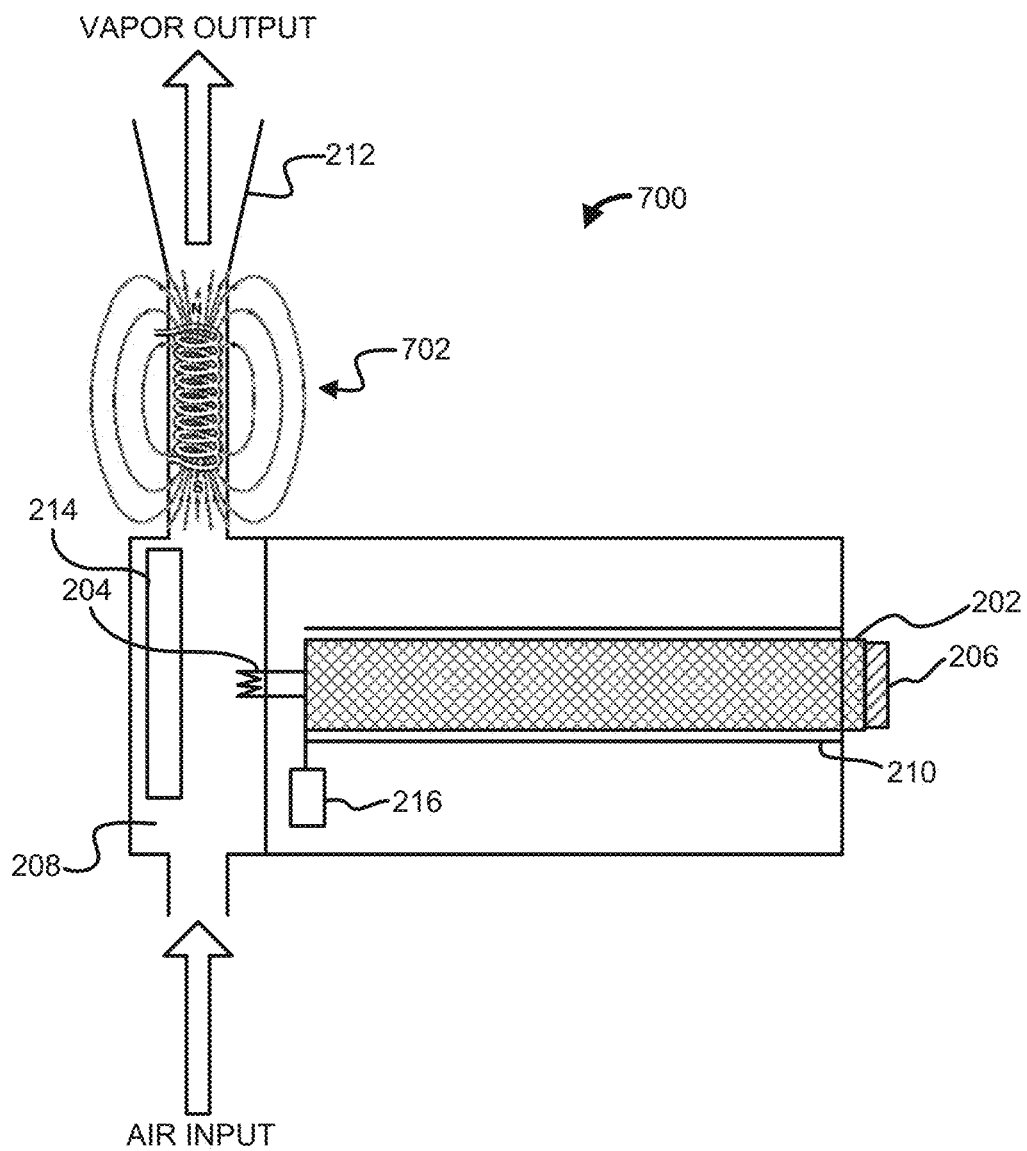
FIG. 7 illustrates another exemplary vaporizer configured for smooth vapor delivery.

FIG. 7 illustrates a vaporizer 700 that comprises elements in common with the vaporizer 200. The vaporizer 700 can optionally comprise the heating casing 402 (not shown) and/or the cooling element 602 (not shown). The vaporizer 700 can comprise a magnetic element 702. The magnetic element 702 can apply a magnetic field to vapor after exiting the mixing chamber 208. The magnetic field can cause positively and negatively charged particles in the vapor to curve in opposite directions, according to the Lorentz force law with two particles of opposite charge. The magnetic field can be created by at least one of an electric current generating a charge or a pre-charged magnetic material deployed within the vapor device 100. In an aspect, the magnetic element 702 can be built into the mixing chamber 208, the cooling element 602, the heating casing 402, or can be a separate magnetic element 702.

Figure 8:
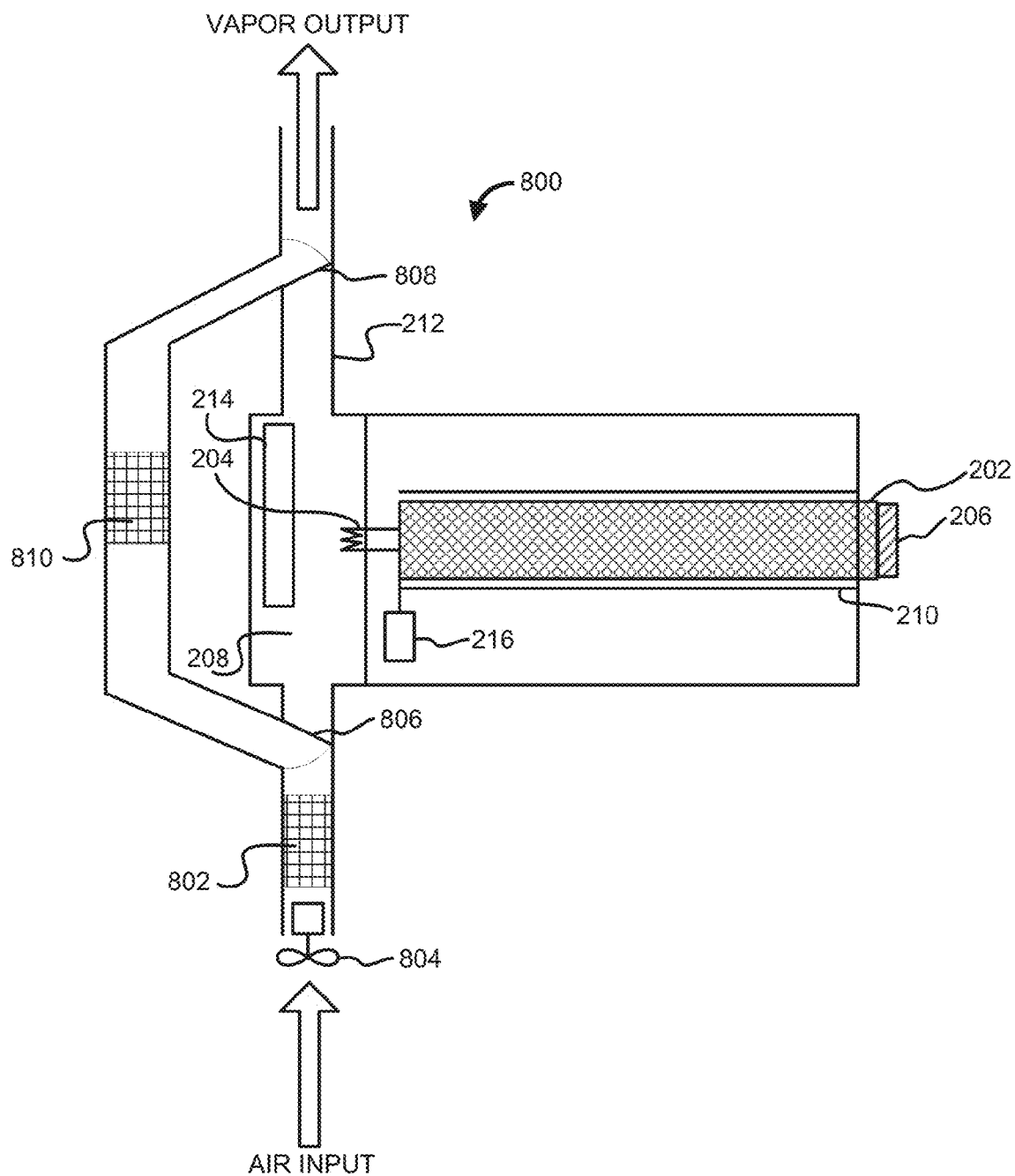
FIG. 8 illustrates an exemplary vaporizer configured for filtering air.

FIG. 8 illustrates a vaporizer 800 that comprises elements in common with the vaporizer 200. In an aspect, the vaporizer 800 can comprise a filtration element 802. The filtration element 802 can be configured to remove (e.g., filter, purify, etc.) contaminants from air entering the vaporizer 800. The filtration element 802 can optionally comprise a fan 804 to assist in delivering air to the filtration element 802. The vaporizer 800 can be configured to intake air into the filtration element 802, filter the air, and pass the filtered air to the mixing chamber 208 for use in vaporizing the one or more vaporizable or non-vaporizable materials. In another aspect, the vaporizer 800 can be configured to intake air into the filtration element 802, filter the air, and bypass the mixing chamber 208 by engaging a door 806 and a door 808 to pass the filtered air directly to the exhaust port 212 for inhalation by a user. In an aspect, filtered air that bypasses the mixing chamber 208 by engaging the door 806 and the door 808 can pass through a second filtration element 810 to further remove (e.g., filter, purify, etc.) contaminants from air entering the vaporizer 800. In an aspect, the vaporizer 800 can be configured to deploy and/or mix a proper/safe amount of oxygen which can be delivered either via the one or more replaceable cartridges 206 or via air pumped into a mask from external air and filtered through the filtration element 802 and/or the filtration element 810.

In an aspect, the filtration element 802 and/or the filtration element 810 can comprise cotton, polymer, wool, satin, meta materials and the like. The filtration element 802 and/or the filtration element 810 can comprise a filter material that at least one airborne particle and/or undesired gas by a mechanical mechanism, an electrical mechanism, and/or a chemical mechanism. The filter material can comprise one or more pieces of, a filter fabric that can filter out one or more airborne particles and/or gasses. The filter fabric can be a woven and/or non-woven material. The filter fabric can be made from natural fibers e.g., cotton, wool, etc.) and/or from synthetic fibers e.g., polyester, nylon, polypropylene, etc.). The thickness of the filter fabric can be varied depending on the desired filter efficiencies and/or the region of the apparel where the filter fabric is to be used. The filter fabric can be designed to filter airborne particles and/or gasses by mechanical mechanisms (e.g., weave density), by electrical mechanisms (e.g., charged fibers, charged metals, etc.), and/or by chemical mechanisms (e.g., absorptive charcoal particles, adsorptive materials, etc.). In as aspect, the filter material can comprise electrically charged fibers such as, but not limited to, FILTRETE by 3M. In another aspect, the filter material can comprise a high density material similar to material used for medical masks which are used by medical personnel in doctors' offices, hospitals, and the like. In an aspect, the filter material can be treated with an anti-bacterial solution and/or otherwise made from anti-bacterial materials. In another aspect, the filtration element 802 and/or the filtration element 810 can comprise electrostatic plates, ultraviolet light, a HEPA filter, combinations thereof, and the like.

Figure 9:
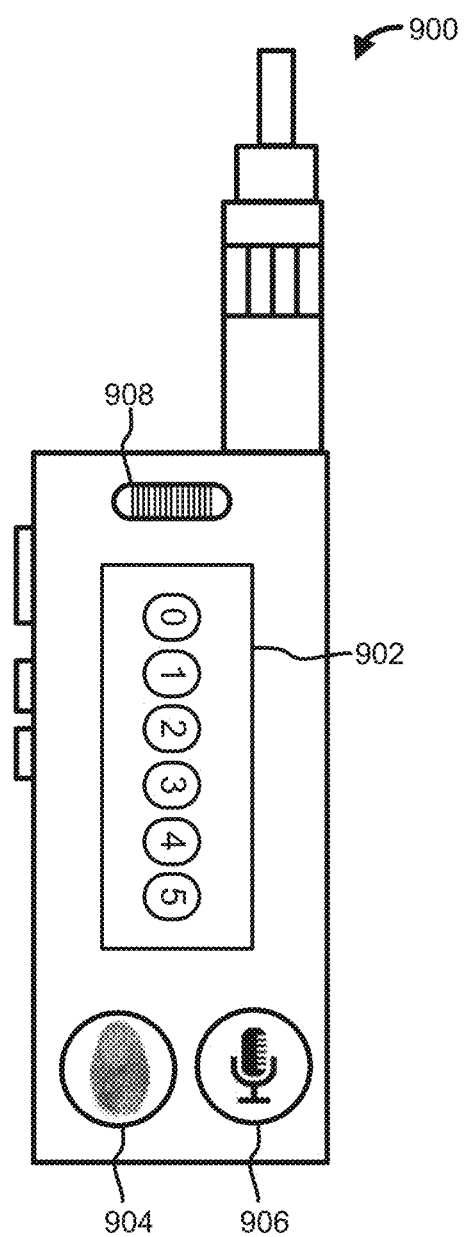
FIG. 9 illustrates an interface of an exemplary electronic vapor device.

FIG. 9 illustrates an exemplary electronic vapor device 900. The electronic vapor device 900 can comprise a housing 901. The housing 901 can be made of metal, plastic, glass, combinations thereof, and the like. The housing 901 can be made of a transparent material, for example, glass, plastic, or a combination thereof. The housing 901 can thus enable a user to view various components of the electronic vapor device 900, for example during operation of the electronic vapor device 900. The housing 901 can be configured to permit viewing of some or all components of the electronic vapor device 900. In the example, a user can view via the housing 901, an LED 902, a battery 903, at least a portion of a button 904 that resides inside the housing 901, a processor 905, a heating element 908, a container 909 for storing vaporizable material, a speaker 910, a valve 911, and an simulator outlet 912. In an aspect, the valve 911 can be operable to route vapor generated by the heating element 908 to simulator outlet 912 to simulate a traditional smoking apparatus in conjunction with the LED 902. For example, when a user is not actively inhaling vapor, the exemplary electronic vapor device 900 can cause the valve 904 to block vapor from exiting the mouthpiece, but rather to exit the simulator outlet 912 at the end of the apparatus. Similarly, the LED 902 can be a dim red/orange (or any other color) when the vapor is exiting the simulator outlet 912 and can increase brightness as the user inhales via the mouthpiece (also shutting off vapor from exiting the simulator outlet 912 via the valve 904). Moreover, the speaker 910 can be activated to play one or more sounds that simulate the sound of smoking a smoking apparatus (e.g., burning leaves and the like) when the user is inhaling via the mouthpiece and not when vapor is exiting the simulator outlet 912.

Figure 10:
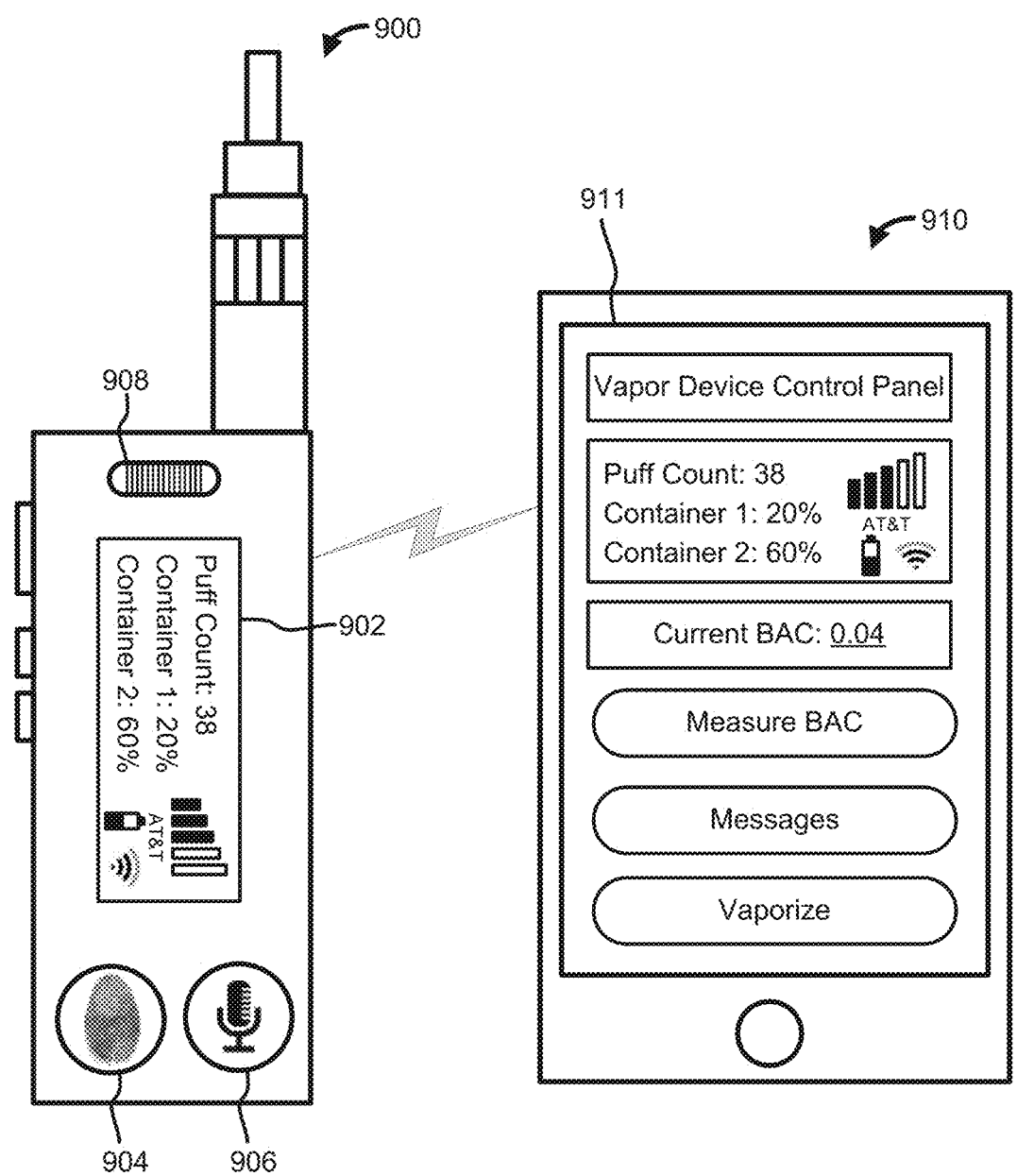
FIG. 10 illustrates another interface of an exemplary electronic vapor device.

FIG. 10 illustrates exemplary information that can be provided to a user via the display 902 of the exemplary vapor device 900 or via a display 911 of an electronic device 910 in communication with the exemplary vapor device 900. The display 902 can provide information to a user such as a puff count, an amount of vaporizable material remaining in one or more containers, battery remaining, signal strength, combinations thereof, and the like. The display 911 can provide the same or different information to the user as available on the display 902. In an aspect, the exemplary vapor device 900 does not comprise the display 902. The display 911 can provide a user interface that provides information and provides control over one or more functions of the exemplary vapor device 900. The one or more functions can comprise one or more of a simulation experience function, a community function, an e-commerce function, or a vapor device operability function.

The simulation experience function can permit a user to specify which traditional smoking apparatus the exemplary vapor device 900 should emulate in sound and/or light. The community function can comprise at least one of a social networking function, transmitting or receiving a recommendation, transmitting or receiving a message, or transmitting or receiving a location of a user. The e-commerce function can comprise at least one of purchasing a component for use with the vapor device, purchasing a vaporizable or non-vaporizable material for use with the vapor device, purchasing another vapor device or components thereof, selling a component for use with the vapor device or another vapor device, selling a vaporizable or non-vaporizable material for use with the vapor device, or selling the vapor device or another vapor device. The device operability function can comprise at least one of controlling the vapor device, displaying diagnostic information, displaying repair information, displaying calibration information, displaying usage information, or displaying information corresponding to detected constituents of material vaporized by the vapor device.

The user interface can comprise at least one of a lighted signal light, a gauge, a representation of a box, a representation of a form, a check mark, an avatar, a visual image, a graphic design, a list, an active calibration or calculation, a 2-dimensional fractal design, a 3-dimensional fractal design, a 2-dimensional representation of the vapor device or another vapor device, or a 3-dimensional representation of the vapor device or another vapor device. At least one of the 2-dimensional fractal design or the 3-dimensional fractal design can continuously or periodically expand or contract to various scales of the original fractal design.

Figure 11:
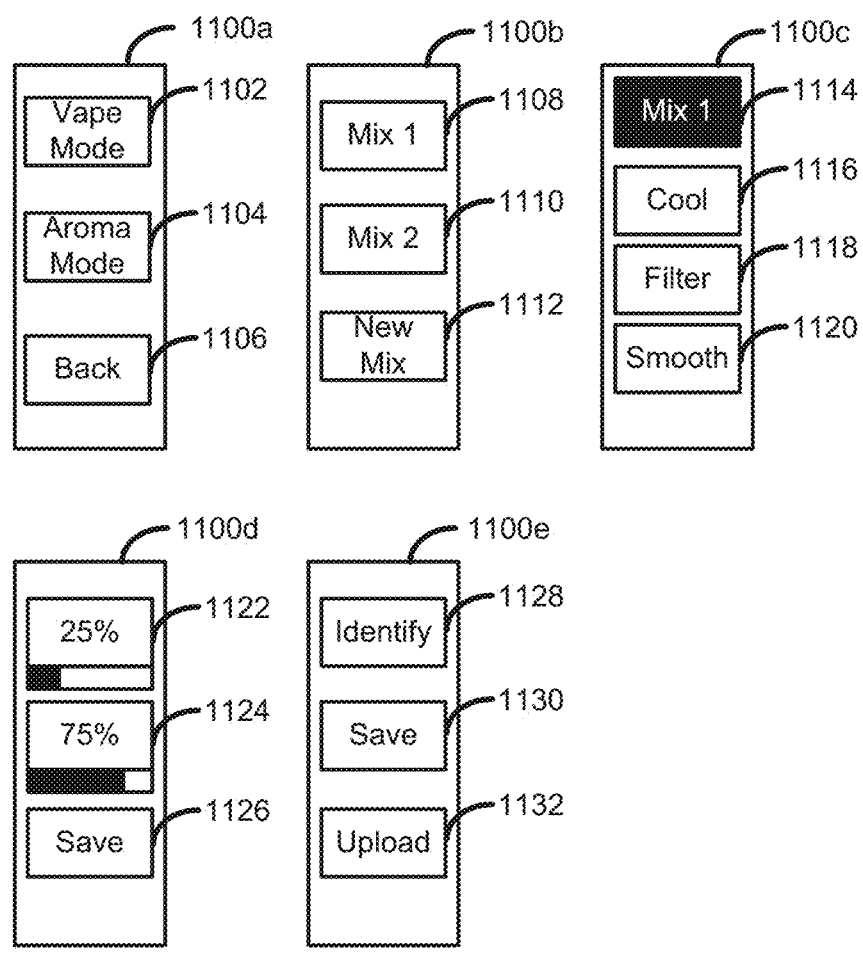
FIG. 11 illustrates several interfaces of an exemplary electronic vapor device.

FIG. 11 illustrates a series of user interfaces that can be provided via the display 902 of the exemplary vapor device 900 or via the display 911 of the electronic device 910 in communication with the exemplary vapor device 900. In an aspect, the exemplary vapor device 900 can be configured for one or more of multi-mode vapor usage. For example, the exemplary vapor device 900 can be configured to enable a user to inhale vapor (vape mode) or to release vapor into the atmosphere (aroma mode). User interface 1100*a* provides a user with interface elements to select which mode the user wishes to engage, a Vape Mode 1102, an Aroma Mode 1104, or an option to go back 1106 and return to the previous screen. The interface element Vape Mode 1102 enables a user to engage a vaporizer to generate a vapor for inhalation. The interface element Aroma Mode 1104 enables a user to engage the vaporizer to generate a vapor for release into the atmosphere.

In the event a user selects the Vape Mode 1102, the exemplary vapor device 900 will be configured to vaporize material and provide the resulting vapor to the user for inhalation. The user can be presented with user interface 1100*b* which provides the user an option to select interface elements that will determine which vaporizable material to vaporize. For example, an option of Mix 1 1108, Mix 2 1110, or a New Mix 1112. The interface element Mix 1 1108 enables a user to engage one or more containers that contain vaporizable material in a predefined amount and/or ratio, in an aspect, a selection of Mix 1 1108 can result in the exemplary vapor device 900 engaging a single container containing a single type of vaporizable material or engaging a plurality of containers containing a different types of vaporizable material in varying amounts. The interface element Mix 2 1110 enables a user to engage one or more containers that contain vaporizable material in a predefined amount and/or ratio. In an aspect, a selection of Mix 2 1110 can result in the exemplary vapor device 900 engaging a single container containing a single type of vaporizable material or engaging a plurality of containers containing a different types of vaporizable material in varying amounts. In an aspect, a selection of New Mix 1112 can result in the exemplary vapor device 900 receiving a new mixture, formula, recipe, etc. . . . of vaporizable materials and/or engage one or more containers that contain vaporizable material in the new mixture.

Upon selecting, for example, the Mix 1 1108, the user can be presented with user interface 1100*c*. User interface 1100*c* indicates to the user that Mix 1 has been selected via an indicator 1114. The user can be presented with options that control how the user wishes to experience the selected vapor. The user can be presented with interface elements Cool 1116, Filter 1118, and Smooth 1120. The interface element Cool 1116 enables a user to engage one or more cooling elements to reduce the temperature of the vapor. The interface element Filter 1118 enables a user to engage one or more filter elements to filter the air used in the vaporization process. The interface element Smooth 1120 enables a user to engage one or more heating casings, cooling elements, filter elements, and/or magnetic elements to provide the user with a smoother vaping experience.

Upon selecting New Mix 1112, the user can be presented with user interface 1100*d*. User interface 1100*d* provides the user with a container one ratio interface element 1122, a container two ratio interface element 1124, and Save 1126. The container one ratio interface element 1122 and the container two ratio interface element 1124 provide a user the ability to select an amount of each type of vaporizable material contained in container one and/or container two to utilize as a new mix. The container one ratio interface element 1122 and the container two ratio interface element 1124 can provide a user with a slider that adjusts the percentages of each type of vaporizable material based on the user dragging the slider. In an aspect, a mix can comprise 100% on one type of vaporizable material or any percent combination (e.g., 50/50, 75/25, 85/15, 95/5, etc. . . . ). Once the user is satisfied with the new mix, the user can select Save 1126 to save the new mix for later use.

In the event a user selects the Aroma Mode 1104, the exemplary vapor device 900 will be configured to vaporize material and release the resulting vapor into the atmosphere. The user can be presented with user interface 1100*b*, 1100*c*, and/or 1100*d* as described above, but the resulting vapor will be released to the atmosphere In an aspect, the user can be presented with user interface 1100*e*. The user interface 1100*e* can provide the user with interface elements Identify 1128, Save 1130, and Upload 1132. The interface element Identify 1128 enables a user to engage one or more sensors in the exemplary vapor device 900 to analyze the surrounding environment. For example, activating the interface element Identify 1128 can engage a sensor to determine the presence of a negative environmental condition such as smoke, a bad smell, chemicals, etc. Activating the interface element Identify 1128 can engage a sensor to determine the presence of a positive environmental condition, for example, an aroma. The interface element Save 1130 enables a user to save data related to the analyzed negative and/or positive environmental condition in memory local to the exemplary vapor device 900. The interface element Upload 1132 enables a user to engage a network access device to transmit data related to the analyzed negative and/or positive environmental condition to a remote server for storage and/or analysis.

Figure 12:
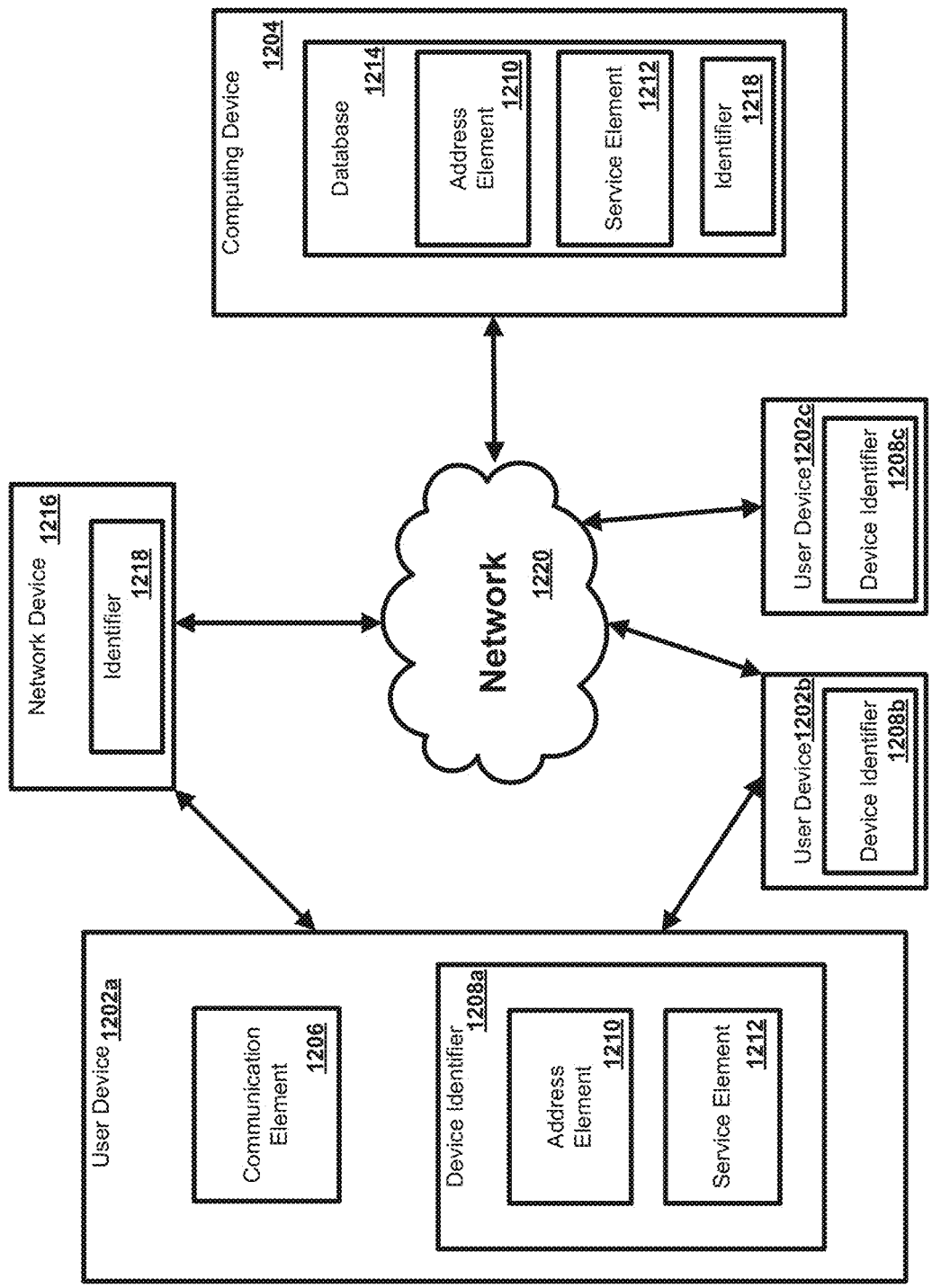
FIG. 12 illustrates an exemplary operating environment.

In one aspect of the disclosure, a system can be configured to provide services such as network-related services to a user device. FIG. 12 illustrates various aspects of an exemplary environment in which the present methods and systems can operate. The present disclosure is relevant to systems and methods for providing services to a user device, for example, electronic vapor devices which can include, but are not limited to, a vape-bot, micro-vapor device, vapor pipe, e-cigarette, hybrid handset and vapor device, and the like. Other user devices that can be used in the systems and methods include, but are not limited to, a smart watch (and any other form of "smart" wearable technology), a smartphone, a tablet, a laptop, a desktop, and the like. In an aspect, one or more network devices can be configured to provide various services to one or more devices, such as devices located at or near a premises. In another aspect, the network devices can be configured to recognize an authoritative device for the premises and/or a particular service or services available at the premises. As an example, an authoritative device can be configured to govern or enable connectivity to a network such as the Internet or other remote resources, provide address and/or configuration services like DHCP, and/or provide naming or service discovery services for a premises, or a combination thereof. Those skilled in the art will appreciate that present methods can be used in various types of networks and systems that employ both digital and analog equipment. One skilled in the art will appreciate that provided herein is a functional description and that the respective functions can be performed by software, hardware, or a combination of software and hardware.

The network and system can comprise a user device 1202*a*, 1202*b*, and/or 1202*c* in communication with a computing device 1204 such as a server, for example. The computing device 1204 can be disposed locally or remotely relative to the user device 1202*a*, 1202*b*, and/or 1202*c*. As an example, the user device 1202*a*, 1202*b*, and/or 1202*c* and the computing device 1204 can be in communication via a private and/or public network 1220 such as the Internet or a local area network. Other forms of communications can be used such as wired and wireless telecommunication channels, for example. In another aspect, the user device 1202*a*, 1202*b*, and/or 1202*c* can communicate directly without the use of the network 1220 (for example, via Bluetooth®, infrared, and the like).

In an aspect, the user device 1202*a*, 1202*b*, and/or 1202*c* can be an electronic device such as an electronic vapor device (e.g., vape-bot, micro-vapor device, vapor pipe, e-cigarette, hybrid handset and vapor device), a smartphone, a smart watch, a computer, a smartphone, a laptop, a tablet, a set top box, a display device, or other device capable of communicating with the computing device 1204. As an example, the user device 1202*a*, 1202*b,* and/or 1202*c* can comprise a communication element 1206 for providing an interface to a user to interact with the user device 1202*a*, 1202*b*, and/or 1202*c* and/or the computing device 1204. The communication element 1206 can be any interface for presenting and/or receiving information to/from the user, such as user feedback. An example interface can be communication interface such as a web browser (e.g., Internet Explorer, Mozilla Firefox, Google Chrome, Safari, or the like). Other software, hardware, and/or interfaces can be used to provide communication between the user and one or more of the user device 1202*a*, 1202*b,* and/or 1202*c* and the computing device 1204. In an aspect, the user device 1202*a*, 1202*b*, and/or 1202*c* can have at least one similar interface quality such as a symbol, a voice activation protocol, a graphical coherence, a startup sequence continuity element of sound, light, vibration or symbol. In an aspect, the interface can comprise at least one of lighted signal lights, gauges, boxes, forms, words, video, audio scrolling, user selection systems, vibrations, check marks, avatars, matrix', visual images, graphic designs, lists, active calibrations or calculations, 2D interactive fractal designs, 3D fractal designs, 2D and/or 3D representations of vapor devices and other interface system functions.

As an example, the communication element 1206 can request or query various files from a local source and/or a remote source. As a further example, the communication element 1206 can transmit data to a local or remote device such as the computing device 1204. In an aspect, data can be shared anonymously with the computing device 1204. The data can be shared over a transient data session with the computing device 1204. The transient data session can comprise a session limit. The session limit can be based on one or more of a number of puffs, a time limit, and a total quantity of vaporizable material. The data can comprise usage data and/or a usage profile. The computing device 1204 can destroy the data once the session limit is reached.

In an aspect, the user device 1202*a*, 1202*b*, and/or 1202*c* can be associated with a user identifier or device identifier 1208*a*, 1208*b*, and/or 1208*c*. As an example, the device identifier 1208*a*, 1208*b*, and/or 1208*c* can be any identifier, token, character, string, or the like, for differentiating one user or user device (e.g., user device 1202*a*, 1202*b*, and/or 1202*c*) from another user or user device. In a further aspect, the device identifier 1208*a*, 1208*b,* and/or 1208*c* can identify a user or user device as belonging to a particular class of users or user devices. As a further example, the device identifier 1208*a*, 1208*b*, and/or 1208*c* can comprise information relating to the user device such as a manufacturer, a model or type of device, a service provider associated with the user device 1202*a*, 1202*b*, and/or 1202*c*, a state of the user device 1202*a*, 1202*b*, and/or 1202*c*, a locator, and/or a label or classifier. Other information can be represented by the device identifier 1208*a*, 1208*b*, and/or 1208*c*.

In an aspect, the device identifier 1208*a*, 1208*b*, and/or 1208*c* can comprise an address element 1210 and a service element 1212. In an aspect, the address element 1210 can comprise or provide an internet protocol address, a network address, a media access control (MAC) address, an Internet address, or the like. As an example, the address element 1210 can be relied upon to establish a communication session between the user device 1202*a*, 1202*b*, and/or 1202*c* and the computing device 1204 or other devices and/or networks. As a further example, the address element 1210 can be used as an identifier or locator of the user device 1202*a*, 1202*b*, and/or 1202*c*. In an aspect, the address element 1210 can be persistent for a particular network.

In an aspect, the service element 1212 can comprise an identification of a service provider associated with the user device 1202*a*, 1202*b*, and/or 1202*c* and/or with the class of user device 1202*a*, 1202*b*, and/or 1202*c*. The class of the user device 1202*a*, 1202*b*, and/or 1202*c* can be related to a type of device, capability of device, type of service being provided, and/or a level of service. As an example, the service element 1212 can comprise information relating to or provided by a communication service provider (e.g., Internet service provider) that is providing or enabling data flow such as communication services to and/or between the user device 1202*a*, 1202*b*, and/or 1202*c*. As a further example, the service element 1212 can comprise information relating to a preferred service provider for one or more particular services relating to the user device 1202*a*, 1202*b*, and/or 1202*c*. In an aspect, the address element 1210 can be used to identify or retrieve data from the service element 1212, or vice versa. As a further example, one or more of the address element 1210 and the service element 1212 can be stored remotely from the user device 1202*a*, 1202*b*, and/or 1202*c* and retrieved by one or more devices such as the user device 1202*a*, 1202*b*, and/or 1202*c* and the computing device 1204. Other information can be represented by the service element 1212.

In an aspect, the computing device 1204 can be a server for communicating with the user device 1202*a*, 1202*b,* and/or 1202*c*. As an example, the computing device 1204 can communicate with the user device 1202*a*, 1202*b*, and/or 1202*c* for providing data and/or services. As an example, the computing device 1204 can provide services such as data sharing, data syncing, network (e.g., Internet) connectivity, network printing, media management (e.g., media server), content services, streaming services, broadband services, or other network-related services. In an aspect, the computing device 1204 can allow the user device 1202*a*, 1202*b*, and/or 1202*c* to interact with remote resources such as data, devices, and files. As an example, the computing device can be configured as (or disposed at) a central location, which can receive content (e.g., data) from multiple sources, for example, user devices 1202*a*, 1202*b,* and/or 1202*c*. The computing device 1204 can combine the content from the multiple sources and can distribute the content to user (e.g., subscriber) locations via a distribution system.

In an aspect, one or more network devices 1216 can be in communication with a network such as network 1220. As an example, one or more of the network devices 1216 can facilitate the connection of a device, such as user device 1202*a*, 1202*b*, and/or 1202*c*, to the network 1220. As a further example, one or more of the network devices 1216 can be configured as a wireless access point (WAP). In an aspect, one or more network devices 1216 can be configured to allow one or more wireless devices to connect to a wired and/or wireless network using Bluetooth or any desired method or standard.

In an aspect, the network devices 1216 can be configured as a local area network (LAN). As an example, one or more network devices 1216 can comprise a dual band wireless access point. As an example, the network devices 1216 can be configured with a first service set identifier (SSD) (e.g., associated with a user network or private network) to function as a local network for a particular user or users. As a further example, the network devices 1216 can be configured with a second service set identifier (SSM) (e.g., associated with a public/community network or a hidden network) to function as a secondary network or redundant network for connected communication devices.

In an aspect, one or more network devices 1216 can comprise an identifier 1218. As an example, one or more identifiers can be or relate to an Internet Protocol (IP) Address IPV4/IPV6 or a media access control address (MAC address) or the like. As a further example, one or more identifiers 1218 can be a unique identifier for facilitating communications on the physical network segment. In an aspect, each of the network devices 1216 can comprise a distinct identifier 1218. As an example, the identifiers 1218 can be associated with a physical location of the network devices 1216.

In an aspect, the computing device 1204 can manage the communication between the user device 1202a, 1202b, and/or 1202c and a database 1214 for sending and receiving data therebetween. As an example, the database 1214 can store a plurality of files e.g., web pages), user identifiers or records, or other information, in one aspect, the database 1214 can store user device 1202a, 1202b, and/or 1202c usage information (including chronological usage), type of vaporizable and/or non-vaporizable material used, frequency of usage, location of usage, recommendations, communications e.g., text messages, advertisements, photo messages), simultaneous use of multiple devices, and the like). The database 1214 can collect and store data to support cohesive use, wherein cohesive use is indicative of the use of a first electronic vapor devices and then a second electronic vapor device is synced chronologically and logically to provide the proper specific properties and amount of vapor based upon a designed usage cycle. As a further example, the user device 1202a, 1202b, and/or 1202c can request and/or retrieve a file from the database 1214. The user device 1202a, 1202b, and/or 1202c can thus sync locally stored data with more current data available from the database 1214. Such syncing can be set to occur automatically on a set time schedule, on demand, and/or in real-time. The computing device 1204 can be configured to control syncing functionality. For example, a user can select one or more of the user device 1202a, 1202b, and/or 1202c to never by synced, to be the master data source for syncing, and the like. Such functionality can be configured to be controlled by a master user and any other user authorized by the master user or agreement.

In an aspect, the computing device 1204 can generate recommendation data. The recommendation data can comprise a recommendation for a vaporizable material that a user has not used, a recommendation for a vaporizable material that a user has used, a recommendation for a mixture of two or more vaporizable materials that a user has not used, a recommendation for a mixture of two or more vaporizable materials that a user has used, a recommendation for a brand, a recommendation for a sale, a recommendation for a retailer, a recommendation for a manufacturer, a recommendation for an event, a recommendation for a social network, or a combination thereof. The central server can determine the recommendation data based on data received from at least one of a retailer, a manufacturer, an electronic device user, a vapor device user, a social network, or a combination thereof. The recommendation data can be generated in response to receiving usage data from the user device 1202a, 1202b, and/or 1202c and can be provided back to one or more of the user device 1202a, 1202b, and/or 1202c.

The computing device 1204 can utilize one or more recommendation systems/methods. For example, the computing device 1204 can utilize a non-personalized systems recommend products to individual consumers based on averaged information about the products provided by other consumers. Examples of non-personalized product recommendation systems are those of Amazon.com and Moviefinder.com. The same product recommendations are made to all consumers seeking information about a particular product(s) and all product recommendations are completely independent of any particular consumer.

The computing device 1204 can utilize an item-to-item systems recommend other products to an individual consumer based on relationships between products already purchased by the consumer or for which the consumer has expressed an interest. The relationships employed typically are brand identity, fragrance, sales appeal, market distribution, and the like. In all cases the information on which the relationships are based is implicit. In other words, no explicit input regarding what the consumer is looking for or prefers is solicited by these systems. Rather, techniques such as data mining are employed to find implicit relationships between products for which the individual consumer has expressed a preference and other products available for purchase. The actual performance of products or whether the consumer (or other consumers) ultimately did prefer the products purchased play no part in formulating recommendations with these types of systems.

The computing device 1204 can utilize an attribute-based recommendation systems utilize syntactic properties or descriptive "content" of available products to formulate their recommendations. In other words, attribute-based systems assume that the attributes of products are easily classified and that an individual consumer knows which classification he or she should purchase without help or input from the recommendation system, The computing device 1204 can utilize a content-based filtering recommendation systems are based on a description of the item and a profile of the user's preference. In a content-based recommender system, keywords are used to describe the items and a user profile is built recommendation system indicate the type of item this user likes. In other words, these algorithms try to recommend items that are similar to those that a user liked in the past (or is examining in the present). In particular, various candidate items are compared with items previously rated by the user and the best-matching items are recommended, The computing device 1204 can utilize a collaborative filtering (also referred to as social-information filtering) recommendation system that typically records an extended product preference set that can be matched with a collaborative group. In other words, collaborative filters recommend products that "similar users" have rated highly. Often the social-information is a similar pattern of product preferences.

In an aspect, data can be derived by system and/or device analysis. Such analysis can comprise at least by one of instant analysis performed by the user device 1202*a*, 1202*b*, and/or 1202*c* or archival data transmitted to a third party for analysis and returned to the user device 1202*a*, 1202*b*, and/or 1202*c* and/or computing device 1204. The result of either data analysis can be communicated to a user of the user device 1202*a*, 1202*b*, and/or 1202*c* to, for example, inform the user of their eVapor use and/or lifestyle options. In an aspect, a result can be transmitted back to at least one authorized user interface.

In an aspect, the database 1214 can store information relating to the user device 1202*a*, 1202*b*, and/or 1202*c* such as the address element 1210 and/or the service element 1212. As an example, the computing device 1204 can obtain the device identifier 1208*a*, 1208*b*, and/or 1208*c* from the user device 1202*a*, 1202*b*, and/or 1202*c* and retrieve information from the database 1214 such as the address element 1210 and/or the service elements 1212. As a further example, the computing device 1204 can obtain the address element 1210 from the user device 1202*a*, 1202*b*, and/or 1202*c* and can retrieve the service element 1212 from the database 1214, or vice versa. Any information can be stored in and retrieved from the database 1214. The database 1214 can be disposed remotely from the computing device 1204 and accessed via direct or indirect connection. The database 1214 can be integrated with the computing device 1204 or some other device or system. Data stored in the database 1214 can be stored anonymously and can be destroyed based on a transient data session reaching a session limit.

Figure 13:
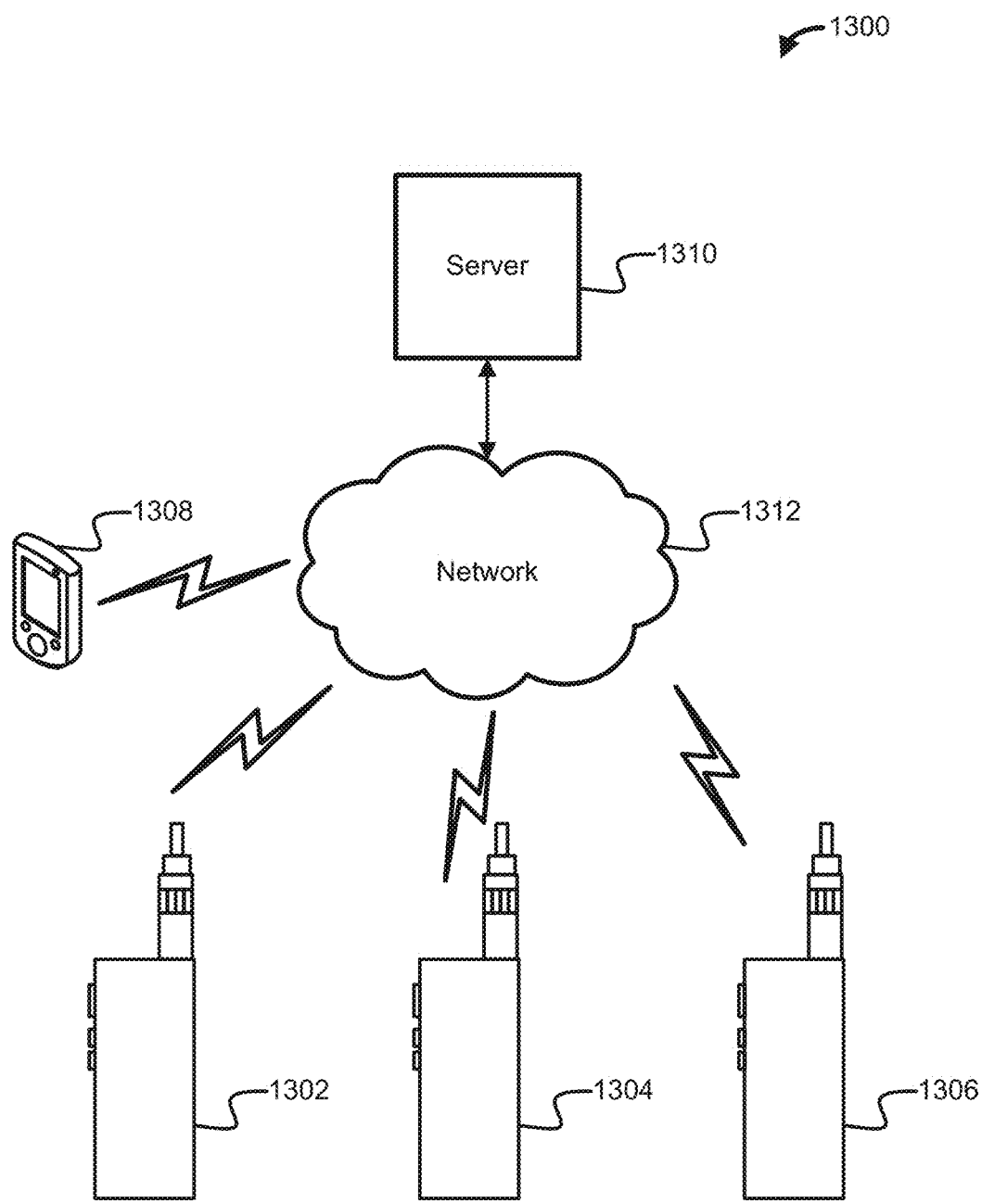
FIG. 13 illustrates another exemplary operating environment.

FIG. 13 illustrates an ecosystem 1300 configured for sharing and/or syncing data such as usage information (including chronological usage), type of vaporizable and/or non-vaporizable material used, frequency of usage, location of usage, recommendation data, communications (e.g., text messages, advertisements, photo messages), simultaneous use of multiple devices, and the like) between one or more devices such as a vapor device 1302, a vapor device 1304, a vapor device 1306, and an electronic communication device 1308. In an aspect, the vapor device 1302, the vapor device 1304, the vapor device 1306 can be one or more of an e-cigarette, an e-cigar, an electronic vapor modified device, a hybrid electronic communication handset coupled/integrated vapor device, a micro-sized electronic vapor device, or a robotic vapor device. In an aspect, the electronic communication device 1308 can comprise one or more of a smartphone, a smart watch, a tablet, a laptop, and the like.

In an aspect data generated, gathered, created, etc., by one or more of the vapor device 1302, the vapor device 1304, the vapor device 1306, and/or the electronic communication device 1308 can be uploaded to and/or downloaded from a central server 1310 via a network 1312, such as the Internet. Such uploading and/or downloading can be performed via any form of communication including wired and/or wireless. In an aspect, the vapor device 1302, the vapor device 1304, the vapor device 1306, and/or the electronic communication device 1308 can be configured to communicate via cellular communication, WiFi communication, Bluetooth® communication, satellite communication, and the like. The central server 1310 can store uploaded data and associate the uploaded data with a user and/or device that uploaded the data. The central server 1310 can access unified account and tracking information to determine devices that are associated with each other, for example devices that are owned/used by the same user. The central server 1310 can utilize the unified account and tracking information to determine which of the vapor device 1302, the vapor device 1304, the vapor device 1306, and/or the electronic communication device 1308, if any, should receive data uploaded to the central server 1310.

In an aspect, the uploading and downloading can be performed anonymously. The data can be shared over a transient data session with the central server 1310. The transient data session can comprise a session limit. The session limit can be based on one or more of a number of puffs, a time limit, and a total quantity of vaporizable material. The data can comprise usage data and/or a usage profile. The central server 1310 can destroy the data once the session limit is reached. While the transient data session is active, the central server 1310 can provide a usage profile to one of the vapor device 1302, the vapor device 1304, the vapor device 1306 to control the functionality for the duration of the transient data session.

For example, the vapor device 1302 can be configured to upload usage information related to vaporizable material consumed and the electronic communication device 1308 can be configured to upload location information related to location of the vapor device 1302. The central server 1310 can receive both the usage information and the location information, access the unified account and tracking information to determine that both the vapor device 1302 and the electronic communication device 1308 are associated with the same user. The central server 1310 can thus correlate the user's location along with the type, amount, and/or timing of usage of the vaporizable material. The central server 1310 can further determine which of the other devices are permitted to receive such information and transmit the information based on the determined permissions. In an aspect, the central server 1310 can transmit the correlated information to the electronic communication device 1308 which can then subsequently use the correlated information to recommend a specific type of vaporizable material to the user when the user is located in the same geographic position indicated by the location information.

In another aspect, the central server 1310 can provide one or more social networking services for users of the vapor device 1302, the vapor device 1304, the vapor device 1306, and/or the electronic communication device 1308. Such social networking services include, but are not limited to, messaging (e.g, text, image, and/or video), mixture sharing, product recommendations, location sharing, product ordering, and the like.

In an aspect, the vapor device 1302, the vapor device 1304, and/or the vapor device 1306 can be in communication with the electronic communication device 1308 to enable the electronic communication device 1308 to generate a user interface to display information about and to control one or more functions/features of the vapor device 1302, the vapor device 1304, and/or the vapor device 1306. The electronic communication device 1308 can request access to one or more of the vapor device 1302, the vapor device 1304, and/or the vapor device 1306 from the central server 1310. The central server 1310 can determine whether or not the electronic communication device 1308 (or a user thereof) is authorized to access the one or more of the vapor device 1302, the vapor device 1304, and/or the vapor device 1306. If the central server 1310 determines that access should be granted, the central server 1310 can provide an authorization token to the electronic communication device 1308 (or to the vapor device 1302, the vapor device 1304, and/or the vapor device 1306 on behalf of the electronic communication device 1308). Upon receipt of the authorization token, the one or more of the vapor device 1302, the vapor device 1304, and/or the vapor device 1306 can partake in a communication session with the electronic communication device 1308 whereby the electronic communication device 1308 generates a user interface that controls one or more functions/features of and displays information about the one or more of the vapor device 1302, the vapor device 1304, and/or the vapor device 1306.

Figure 14:
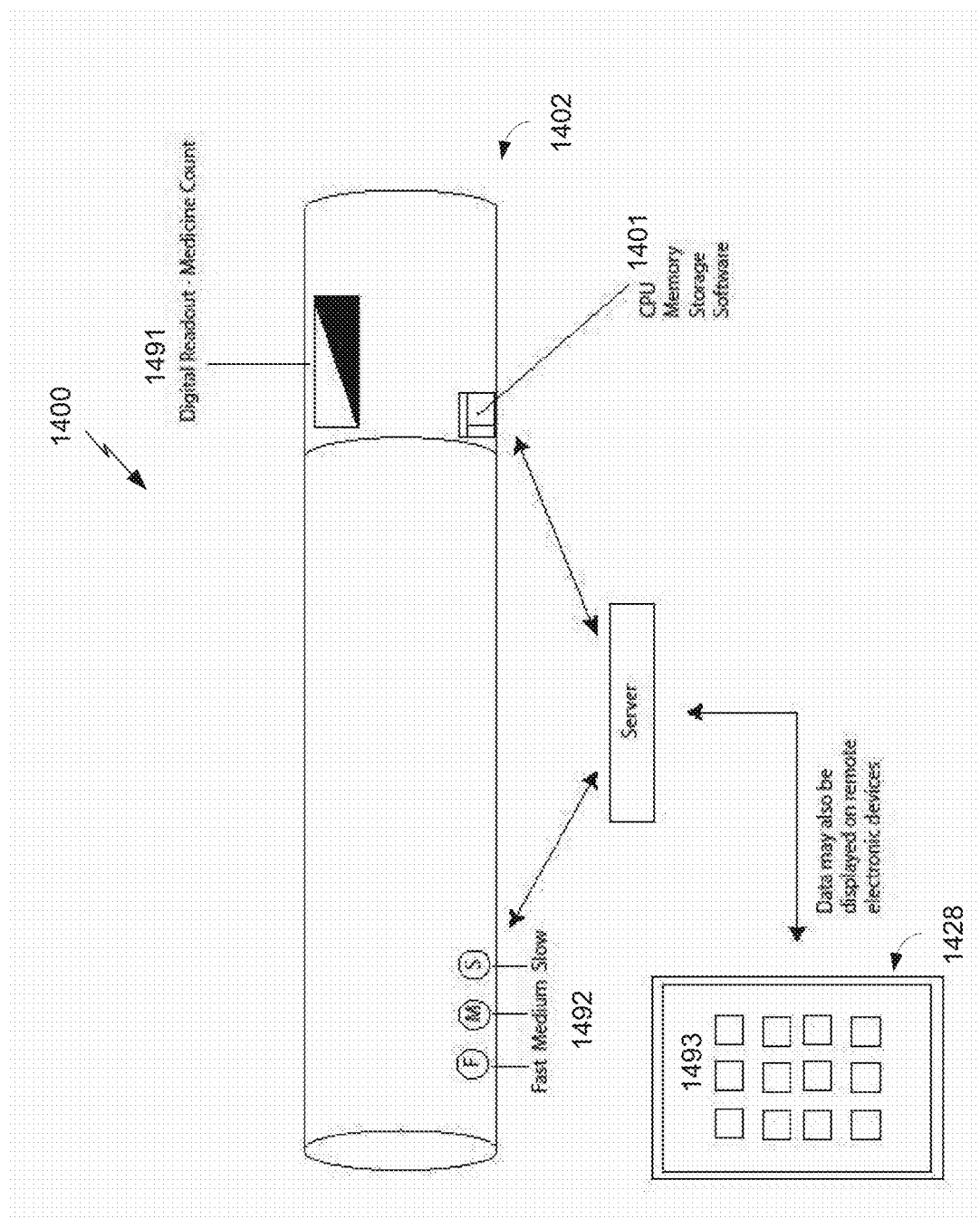
FIG. 14 is a schematic diagram illustrating aspects of an eVapor device comprising a vapor dispensing system and a display component.

Aspects of the present disclosure pertain to the manufacture, design, implementation, and installation of an eVapor device 1400, as illustrated in FIG. 14. The eVapor device 1400 comprises a display component that is configured to visibly indicate the remaining usage of the eVapor device 1400. For example, an eVapor device 1400 can comprise a vapor dispensing system 1402 and a display component (1491, 1492). The display component (1491, 1492) can be configured to visibly indicate how much of an eLiquid remains in an eLiquid reservoir, or how many puffs remaining available.

As discussed herein, the eLiquid generally refers to a vaporizable liquid stored in reservoirs inside the eVapor device 1400. However, the eVapor device can be configured to display how much gas remains in a compressed gas canister or tank, or to display how much vaporizable solid remains. The remaining usage can refer to a quantity of a vaporizable component (solid, liquid, gas), to the number of puffs remaining, to a time remaining at current usage rates, and/or the like.

In accordance with an example embodiment, a device 1400 comprises a vapor dispensing system 1402, a processor 1401 connected to the vapor dispensing system 1402, and a display (1491, 1492, 1493). The device 1400 may be configured to communicate with an ancillary device 1428. In accordance with various example embodiments, the display is configured to indicate the remaining usage on the exterior of the device 1400 or on the ancillary device 1428.

The eVapor device 1400 comprises one of: a personal vaporizer, a smokeless pipe, an e-cigarette, an e-cigar, an eVapor pipe, a micro-eVapor device, a hybrid electronic communication and eVapor device, a vape Bot, a headset, and a monocle. Moreover, the eVapor apparatus can comprise any suitable component for providing vapor to a user. Generally, an eVapor apparatus is an electronic device for use in providing a vapor output and typically includes a processor.

As illustrated in FIG. 14, the vapor dispensing system 1402 is located near the proximal end of the device 1400. Nevertheless, the eVapor apparatus can be integral with and or located throughout the device 1400. For example, various reservoirs, tanks, electronic components, memory, vaporizers, and or the like may be located in any suitable location within the length of the device 1400. As discussed herein, the proximal end of the device 1400 may be the end closest to the user of the device, or the inhalation end, and the distal end may be the end opposite the proximal end.

In an example embodiment, the processor 1401 is configured for controlling the display of the remaining usage. The processor 1401 can be operably connected to the display (1491, 1492, 1493) for controlling the output displayed via the display (1491, 1492, 1493). Although the processor may internally determine what is to be displayed, in another embodiment, the display may be controlled based on a signal received at the processor. The signal received at the processor may be received from one or more of: sensors within the device 1400, the ancillary device 1428, other remote servers, and/or the like. In various example embodiments, the processor is configured, based on the signal, to: display the amount of material delivered to the user, display the amount of source material remaining, display a rate of production of eVapor by the eVapor device, order product, play a game, send a message, or retrieve information.

In one example embodiment, the processor 1401 receives information from a memory. Thus, the device 1400 may comprise a memory operably connected to the processor 1401. In another example embodiment, the processor 1401 receives information from at least one of: an eVapor related network system, a locally-cached storage device, and remote server. Thus, the processor 1401 can be coupled to the network communication component. For example, the eVapor related network system can share usage rates or amounts of eLiquid remaining in other networked devices, in an example embodiment, a smoker's anonymous club can be networked electronically, and networked devices can share information regarding the amount used/remaining in each device, rank the networked devices, and facilitate encouragement and support from members of the club. In another example, the usage information can be communicated to a physician monitoring a dosing regimen for a patient. In another example, a network of eVapor devices can play a game based on usage of their devices. In an extreme example, networked users can communicate via Morris Code based on the puff durations.

In another example embodiment, a network communication component may be coupled to the processor 1401. The processor 1401 can be configured for receiving instructions via the network communication component for displaying usage information. The instructions may be, for example, from a database that is remote from the processor 1401.

In other embodiments, the processor is configured for sharing data with at least one of a user interface device or a server node via the network communication component. The user interface device is also referred to herein as the ancillary device 1428. In one embodiment, the user interface device comprises one of a dongle, a smartphone, a laptop, a tablet computer, and a desktop computer. Moreover, the user interface device may comprise a graphical user interface comprising at least one of lighted signal lights, gauges, boxes, forms, check marks, avatars, visual images, graphic designs, lists, active calibrations or calculations, 2D interactive fractal designs, 3D fractal designs, 2D and/or 3D representations of vapor devices or other interface system functions.

In an example embodiment, the display (1491, 1492) forms at least a portion of an outer surface of the device 1400, or is located in device 1400 such that the display is visible from the exterior of the device 1400. For example, the display 1491 can be located on the outside of an e-cigarette and have a length that is about a quarter of the length of the e-cigarette and it may wrap around about an eighth of the circumference of the e-cigarette. In another example embodiment, the display (1491, 1492) further comprises a graphical display for displaying graphical representations under the command of the processor. Thus, the amount of the eLiquid remaining in the eVapor device can be displayed on an outer surface of the eVapor device.

In an example embodiment, the display (1491, 1492) can be located near the distal end of the device 1400, can be located near the proximal end of the device 1400, and/or cover any suitable portion of the exterior of the device (including covering the entire device In an example embodiment, the amount of the eLiquid remaining in the eVapor device is displayed as at least one of a digital readout (e.g., percentage full/empty), shades of colors, intensity of light, or demarcations from full to empty. In a first example embodiment, the display 1491 is a digital readout display. In this regard, the display 1491 can be a segment display comprising segments that switch on and off to give the appearance of a desired glyph. The segments can be single light emitting diodes or liquid crystals, such as those used in digital watches. The display 1491 can be a liquid crystal display, plasma display panel, tactile electronic display or the like. Moreover, the digital readout display can be any display capable of providing a digital output to indicate numbers, symbols, words, or in other ways communicate information to the user of the eVapor device 1400.

In another example embodiment, the device 1400 can be further configured to display a relative rate of vaporization of the eLiquid (fast medium slow) as compared to a user's usual rate, a typical user rate, or a user rate based on a strength measurement of this particular user's puffs. In another example embodiment, the display 1492 can be a series of lights located along the device 1400. For example, the display 1492 can comprise three lights. The first light can be for indicating that the user is using the eLiquid at a fast or high rate. The second light can indicate a medium, normal, or average rate of usage, and the third light can indicate a slow or low rate of usage. The lights can turn on and off to so indicate. Alternatively, a single light can change intensity, or color to indicate the rate of usage of the eLiquid. Moreover, the display 1492 can comprise any suitable component for visibly indicating the rate of usage of the eLiquid, eGas, or other vaporizable material.

In yet another example embodiment, the display 1493 can be located on an ancillary device 1428. The ancillary device 1428 can be configured to display rate of usage, amount of usage, and any other appropriate information on its display screen.

The information communicated to the user of the eVapor device 1400 may assist with operation of the device. For example, the eVapor device 1400 can indicate how many puffs remain in the device. The eVapor device 1400 can indicate a precise number of puffs remaining based on the types of puffs the user is currently taking. This information can be updated real time as the user is puffing. In fact, the information can be based on the last puff, or the last number of puffs, to make the estimate of the remaining puffs more accurate.

The information communicated to the user can indicate the remaining volume of eLiquid, the remaining quantity of eGas, or eSolid for use in creating vapor. The processor can cause the display to indicate this sort of information to the user.

As illustrated in FIG. 14, the eVapor device may be portable. For example, the eVapor device 1400 may be designed to be tight and small enough for carrying on the person of a user. However, it is also contemplated that the eVapor device 1400 could comprise a larger vaporizer, such as those placed on a desk or other semi-permanent location, and that such the eVapor device 1400 could also comprise the display (1491, 1492).

In one example embodiment, the display (1491, 1492) is configured to display remaining usage via at least one of light projection, pixel patterns, mirrors, LED and OLED.

In accordance with various example embodiments, the display (1491, 1492, 1493) may comprise emoji's, gifs, video, symbols, photos, designs, letters, words, symbols, etc. In particular, the information displayed may be configured for conveying messaging. For example, the information displayed may be a text message, advertising, political statement, inspirational message, or the like. The display can provide a congratulatory statement based on the usage of the eVapor device 1400.

The display can be configured to be capably transient in its display, and/or to have its display be switchable on demand. Thus, the display of one or more a graphic(s) can change over time. The display can be changed on a scheduled basis. For example, the display can change based on the time of day. In a coaching embodiment, the display can display the user's goals in comparison to the user's actual usage of the device. The user's goals with respect to usage may be changed, may vary depending on geo-fenced location, time of day, day of the week, holiday, etc.

For example, the display can change based on the location of the user. The display on an e-cigarette, for example, may be different in a pub or bar than when in a shopping mall or store or campus. Thus, the device 1400 may utilize any suitable technology for identifying its own location and changing the graphic based on its location. The location identification can be provided by Global Positioning Satellite, cell towers, or other suitable location identifying technology, as provided by the device 1400, an ancillary device 1428 (such as a mobile phone), a remote server, and/or the like.

The display may be based on the presence of another device 1400. For example, if two e-cigarette devices were brought in proximity to each other, the display may be changed to alert the users of the respective devices of each other's presence. As such, the graphics may be configured to aid two or more people to connect/find each other in a crowded room. The range can be any suitable range, and thus, the graphics may facilitate human networking within a city, a neighborhood, a concert, a conference, and/or the like. The graphic can accomplish this networking assistance via text messages or any other suitable graphic. However, in another example embodiment, a first group of users use a first color such as red, and a second group of users use a second color such as blue such that users can easily identify others of their matching group, or alternatively avoid those of their own group to meet others outside their own group. In an example embodiment, the processor is configured to change the graphics based on sortable conditions such as proximity.

The displayed indication of remaining eLiquid can be based on data from one or more sensors. The sensors may comprise temperature sensors, heat sensors, light sensors, accelerometer sensors, and/or any suitable sensor. In an example embodiment, the sensor (not shown in FIG. 14) can be in communication with the processor 1401, and the processor 1401 configured to receive sensor data from the sensor. The sensor can be configured to generate a signal representative of a quantity of, for example, the eLiquid remaining in the eLiquid reservoir. The sensor can be configured to sense either a volume or a weight of, for example, the eLiquid remaining in the eLiquid reservoir. In the case of a gas, the sensor can be configured to sense the pressure, measure the temperature, and/or measure the volume of the gas remaining in the tank. In an example embodiment, the processor 1401 is configured to calculate an amount of the eLiquid or eGas remaining in the eLiquid reservoir or eTank based on the sensor data from the sensor.

In another example embodiment, the sensor is configured to sense at least one of a length, a duration, a volume, and a pressure draw of a puff. The sensor can be configured to provide puff data relative to the puff to the processor. The processor can be configured to count a number of puffs. The processor can be configured to utilize the puff data, including the number of puffs, to determine a number of puffs remaining in the eVapor device, or to provide other information relating to the usage of the eVapor device 1400.

In particular, the processor can determine the number of puffs remaining, the amount of vaporizable material remaining, the time remaining, and the like based on the actual usage of the device by the current user of the device. Thus, the actual usage may comprise usage relative to the characteristics of the last puff, the average of the last few puffs, the average of a last time period, the average usage for this user, or based on a typical user, or preset standard usage rate, or the like. In one example embodiment, the typical puff data from other users can be used to determine current trends in vaping and the predicted remaining usage based on current vaping trends. But more likely beneficial is the most recent usage of the current user of the device. Thus, the information displayed of the remaining usage can be accurate, calibrated to the latest puff(s).

The processor can provide data to remote server or ancillary device 1428 for further processing, analysis, reporting or display.

In another different embodiment, the eVapor device 1400 comprises a mechanical eLiquid reservoir level display. This can be done by a float, a temperature driven display, or any non-electronic display system.

It is intended that "changing the graphic displayed" or "changing the display" can comprise altering the graphic, entirely changing the graphic, combining the graphic with other graphics, changing the data presented, and/or changing the information being communicated with those nearby. The display can further be changed by changing color hues, shades, levels of brightness, flashing, and/or the like.

In another example embodiment, the device 1400 further comprises input controls, not shown. The input controls can be used by a user of the device 1400 to control the eVapor device 1400, to select options, and the like. In various embodiments, a user can provide input to the processor via the input mechanisms on the ancillary device 1428 or another device. In an example embodiment the input can be provided by the user selecting options from a menu displayed on a touch screen.

The eVapor device 1400 can further comprise a gate (not shown) configured to limit a total vapor amount which may be drawn by a single inhaling action. Thus, the processor can automatically calculate a puff usage as an exact amount based on known maximum draw from the eVapor device. The processor 1401 can determine an appropriate restriction to place on the eVapor device. For example, the restriction may conserve the vaporizable material based on a financial budget, such that the eVapor will last until the user next purchases a refill. The restriction may conserve the vaporizable material based on a dosing regimen for a medicinal application, as set by a physician for a patient. The restriction may prevent overdose or unhealthy usage in recreational usage. The restriction may be configured to enhance enjoyment or to train a user in better use of the device. Whatever the purpose for the restriction, the restriction can limit the amount of material vaporized or released, or limit the strength or duration of a puff. Moreover, any suitable restriction can be made on the use of the device, based on the remaining usage data as determined by the processor.

Figure 15:
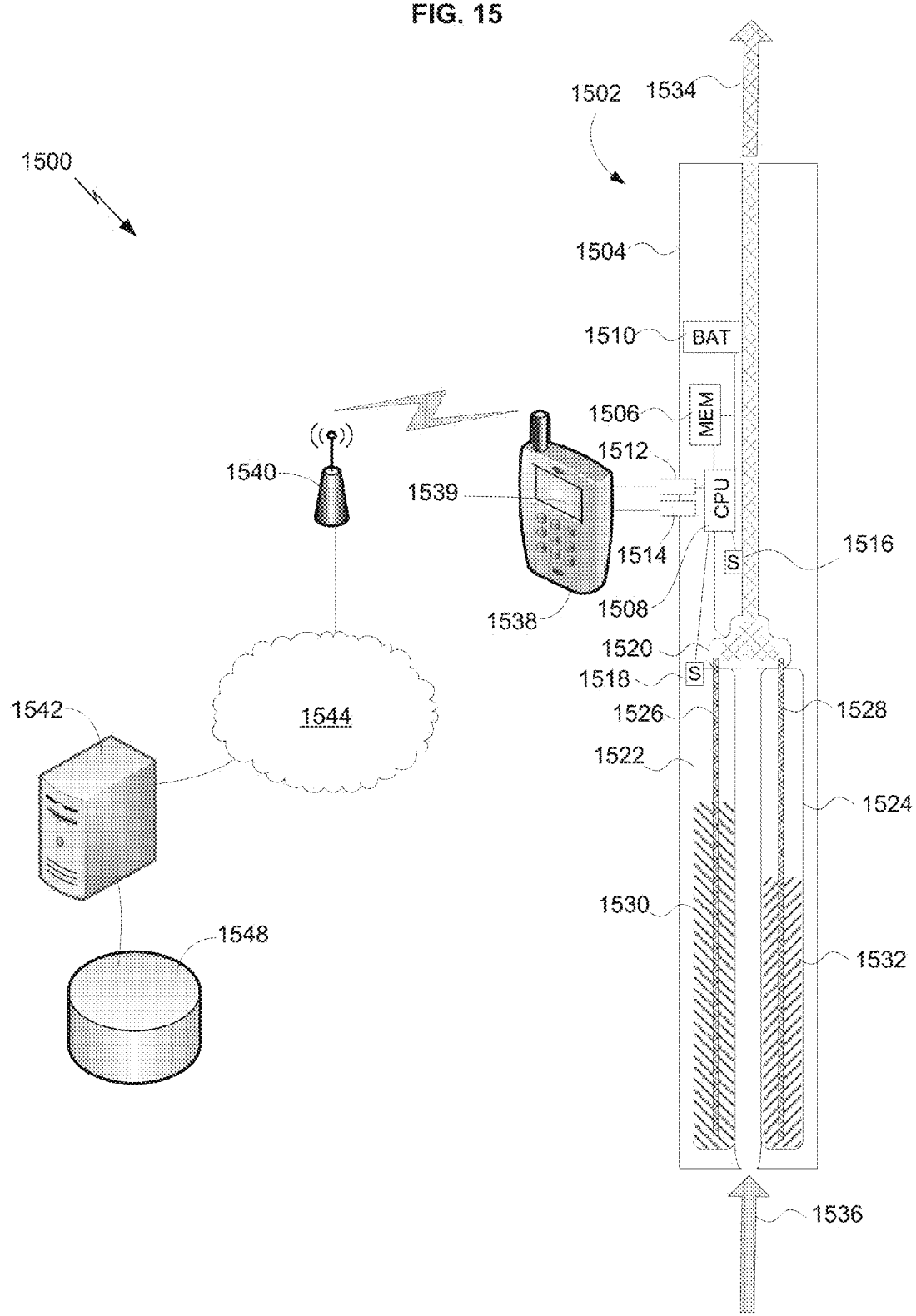
FIG. 15 is a schematic diagram illustrating alternative aspects of an eVapor device comprising a vapor dispensing system and a display component.

Referring to FIG. 15, alternative aspects of a system 1500 for display an amount of remaining usage of an eVapor device is illustrated. A single vapor device 1502 (also called a vaporizer or vaporizing device) is illustrated, but is should be appreciated that a recommendation system may include multiple such devices and ancillary equipment. The system 1500 may include an assembly 1502 for vaporizing a vaporizing fluid at a controlled rate, and optionally for combining vaporization of two or more different fluids in a controlled manner.

The assembly 1502 includes at least one container 1522 holding a vaporizable material 1530, sometimes referred to herein as a "first" container 1522 and "first" vaporizable material. In an aspect, the vaporizable material may be a fluid, such as a compressed gas, compressed liquid (e.g., a liquefied gas), or uncompressed liquid. Various suitable fluids are known in the art, for example, solutions of nicotine in glycerin, with or without flavor-enhancing agents, are known. In the alternative, or in addition, the first vaporizable material may be, or may include, a solid material. For embodiments using uncompressed liquids, the container 1522 may include a wick 1526 that carries the liquid to the vaporizing component 1520. Although the wick 1526 is shown only in the center of the container 1522 for illustrative clarity, it should be appreciated that the wick may substantially fill the container 1522. The container 1522 may be made of any suitable structural material, for example, an organic polymer, metal, ceramic, composite or glass material. Structural plastics may be preferred for disposable embodiments. Optionally, the apparatus 1502 may include one or more additional or "second" containers 1524 (one of potentially many shown), each configured similarly with a wick 1528 if suitable for the particular second vaporizable material 1532 being contained.

A vaporizer 1520 may be coupled to the first container 1522 and to any additional containers, e.g., second container 1524. For example, coupling may be via wicks 1526, 1528, via a valve, or by some other structure. The coupling mechanism may operate independently of gravity, such as by capillary action or pressure drop through a valve. The vaporizer 1520 is configured to vaporize the vaporizable material from the first container 1522 and any additional containers 1524 at controlled rates; in operation, the vaporizer vaporizes or nebulizes the material, producing an inhalable mist. In embodiments, the vaporizer may include a heater coupled to a wick, or a heated wick. A heating circuit may include a nickel-chromium wire or the like, with a temperature sensor (not shown) such as a thermistor or thermocouple. Within definable limits, by controlling suction-activated power to the heating element, a rate of vaporization may be controlled. At minimum, control may be provided between no power (off state) and one or more powered states. Other control mechanisms may also be suitable.

A processor 1508 is coupled to the vaporizer via an electrical circuit, configured to control a rate at which the vaporizer 1520 vaporizes the vaporizable material. In operation, the processor supplies a control signal to the vaporizer 1520 that controls the rate of vaporization. A receiver port 1512 is coupled to the processor, and the processor receives data determining the rate from the receiver port. Thus, the vaporization rate is remotely controllable, by providing the data. The processor 1508 may be, or may include, any suitable microprocessor or microcontroller, for example, a low-power application-specific controller (ASIC) designed for the task of controlling a vaporizer as described herein, or (less preferably) a general-purpose central processing unit, for example, one based on 80x86 architecture as designed by Intel™ or AMD™, or a system-on-a-chip as designed by ARM™ or other chip fabricator. The processor 1508 may be communicatively coupled to auxiliary devices or modules of the vaporizing apparatus 1502, using a bus or other coupling. Optionally, the processor 1508 and some or all of its coupled auxiliary devices or modules may be housed within or coupled to a housing 1504, substantially enclosing the containers 1524, 1524, the vaporizer 1520, the processor 1508, the receiver port 1512, and other illustrated components. The assembly 1502 and housing 1504 may be configured together in a form factor of an electronic cigarette, an electronic cigar, an electronic hookah, a hand-held personal vaporizer, or other desired form.

In related aspects, the assembly 1502 includes a memory device 1506 coupled to the processor 1508. The memory device 1506 may include a random access memory (RAM) holding program instructions and data for rapid execution or processing by the processor during control of the vaporizer 1502. When the vaporizer 1502 is powered off or in an inactive state, program instructions and data may be stored in a long-term memory, for example, a non-volatile magnetic, optical, or electronic memory storage device, which is not separately shown. A controlled rate or measured rate of vaporization, material vaporizes, times of use, and other data may be stored in the device memory 1506 and/or provided and stored by an ancillary device 1538 or server 1542 in data store 1548.

Either or both of the RAM or the storage device may comprise a non-transitory computer-readable medium holding program instructions, that when executed by the processor 1508, cause the apparatus 1502 to perform a method or operations as described herein. Program instructions may be written in any suitable high-level language, for example, C, C++, C#, or Java™, and compiled to produce machine-language code for execution by the processor. Program instructions may be grouped into functional modules, to facilitate coding efficiency and comprehensibility. It should be appreciated that such modules, even if discernable as divisions or grouping in source code, are not necessarily distinguishable as separate code blocks in machine-level coding. Code bundles directed toward a specific type of function may be considered to comprise a module, regardless of whether or not machine code on the bundle can be executed independently of other machine code. In other words, the modules may be high-level modules only.

In a related aspect, the processor 1508 receives a user identifier and stores the user identifier in the memory device 1506. A user identifier may include or be associated with user biometric data, that may be collected by a biometric sensor or camera included in the assembly 1502 or in a connected or communicatively coupled ancillary device 1538, such as, for example, a smart phone executing a vaporizer interface application. The processor 1508 may generate data indicating a quantity of the vaporizable material 1530, 1532 consumed by the vaporizer 1520 in a defined period of time, and save the data in the memory device 1506. The processor 1508 and other electronic components may be powered by a suitable battery 1510, as known in the art, or other power source. A user identifier may be associated by a server 1542 with use data gathered via the communication network 1540, 1544 from the vaporizer 1502. The server 1542 may identify users with similar use profiles by comparing use data from data store 1548. The server 1542, or a coupled server, may provide the user with use data via a recommendation network interface that can be browsed via a smart phone or other ancillary device 1538. In addition, the user may use the recommendation network to connect with other users with similar use profiles.

The assembly 1502 may optionally include a sensor 1516, or multiple sensors 1516, 1518, to provide measurement feedback to the processor. For example, a sensor 1516 may be positioned downstream of the vaporizer, and the processor may derive the data used for controlling vaporization rate at least in part by interpreting a signal from the sensor correlated to a quantity of vapor emitted by the vaporizer. For further example, a sensor 1518 positioned upstream of the vaporizer, and the processor may derive the data at least in part by interpreting a signal from the sensor correlated to an amount of the vaporizable material remaining in the container, or to an amount of the vaporizable material passed from the container to the vaporizer, or both. "Downstream" and "upstream" relate to the direction of air flow or air/vapor mixture flow through the apparatus 1502, as illustrated by discharge arrow 1534 and inlet 1536. Suction applied at a tip draws inlet air 1536 through the vaporizer 1520, discharging a vapor/air mixture 1535 at the tip. Sensors 1516, 1518 may include, for example, optical sensors, temperature sensors, motion sensors, flow speed sensors, microphones or other sensing devices.

The sensors can directly measure the amount of vaporizable material remaining to be used, or can provide data from which such information can be derived.

In related aspects, the assembly may include a transmitter port 1514 coupled to the processor. The memory 1506 may hold a designated network address, and the processor 1508 may provide data indicating the quantity of the vaporizable material consumed by the vaporizer to the designated network address in association with the user identifier, via the transmitter port 1514. Other data may include times and durations of use, type of vaporizable material consumed, and other data.

An ancillary device, such as a smartphone 1538, tablet computer, or similar device, may be coupled to the transmitter port 1514 via a wired or wireless coupling. For example, the apparatus 1502 may include a serial port, for example a USB port, coupled to receiver and transmitter inputs to the processor 1508. In the alternative, or in addition, a wireless port (not shown) using Wifi (IEEE 802.11), Bluetooth, infrared, or other wireless standard may be coupled to the processor 1508. The ancillary device 1538 may be coupled to the processor 1508 for providing user control input to vaporizer control process operated executing on the processor 1508. User control input may include, for example, selections from a graphical user interface or other input (e.g., textual or directional commands) generated via a touch screen, keyboard, pointing device, microphone, motion sensor, camera, or some combination of these or other input devices, which may be incorporated in the ancillary device 1538. A display 1539 of the ancillary device 1538 may be coupled to the processor 1401, for example via a graphics processing unit (not shown) integrated in the ancillary device 1538. The display 1539 may include, for example, a flat screen color liquid crystal (LCD) display illuminated by light-emitting diodes (LEDs) or other lamps, a projector driven by an LED display or by a digital light processing (DLP) unit, or other digital display device. User interface output driven by the processor 1508 may be provided to the display device 1539 and output as a graphical display to the user. Similarly, an amplifier/speaker or other audio output transducer of the ancillary device 1538 may be coupled to the processor 1508 via an audio processing system. Audio output correlated to the graphical output and generated by the processor 1508 in conjunction with the ancillary device 1538 may be provided to the audio transducer and output as audible sound to the user.

The ancillary device 1538 may be communicatively coupled via an access point 1540 of a wireless telephone network, local area network (LAN) or other coupling to a wide area network (WAN) 1544, for example, the Internet. A server 1542 may be coupled to the WAN 1544 and to a database 1548 or other data store, and communicate with the apparatus 1502 via the WAN and couple device 1539. In alternative embodiments, functions of the ancillary device 1538 may be built directly into the apparatus 1502, if desired.

In related aspects, the processor 1508 may transmit measured or specified use data to the device 1538, which may relay the data to the server 1542 for providing, distributing, and sharing recommendation data in the network. For privacy protection, the server 1542 may delete the data after use. The server may protect use data from disclosure unless authorized by a user of the device 1502. The system 1500 may be used to implement a recommendation system as described herein. Other, similar systems may also be suitable.

Figure 16:
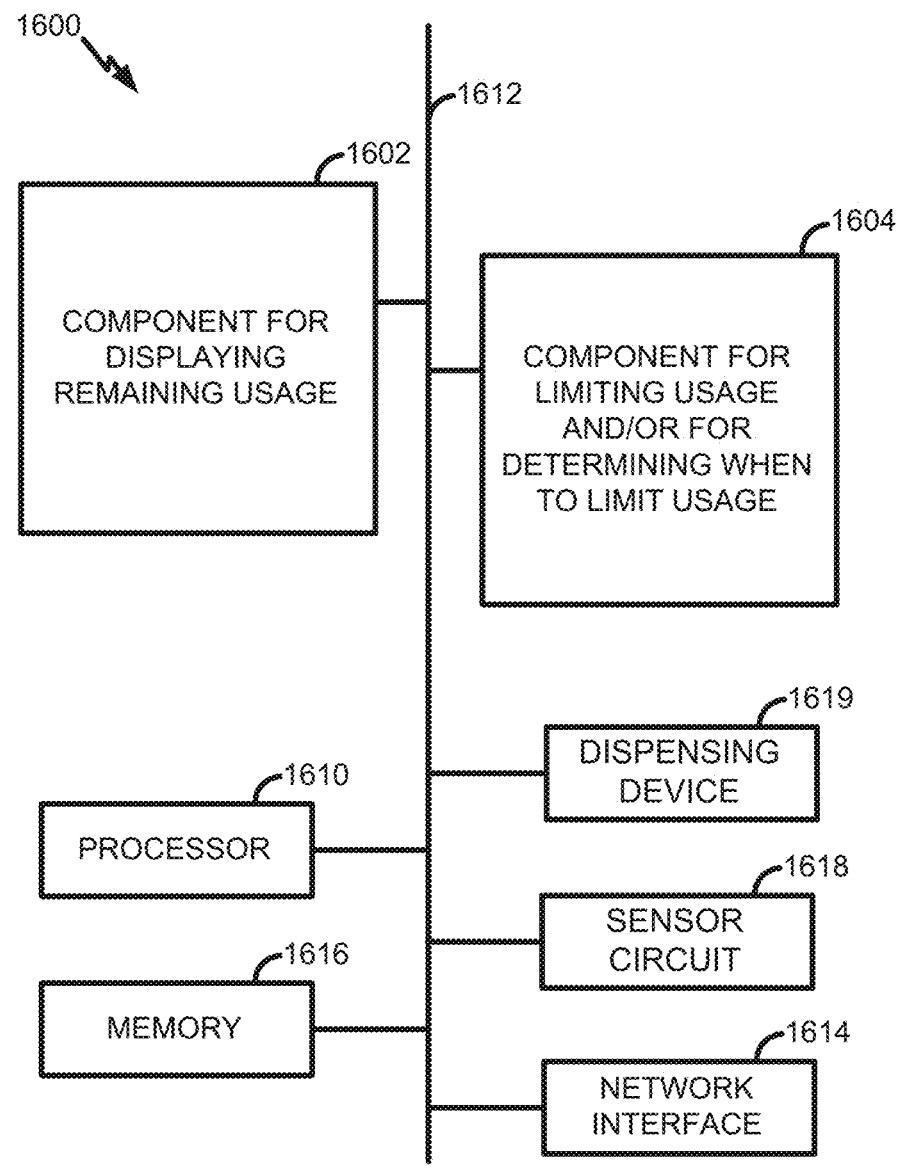
FIG. 16 is a block diagram illustrating aspects of displaying remaining usage of an eVapor device.

FIG. 16 is a block diagram illustrating components of an apparatus or system 1600 for a recommendation network, in accord with the foregoing examples. The apparatus or system 1600 may include additional or more detailed components as described herein. For example, the processor 1610 and memory 1616 may contain an instantiation of a controller for an electronic vaporizing device as described herein. As depicted, the apparatus or system 1600 may include functional blocks that can represent functions implemented by a processor, software, or combination thereof (e.g., firmware).

As illustrated in FIG. 16, the apparatus or system 1600 may comprise an electrical component 1602 for displaying remaining usage. The component 1602 may be, or may include, a means for displaying remaining usage. Said means may include the processor 1610 coupled to the memory 1616, and to the network interface 1614 and a transceiver 1618, the processor executing an algorithm based on program instructions stored in the memory. Such algorithm may include a sequence of more detailed operations, for example, receiving input to determine the remaining usage. The input can be from sensors, remote servers, and user input via the device or an ancillary device. Thus, the electrical component 1602 may display remaining usage as instructed by the processor.

The apparatus or system 1600 may further comprise an electrical component 1604 for limiting usage. The component 1604 may be, or may include, a means for determining when to limit the usage and for commanding limiting of usage. Said means may include the processor 1610 coupled to the memory 1616, and to the network interface 1614 and transceiver 1618, the processor executing an algorithm based on program instructions stored in the memory. Such algorithm may include a sequence of more detailed operations, for example, as described in connection with any of the methods as described herein, or any other suitable method.

The apparatus 1600 may include a processor module 1610 having at least one processor, in the case of the apparatus 1600 configured as a controller configured to operate transceiver 1618. The processor 1610, in such case, may be in operative communication with the memory 1616, interface 1614 or transceiver 1618 via a bus 1612 or similar communication coupling. The processor 1610 may effect initiation and scheduling of the processes or functions performed by electrical components 1602-1604.

In related aspects, the apparatus 1600 may include a network interface module operable for communicating with a server over a computer network. The apparatus may include a transceiver 1618 for transmitting and receiving information to/from a server. In further related aspects, the apparatus 1600 may optionally include a module for storing information, such as, for example, a memory device/module 1616. The computer readable medium or the memory module 1616 may be operatively coupled to the other components of the apparatus 1600 via the bus 1612 or the like. The memory module 1616 may be adapted to store computer readable instructions and data for enabling the processes and behavior of the modules 1602-1604, and subcomponents thereof, or of the method 1800 and one or more additional operations disclosed herein. The memory module 1616 may retain instructions for executing functions associated with the modules 1602-1604. While shown as being external to the memory 1616, it is to be understood that the modules 1602-1604 can exist within the memory 1616.

Figure 17:
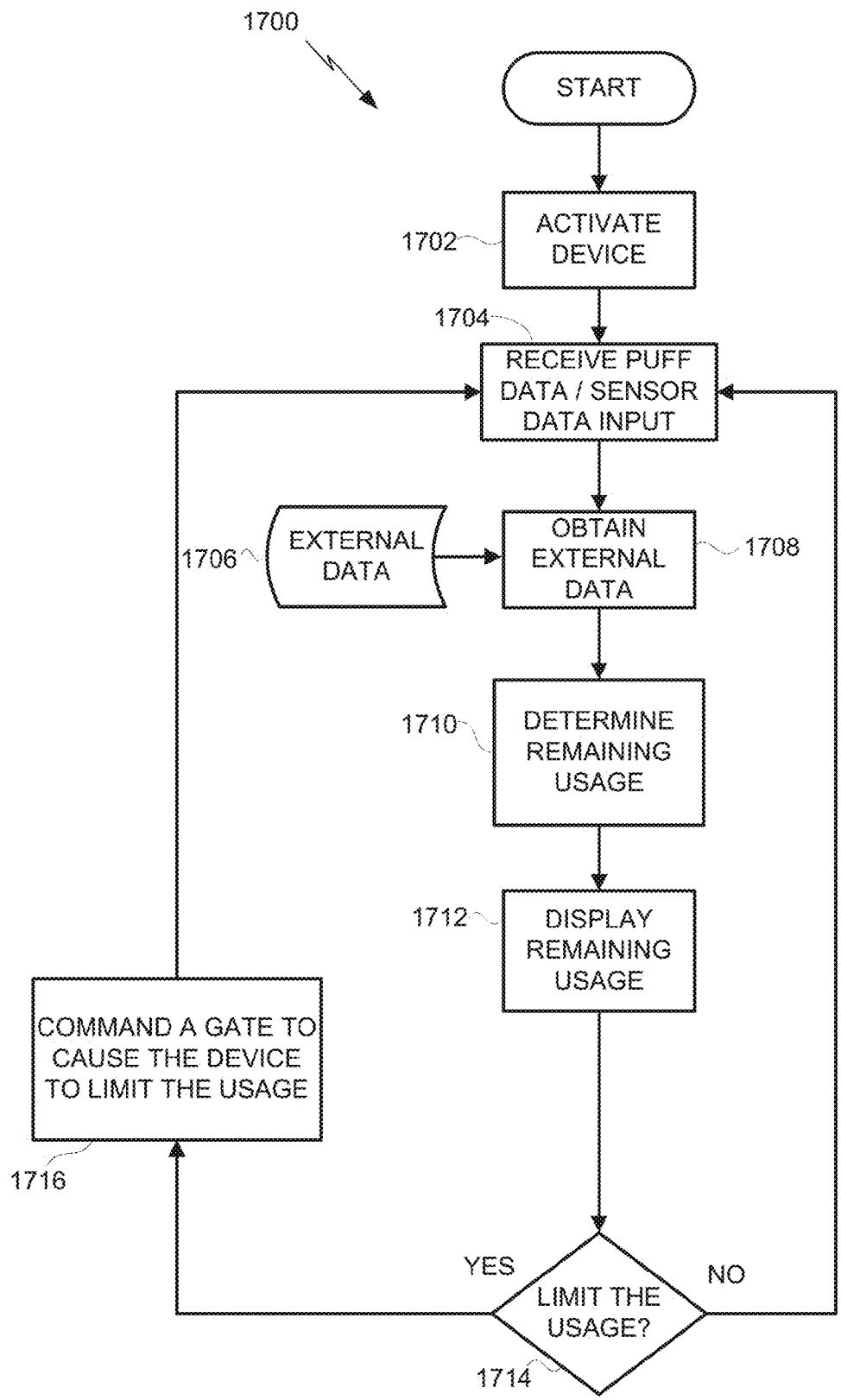
FIG. 17 is a flow diagram illustrating a control algorithm for displaying how much of an eLiquid remains in an eVapor device or how many puffs remain available.

An example of a control algorithm 1700 is illustrated by FIG. 17, for execution by a processor of an electronic vaporizing device as described herein. The algorithm 1700 may be triggered by activation of the device at 1702. For example, when a user takes a puff, the processor may activate the device. At 1704, the processor may receive input, such as an input signal comprising puff data/sensor data.

At 1708, external data, 1706 is received by the processor comprising puff data or other usage data. The external data may also comprise other data useful for determining how much usage remains for the device. The external data 1706 can be obtained from an on-board database, from an ancillary device, or remote servers/databases.

At 1710, the processor may make a determination of how much usage remains in the device.

At 1712, the remaining usage is displayed. For example, the processor sends a signal causing the display to display the remaining usage in terms of time, or number of puffs. The processor can also command the display to display a rate of usage of the vaporizable material.

At 1714, the processor determines whether to limit the usage. This decision can be made based on the puff data or calculated remaining usage or rate of usage. For example, the device 1400 can determine that the user is taking too strong of puffs and using the vaporizable material at too great a rate. At 1716, in response to a determination to limit the usage, the processor can command a gate to cause the device to limit the puff, limit the vaporization, or both. If not, the usage continues unlimited. Of course the device may he caused to time-out or go into power conservation mode if the device 1400 is not used for a period of time, or for other reasons.

Figure 18:
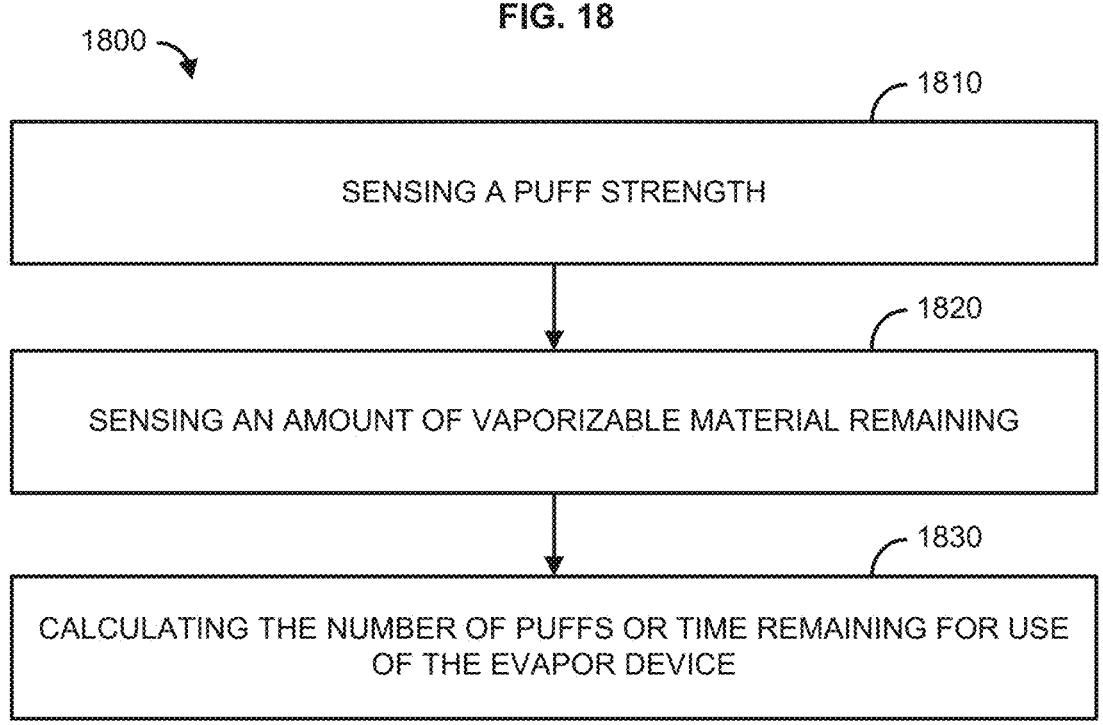
FIG. 18 illustrates an exemplary method.

In view the foregoing, and by way of additional example, disclosed are methods for an eVapor device having a display skin, as may be performed by a server as described herein, alone or in combination with other elements of the systems disclosed herein. The server may include at least memory, a transceiver, and a processor. Referring to FIG. 18, a method 1800, of displaying remaining usage by a device comprising an eVapor apparatus, may include, at 1810, sensing a puff strength. The method 1800 may further include, at 1820, sensing an amount of vaporizable material remaining. The sensors can create data that is provided to the processor. The method 1800 may further include, at 1830, the processor calculating the number of puffs remaining or the time remaining for use of the eVapor device 1400. In other words, the method 1800 can comprise determining at the processor, based on the data, the indication of the remaining quantity of vapor that can be provided by the eVapor device.

Figure 19:
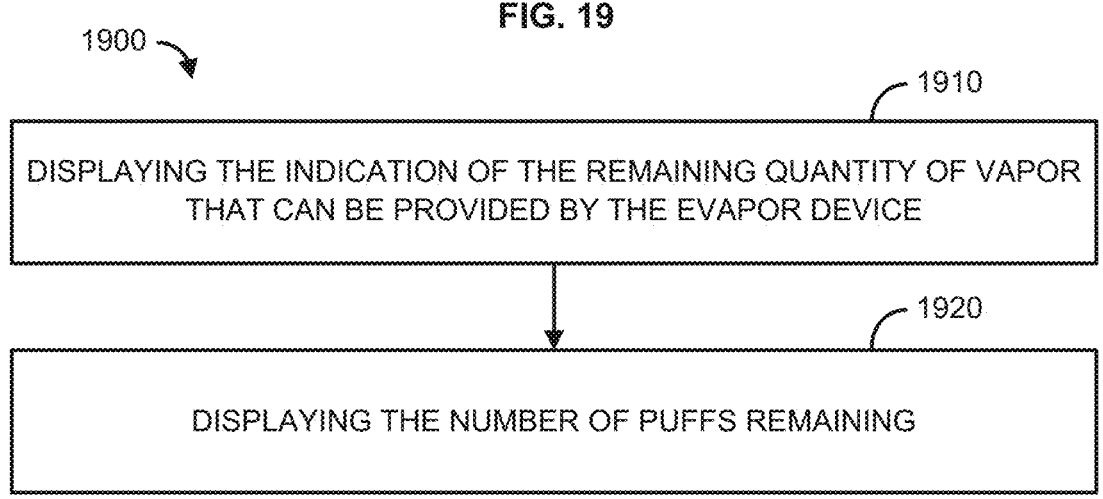
FIG. 19 illustrates an exemplary method.

The method 1800 may include any one or more of additional operations 1900, shown in FIG. 19 in any operable order. Each of these additional operations is not necessarily performed in every embodiment of the method, and the presence of any one of the operations 1900 does not necessarily require that any other of these additional operations also be performed.

Referring to FIG. 19 showing additional operations 1900, the method 1800 may further include, at 1910, displaying the indication of the remaining quantity of vapor that can be provided by the eVapor device. The method 1800 may further include, at 1920, displaying the number of puffs remaining.

It is noted that data may be stored, by the server in at least one database. For example, the information data may be stored into at least one database, such as, information the graphic, the time and manner of displaying the graphic, the user identification, and/or the like. Communicating the data may occur, for example, in at least one of a peer-to-peer (P2P) mode, a local area network (LAN) mode, a wide area network (WAN) mode, a virtual private network (VPN) mode, a cellular telephony mode, or a proprietary network mode. Certain networks such as P2P can be self-organizing. As such, P2P networks may be suitable for connecting consumer appliances, because no central administration is required. It is anticipated that the analysis and dispensing apparatuses described herein will be available as consumer devices, and should be suitable for participating in P2P communication.

P2P communication may be accomplished through a direct wired or wireless coupling. For example, two or more eVapor devices with compatible wireless transceivers may communicate directly with one another so long as within radio range. For further example, different apparatuses within a facility may be cabled together in a dairy chain or ring configuration, and communicate via the cabling. P2P communication may also be accomplished indirectly, meaning using another network for communication. For example, two or more nodes that are able to communicate via a wide area network (WAN) such as the Internet, a Local Area Network (LAN) and/or via a cellular communication network, may implement a P2P network using one or more other networks to handle the physical communication layer or layers. Either way, the P2P communication mode provides each node in the network with theoretically equal access to every resource serviced by the P2P network, subject to data sharing settings under the control of each node's administrator. For example, in a P2P network of air testing apparatuses, each apparatus may have access to the other apparatuses stored test and use data, if the P2P network is configured to include such data as a P2P resource.

P2P networks may be ad hoc and provide robust data storage and access over distributed networks. They may be vulnerable, however, to attacks from malicious P2P nodes. Such attacks may be reduced by implementing a security protocol in which only nodes that can prove they are not operating a malicious program are allowed to join. For a dedicated eVapor device, for example, a node may be required to provide a hash or certificate that verifies it is not a hacked or malicious node. Such certificates may be embedded within apparatus during manufacture, and the apparatuses may be configured so they are not reprogrammable except from an authorized administrative server. Thus, any node possessing such a certificate is unlikely to be malicious, and any node that proves to be malicious may have its certificate revoked.

Figure 20:
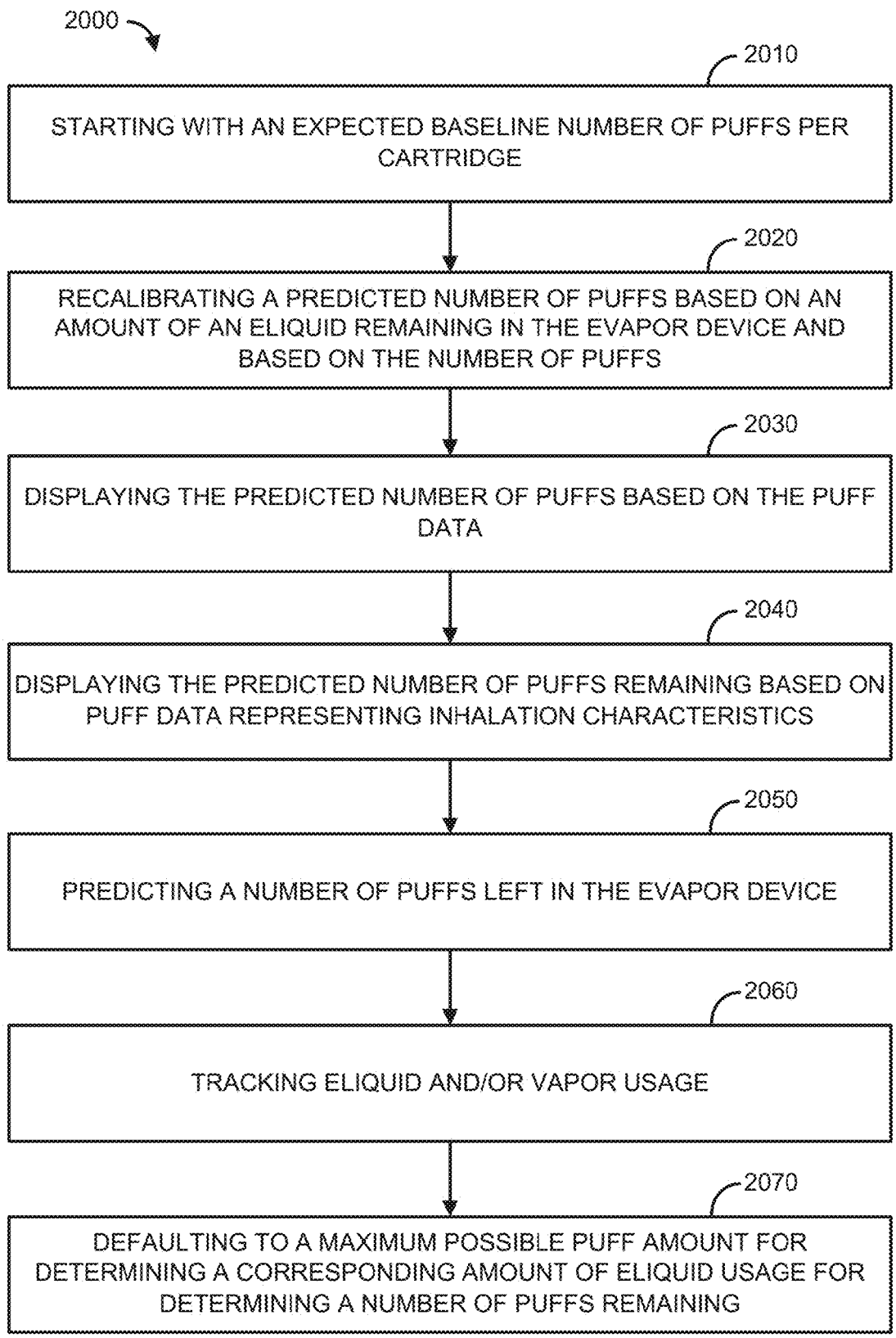
FIG. 20 illustrates an exemplary method.

Accordingly, referring to FIG. 20 showing additional operations 2000, the method 1800 may include, at 2010, starting with an expected baseline number of puffs per cartridge. The method 1800 may include, at 2020, recalibrating a predicted number of puffs based on an amount of an eLiquid remaining in the eVapor device and based on the number of puffs taken to this point. The method 1800 may include, at 2030, displaying the predicted number of puffs based on the puff data. The method 1800 may include, at 2040, displaying the predicted number of puffs remaining based on puff data representing inhalation characteristics. The method 1800 may include, at 2050, predicting a number of puffs left in the eVapor device. The method 1800 may include, at 2060, tracking eLiquid and/or vapor usage. The method 1800 may include, at 2070, predicting by defaulting to a maximum possible puff amount for determining a corresponding amount of eLiquid usage for determining a number of puffs remaining. The method 1800 may include, the processor controlling the display the remaining usage or the usage rate. The method 1800 may include, communicating over a network using a network communication component coupled to the processor.

In an aspect, an eVapor device is disclosed comprising a vapor dispensing system and a display component, wherein the display component is configured to visibly indicate at least one of: how much of an eLiquid remains in an eLiquid reservoir, and how many puffs remain available.

The eVapor device can further comprise a mechanical eLiquid reservoir level display. The eVapor device can further comprise a sensor and a processor configured to receive sensor data from the sensor. The sensor can be configured to generate a signal representative of a quantity of the eLiquid remaining in the eLiquid reservoir. The sensor can be configured to sense either a volume or a weight of the eLiquid remaining in the eLiquid reservoir. The processor can be configured to calculate an amount of the eLiquid remaining in the eLiquid reservoir based on the sensor data from the sensor. The sensor can be configured to sense at least one of a length, a duration, a volume and a pressure draw of a puff. The sensor can be configured to provide puff data relative to the puff to the processor, wherein the processor can be configured to count a number of puffs and to utilize the puff data to determine a number of puffs remaining in the eVapor device. The processor can provide data to remote server or accessory device for further processing, analysis, reporting or display.

The display component can further comprise a graphical display for displaying graphical representations under the command of the processor. The amount of the eLiquid remaining in the eVapor device can be displayed on an outer surface of the eVapor device. The amount of the eLiquid remaining in the eVapor device can be displayed as at least one of a digital readout (e.g., percentage full/empty), shades of colors, intensity of light, or demarcations from full to empty. The eVapor device can be further configured to display a relative rate of vaporization of the eLiquid (fast, medium or slow) as compared to a user's usual rate, a typical user rate, or a user rate based on a strength measurement of this particular user's puffs.

The eVapor device can further comprise a gate configured to limit a total vapor amount which may be drawn by a single inhaling action; wherein the processor automatically calculates a puff usage as an exact amount based on known maximum draw from the eVapor device.

The eVapor device can be one of: a personal vaporizer, a smokeless pipe, an e-cigarette, an e-cigar, an eVapor pipe, a micro-eVapor device, a vape Bot, a headset, and a monocle.

The processor can be operably connected to the graphical display for controlling the display of the graphic based on a signal received at the processor. The processor can be coupled to a memory. The eVapor device can further comprise a network communication component coupled to the processor. The processor can be further configured for receiving instructions from a database via the network communication component for changing the display. The processor can be configured for sharing data with at least one of a user interface device or a server node via the network communication component. The eVapor device can further comprise a user interface device comprising one of a dongle, a smartphone, a laptop, a tablet computer, and a desktop computer. The processor can be configured, based on a signal, to: change the display, order product, send a message, or retrieve information.

In an aspect, illustrated in FIG. 21, a method 2100 of displaying an indication of a remaining quantity of vapor that can be provided by an eVapor device is disclosed comprising providing data from sensors to a data processor at 2110, determining at said data processor, based on the data, the indication of the remaining quantity of vapor that can be provided by the eVapor device at 2120, and displaying the indication of the remaining quantity of vapor that can be provided by the eVapor device at 2130. The eVapor device can comprise one of, a personal vaporizer, a smokeless pipe, an e-cigarette, an e-cigar, an eVapor pipe, a micro-eVapor device, a vape Bot, a headset, and a monocle.

The method 2100 can further comprise starting with an expected baseline number of puffs per cartridge and recalibrating a predicted number of puffs based on an amount of an eLiquid remaining in the eVapor device and base on a number of puffs taken to this point.

The method 2100 can further comprise displaying a predicted number of puffs based on puff data. The method 2100 can further comprise displaying a predicted number of puffs remaining based on puff data representing inhalation characteristics. The method 2100 can further comprise predicting a number of puffs left in the eVapor device. The method 2100 can further comprise tracking eLiquid and/or vapor usage. Predicting can further comprises defaulting to a maximum possible puff amount for determining a corresponding amount of eLiquid usage for determining a number of puffs remaining.

The data can comprise puff data, the method further comprising providing the puff data or remaining puffs to at least one of: an eVapor related network system, a locally-cached storage device, and remote server.

The method 2100 can further comprise a processor controlling the display of the graphic. The method 2100 can further comprise communicating over a network using a network communication component coupled to a processor.

In an aspect, an apparatus is disclosed comprising a vapor outlet, a container for storing a vaporizable material, a vaporizer component coupled to the container, configured for vaporizing the vaporizable material to generate a vapor and for providing the vapor to the vapor outlet, a sensor coupled to the container for sensing a quantity of the vaporizable material in the container, a processor, configured for, determining an average amount of vapor associated with an average inhalation by a user of the apparatus, receiving the sensed quantity of the vaporizable material from the sensor, determining a number of inhalations remaining based on the quantity of the vaporizable material remaining and the average amount of vapor associated with the average inhalation, and a display component, configured for displaying the number of inhalations remaining.

The average amount of vapor can be determined based on at least one of a length of an inhalation, an amount of pressure of an inhalation, a flow rate of an inhalation from the vapor outlet, or a rate of vaporization of the vaporizable material.

The processor can be further configured for determining a current rate of vaporization, comparing the current rate of vaporization to the rate of vaporization associated with the average amount of vapor inhaled, and causing the display component to display an indication of the current rate of vaporization relative to the rate of vaporization associated with the average amount of vapor inhaled. The processor can be further configured to decrement the number of inhalations remaining based on a subsequent inhalation.

The apparatus can further comprise a gate, coupled to the container and the vaporizer component, configured to limit a total amount of vapor that may be drawn by an inhalation. Determining the average amount of vapor associated with the average inhalation by the user of the apparatus comprises determining the total amount of vapor that may be drawn by an inhalation.

The apparatus can further comprise a network access device, configured for communicating with an electronic device. The processor can be further configured to transmit the number of inhalations remaining to the electronic device via the network access device.

The display component can be configured for displaying the sensed quantity of the vaporizable material. The sensed quantity of the vaporizable material can be displayed as at least one of a digital readout, one or more shades of colors, an intensity of a light, or one or more demarcations from full to empty.

In an aspect, illustrated in FIG. 22, a method 2200 is disclosed comprising determining an average amount of vapor associated with an average inhalation by a user of an electronic vapor device at 2210, determining a quantity of vaporizable material stored in the electronic vapor device at 2220, determining a number of inhalations remaining based on the average amount of vapor associated with the average inhalation and the determined quantity of vaporizable material at 2230, and displaying the number of inhalations remaining at 2240.

The average amount of vapor is determined based on at least one of a length of an inhalation, an amount of pressure of an inhalation, a flow rate of an inhalation from the vapor outlet, or a rate of vaporization of the vaporizable material. The method 2200 can further comprise determining a current rate of vaporization, comparing the current rate of vaporization to the rate of vaporization associated with the average amount of vapor inhaled, and displaying an indication of the current rate of vaporization relative to the rate of vaporization associated with the average amount of vapor inhaled.

The method 2200 can further comprise detecting negative pressure applied to a vapor outlet of the electronic vapor device, causing a vaporizer component to vaporize the vaporizable material to generate a vapor in response to the negative pressure, providing the vapor to the vapor outlet, decrementing the number of inhalations remaining, and displaying the decremented number of inhalations remaining. The method 2200 can further comprise limiting a total amount of vapor that may be drawn by an inhalation.

Determining the average amount of vapor associated with the average inhalation by a user of the electronic vapor device comprises determining the total amount of vapor that may be drawn by an inhalation. The method 2200 can further comprise transmitting the number of inhalations remaining to an electronic device. The method 2200 can further comprise displaying the determined quantity of vaporizable material. The sensed quantity of the vaporizable material is displayed as at least one of a digital readout, one or more shades of colors, an intensity of a light, or one or more demarcations from full to empty. The method 2200 can further comprise detecting a change in the average amount of vapor associated with the average inhalation by the user of an electronic vapor device and updating the number of inhalations remaining based on the detected change In view of the exemplary systems described supra, methodologies that can be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks can be required to implement the methodologies described herein. Additionally, it should be further appreciated that the methodologies disclosed herein are capable of being stored on an article of manufacture to facilitate transporting and transferring such methodologies to computers.

Those of skill would further appreciate that the various illustrative logical blocks, modules, circuits, and algorithm steps described in connection with the aspects disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component," "module," "system," and the like are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components may reside within a process and/or thread of execution and a component can be localized on one computer and/or distributed between two or more computers.

As used herein, a "vapor" includes mixtures of a carrier gas or gaseous mixture (for example, air) with any one or more of a dissolved gas, suspended solid particles, or suspended liquid droplets, wherein a substantial fraction of the particles or droplets if present are characterized by an average diameter of not greater than three microns. As used herein, an "aerosol" has the same meaning as "vapor," except for requiring the presence of at least one of particles or droplets. A substantial fraction means 10% or greater; however, it should be appreciated that higher fractions of small (<3 micron) particles or droplets can be desirable, up to and including 100%. It should further be appreciated that, to simulate smoke, average particle or droplet size can be less than three microns, for example, can be less than one micron with particles or droplets distributed in the range of 0.01 to 1 micron. A vaporizer may include any device or assembly that produces a vapor or aerosol from a carrier gas or gaseous mixture and at least one vaporizable material. An aerosolizer is a species of vaporizer, and as such is included in the meaning of vaporizer as used herein, except where specifically disclaimed.

Various aspects presented in terms of systems can comprise a number of components, modules, and the like. It is to be understood and appreciated that the various systems may include additional components, modules, etc. and/or may not include all of the components, modules, etc. discussed in connection with the figures. A combination of these approaches can also be used.

In addition, the various illustrative logical blocks, modules, and circuits described in connection with certain aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, system-on-a-chip, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein can be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, a DVD disk, or any other form of storage medium known in the art. An exemplary storage medium is coupled to the processor such the processor can read information from, and write information to, the storage medium. In the alternative, the storage medium can be integral to the processor. The processor and the storage medium may reside in an ASIC or may reside as discrete components in another device.

Furthermore, the one or more versions can be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Those skilled in the art will recognize many modifications can be made to this configuration without departing from the scope of the disclosed aspects.

The previous description of the disclosed aspects is provided to enable any person skilled in the art to make or use the present disclosure. Various modifications to these aspects will be readily apparent to those skilled in the art, and the generic principles defined herein can be applied to other embodiments without departing from the spirit or scope of the disclosure. Thus, the present disclosure is not intended to be limited to the embodiments shown herein but is to be accorded the widest scope consistent with the principles and novel features disclosed herein.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow;

plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. An electronic vapor device comprising:
a device processor operable for controlling the electronic vapor device;
at least one container configured to store a vaporizable material;
a vaporizing component operatively connected to the device processor and controlled in part by the device processor, wherein the vaporizing component is in fluid communication with the at least one container for receiving a selected amount of vaporizable material therefrom, wherein the vaporizing component is configured to vaporize the vaporizable material received therein;
at least one sensing component operatively connected to the device processor and controlled in part by the device processor, wherein the at least one sensing component is configured to detect a plurality of status data associated with at least one vaporizable material stored in the at least one container;
at least one vapor outlet connected to the vaporizing component and configured to receive at least a portion of vapor generated by the vaporizing component, wherein the at least one vapor outlet is configured to expel the received vapor from the electronic vapor device; and
at least one power source operatively connected to the vaporizing component, wherein the at least one power source is configured to generate a supply of power for operation of at least the vaporizing component;
wherein the device processor is further configured to receive at least a portion of the detected status data from the at least one sensing component and determine, based on at least a portion of the detected status data, at least one vaporizable material usage condition.

2. The electronic vapor device of claim 1, wherein the at least one sensing component is configured to detect a plurality of status data associated with at least one of: a negative pressure applied to the at least one vapor outlet, a length of time that a negative pressure has been applied to the at least one vapor outlet, an amount of negative pressure that has been applied to the at least one vapor outlet, a rate at which generated vapor is being expelled from the at least one vapor outlet, a rate at which vaporizable material is being vaporized by the vaporizing component, and combinations thereof.

3. The electronic vapor device of claim 2, wherein the device processor is further configured to:
determine, based on at least one determined vaporizable material usage condition, at least one device parameter for vaporizing the at least one vaporizable material stored in the at least one container; and generate, based on the at least one determined device parameter, at least one control signal for controlling at least one operational parameter of the electronic vapor device in accordance with the at least one device parameter.

4. The electronic vapor device of claim 3, wherein the device processor is further configured to generate at least one control signal for controlling an amount of at least one vaporizable material received by the vaporizing component from the at least one container.

5. The electronic vapor device of claim 3, wherein the device processor is further configured to generate at least one vaporizing control signal for controlling at least one vaporization parameter for vaporizing at least a portion of the vaporizable material received therein.

6. The electronic vapor device of claim 3, wherein the device processor is further configured to generate, based on a determination that a predetermined amount of at least one vaporizable material remains in the at least one container, at least one control signal for controlling at least one of an amount of the at least one vaporizable material received by the vaporizing component, an amount of the at least one vaporizable material vaporized by the vaporizing component, an amount of vapor expelled from the at least one vapor outlet, and combinations thereof.

7. The electronic vapor device of claim 2, wherein the device processor is configured to determine at least one vaporizable material usage condition selected from the group consisting of: an average amount of vapor associated with an average inhalation of an associated user of the electronic vapor device, a current rate of vaporization of at least one vaporizable material, a quantity of at least one vaporizable material contained in the at least one container, an amount of at least one vaporizable material remaining in the at least one container, and combinations thereof.

8. The electronic vapor device of claim 7, further comprising a display operatively coupled connected to the device processor and controlled in part by the device processor, wherein the display is configured to display at least one determined vaporizable material usage condition thereon.

9. The electronic vapor device of claim 8, wherein the display is configured to display an amount of at least one vaporizable material remaining in the at least one container via at least one of: a digital readout, at least one shade of color, an intensity of light, at least one demarcation associated with a quantity level of the at least one container, and combinations thereof.

10. The electronic vapor device of claim 8, wherein the device processor is configured to determine, based on at least one determined vaporizable material usage condition, a number of inhalations remaining for at least one vaporizable material stored in the at least one container and generate at least one display control signal for controlling a visual output of the display representative of the number of inhalations remaining;
wherein the display is configured to generate a visual output representative of the number of inhalations remaining in accordance with the at least one display control signal.

11. The electronic vapor device of claim 10, wherein, in response to the at least one sensing component detecting a negative pressure applied to the at least one vapor outlet, the device processor is configured to adjust a number of inhalations remaining for at least one vaporizable material stored in the at least one container and generate at least one display control signal for controlling a visual output of the display representative of the adjusted number of inhalations remaining;

wherein the display is operable configured to generate a visual output representative of the adjusted number of inhalations remaining in accordance with the at least one display control signal.

12. A method for vaporizing at least one vaporizable material by an electronic vapor device, wherein the electronic vapor device comprises (a) a device processor for controlling the electronic vapor device, (b) at least one container configured to store a vaporizable material, (c) a vaporizing component configured to vaporize a plurality of vaporizable materials received therein, (d) at least one sensing component configured to detect a plurality of status data associated with at least one vaporizable material stored in the at least one container, (e) at least one vapor configured for receiving at least a portion of vapor generated by the vaporizing component and expelling the received vapor from the electronic vapor device, and (f) a display configured to generate a visual output, the method comprising:

receiving, by the device processor, at least one command to activate the electronic vapor device;

receiving, by the vaporizing component, a selected amount of the at least one vaporizable material from the at least one container, vaporizing at least a portion of vaporizable material received within the vaporizing component and expelling the generated vapor via the at least one vapor outlet;

detecting, by the at least one sensing component, a plurality of status data associated with the at least one vaporizable material stored in the at least one container;

determining, by the device processor, based on at least a portion of the plurality of detected status data, at least one vaporizable material usage condition;

generating, by the device processor, at least one visual control signal for controlling a visual output on the display of the at least one determined vaporizable material usage condition; and outputting, by the display, a visual output of the at least one determined vaporizable material usage condition in accordance with the at least one visual control signal.

13. The method of claim 12, wherein detecting a plurality of status data comprises detecting at least one of: a negative pressure applied to the at least one vapor outlet, a length of time that a negative pressure has been applied to the at least one vapor outlet, an amount of negative pressure that has been applied to the at least one vapor outlet, a rate at which generated vapor is being expelled from the at least one vapor outlet, a rate at which vaporizable material is being vaporized by the vaporizing component, and combinations thereof.

14. The method of claim 13, wherein determining at least one vaporizable material usage condition comprises determining at least one of: an average amount of vapor associated with an average inhalation of an associated user of the electronic vapor device, a current rate of vaporization of at least one vaporizable material, a quantity of at least one vaporizable material contained in the at least one container, an amount of at least one vaporizable material remaining in the at least one container, and combinations thereof.

15. The method of claim 13, further comprising:

determining, by the device processor, based on at least one determined vaporizable material usage condition, a number of inhalations remaining for at least one vaporizable material stored in the at least one container;

generating, by the device processor, at least one display control signal for controlling a visual output of the display representative of the number of inhalations remaining; and generating, by the display, a visual output representative of the number of inhalations remaining in accordance with the at least one display control signal.

16. The method of claim 15, further comprising:

determining, by the device processor, in response to detecting a negative pressure applied to the at least one vapor outlet, an adjusted number of inhalations remaining for at least one vaporizable material stored in the at least one container;

generating, by the device processor, at least one display control signal for controlling a visual output of the display representative of the adjusted number of inhalations remaining; and generating, by the display, a visual output representative of the adjusted number of inhalations remaining in accordance with the at least one display control signal.

17. The method of claim 13, further comprising:

determining, by the device processor, based on at least one determined vaporizable material usage condition, at least one device parameter for vaporizing at least one vaporizable material stored in the at least one container; and generating, by the device processor, based on the at least one determined device parameter, at least one control signal for controlling at least one operational parameter of the electronic vapor device in accordance with at least one device parameter.

18. The method of claim 17, further comprising generating, by the device processor, at least one control signal for controlling an amount of at least one vaporizable material received by the vaporizing component from the at least one container.

19. The method of claim 17, further comprising generating, by the device processor, at least one vaporizing control signal for controlling at least one vaporization parameter for vaporizing at least a portion of the vaporizable material received therein.

20. The method of claim 17, further comprising generating, by the device processor, based on a determination that a predetermined amount of at least one vaporizable material remains in the at least one container, at least one control signal for controlling at least one of an amount of the at least one vaporizable material received by the vaporizing component, an amount of the at least one vaporizable material vaporized by the vaporizing component, an amount of vapor expelled from the at least one vapor outlet, and combinations thereof.

* * * * *